United States Patent
Lautzenheiser et al.

(10) Patent No.: US 6,546,380 B1
(45) Date of Patent: Apr. 8, 2003

(54) METHOD AND APPARATUS FOR DETECTING AN ENDLESS LOOP IN A RULES-BASED EXPERT SYSTEM

(75) Inventors: Ted G. Lautzenheiser, Forest Lake, MN (US); Thomas K. Austin, Hugo, MN (US); Thomas R. Peters, Dellwood, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 08/937,353

(22) Filed: Sep. 24, 1997

(51) Int. Cl.$^7$ ................................................. G06N 5/02
(52) U.S. Cl. ............................ 706/47; 706/57; 706/60
(58) Field of Search ................................ 395/706, 708; 706/47, 48, 60, 52, 45; 707/10, 3, 7; 704/240

(56) References Cited

U.S. PATENT DOCUMENTS

| | | | |
|---|---|---|---|
| 5,129,043 A | * 7/1992 | Yue ............................... | 706/60 |
| 5,191,638 A | * 3/1993 | Wakami et al. ................ | 706/10 |
| 5,283,856 A | * 2/1994 | Gross et al. ................... | 706/47 |
| 5,412,802 A | * 5/1995 | Fujinami et al. .............. | 706/48 |
| 5,442,792 A | * 8/1995 | Chun .......................... | 395/706 |
| 5,446,883 A | * 8/1995 | Kirkbride et al. ............. | 707/10 |
| 5,701,400 A | * 12/1997 | Amado ......................... | 706/45 |
| 5,758,031 A | * 5/1998 | De Silva ...................... | 706/47 |
| 5,761,389 A | * 6/1998 | Maeda et al. .................. | 706/59 |
| 6,321,217 B1 | * 11/2001 | Maeda et al. .................. | 706/47 |

OTHER PUBLICATIONS

Baralis et al., "Modularization techniques fro active rules design", ACM Trans. on Database Sys. vo. 21, No. 1, pp 1–29, Mar. 1996.*

Fraternali et al., "A structured approach for the definition of the semantics of active databases", ACM Trans. on Database Sys. vol. 20 No. 4, pp 414–471, Dec. 1995.*

Waters, "Automatic transformation of series expressions into loops", ACM Trans. Prog. Lang. & Syst. vol. 13, No. 1, pp 52–96, Jan. 1991.*

Kiper, "Structural testing of rule based expert system", ACM Trans. on SW Eng. and Method., vol. 1, No. 2, pp 168–187, Apr. 1992.*

Bose, :Interactive program improvement via EAVE: an expert advisor for vectorization, ACM pp 119–130, 1988.*

Fickas, "Design issues in a rule based system", ACM pp 208–215, 1985.*

"RAP Research Analysis Program", Prognostics, Inc., Menlo Park, Californica, downloaded from home page Aug. 19, 1997.

KAPPA–PC 2.3 OnLine Help, available from Intellicorp, Inc.

* cited by examiner

*Primary Examiner*—Anil Khatri
(74) *Attorney, Agent, or Firm*—Charles A. Johnson; Mark T. Starr; Nawrocki, Rooney & Sivertson, P.A.

(57) ABSTRACT

A method and apparatus for detecting an endless loop in a rules-based expert system. This is preferably accomplished by maintaining a count for each of the rules during rule processing. The count indicates the number of times a corresponding rule is executed by the rules based expert system. If the count corresponding to any of the rules exceeds a predetermined value, it is concluded that the rules-based expert system is stuck in an endless loop, and the rules-based expert system is interrupted.

23 Claims, 90 Drawing Sheets

FIG. 15

EXAMPLE CORRELATION TABLE

| GENERIC HEADING | S-1 | S-2 | S-3 | S-4 |
|---|---|---|---|---|
| HEADING - 1 | Q-122 | Q-122 | Q-143 | Q-143 |
| HEADING - 2 | | | Q-156 | Q-156 |
| HEADING - 3 | Q-101 | Q-101 | Q-101 | Q-101 |
| HEADING - 4 | Q-104 | Q-104 | Q-104 | Q-104 |
| HEADING - 5 | Q-98 | Q-98 | Q-98 | Q-98 |
| HEADING - 6 | Q-93 | Q-93 | Q-93 | Q-93 |
| HEADING - 7 | Q-122 | Q-122 | | |
| HEADING - 8 | Q-145 | Q-145 | Q-145 | Q-145 |

*FIG. 19*

SCENARIO 1: DIRECT RAP REQUEST, PROBLEM DETECTED IN REQUEST

| USER | IM | KM | DM |
|---|---|---|---|
| ENTERS RAP COMMAND | | | |
| | ACCEPTS RAP COMMAND, CREATES SIMPLE_RAP OBJECT FOR FURTHER ANALYSIS. <LEAD USER THROUGH RAP REQUEST & CHECK COMMAND SYNTAX.>. SENDS TO KM FOR VERIFICATION. | | |
| | | RECEIVES SIMPLE_RAP, USES RULES TO CHECK FOR PROBLEMS IN REQUEST, NOTES PROBLEMS, UPDATES REQUEST_CAVEATS, SENDS BACK TO IM | |
| | APPENDS REQUEST CAVEATS | | |
| VIEWS REQUEST CAVEATS | | | |

FIG. 33

SCENARIO 2: DIRECT RAP REQUEST, NO PROBLEMS DETECTED OR USER CONTINUES AFTER ERROR MESSAGE

| USER | IM | KM | DM |
|---|---|---|---|
| ENTERS RAP COMMAND | | | |
| | ACCEPTS RAP COMMAND, CREATES SIMPLE_RAP OBJECT FOR FURTHER ANALYSIS <LEAD USER THROUGH RAP REQUEST & CHECK COMMAND SYNTAX>. SENDS TO KM FOR VERIFICATION. | | |
| | | RECEIVES SIMPLE_RAP, USES RULES TO CHECK FOR PROBLEMS IN REQUEST, NOTES PROBLEMS, UPDATES REQUEST_CAVEATS, SENDS BACK TO IM | |
| | APPENDS | | |

FIG. 34A

|  | REQUEST CAVEATS |  |  |
|---|---|---|---|
|  |  | SENDS RAP COMMAND TO DM |  |
|  |  |  | RECEIVES RAP COMMAND OBJECT, CREATES BATCH COMMAND, EXECUTES COMMAND, RETURNS DIRECT RAP OBJECT. |
|  |  | <PREVIEW RAP RESULTS> SENDS RAP RESULTS TO IM. |  |
|  | APPENDS RESULTS, DISPLAY TO USER. <DISPLAY GRAPH IF REQUESTED. |  |  |
| VIEWS RESULTS AND CAVEATS |  |  |  |

FIG. 34B

SCENARIO 3: STRENGTH/WEAKNESS/OPPORTUNITY/THREATS ANALYSIS, QUERY PROBLEMS DETECTED

| USER | IM | KM | DM |
|---|---|---|---|
| ENTER SURVEY INFO, REQUEST STRENGTHS OR WEAKNESS ANALYSIS | | | |
| | ACCEPT/CHECK COMMAND CREATE COMPLEX_QUERY OBJECT, SEND TO KM. | | |
| | | RECEIVE COMPLEX_QUERY, EVALUATE ANALYSIS INPUTS. DETERMINE TYPE OF REPORTS NEEDED TO VALIDATE REQUEST. CREATE KM_REQUESTS FOR DM (IF NECESSARY) SEND TO DM. | |
| | | | RECEIVE KM_REQUESTS |

FIG. 35A

| | | | OBJECT CHECK EXISTING REPORTS/ OBJECTS. IF NOT FOUND, RUN APPROPR- IATE RAP REPORT AND GENERATE OBJECTS. IF FOUND, OR GENERATED, RETURN OBJECT TO KM. |
|---|---|---|---|
| | | EXAMINE RETURNED OBJECTS, GENERATE REQUEST CAVEATS BASED ON DM OBJECTS AND KM RULES. CREATE A RESULT CAVEATS OBJECT (STREAM) AND SEND IT TO IM. | |
| | RECEIVE APPENDED REQUEST CAVEATS, DISPLAY TO USER. | | |
| RECEIVE CVT/RESULTS | | | |

FIG. 35B

SCENARIO 4: STRENGTH OR WEAKNESS ANALYSIS, NO PROBLEMS DETECTED OR USER CONTINUES AFTER ERROR MESSAGE

| USER | IM | KM | DM |
|---|---|---|---|
| ENTER SURVEY INFO, REQUEST STRENGTHS OR WEAKNESS ANALYSIS | | | |
| | ACCEPT/CHECK COMMAND CREATE COMPLEX_QUERY OBJECT, SEND TO KM. | | |
| | | RECEIVE COMPLEX_QUERY, DETERMINE TYPE OF REPORTS NEEDED BASED ON PRODUCTS ETC. CREATE KM_REQUESTS FOR DM SEND TO DM. | |
| | | | RECEIVE KM_REQUESTS OBJECT. CHECK EXISTING |

FIG. 36A

| | | | REPORTS/ OBJECTS. IF NOT FOUND, RUN APPROPR- IATE RAP REPORT AND GENERATE OBJECTS. IF FOUND, OR GENERATED, RETURN MGAP OBJECT TO KM. |
|---|---|---|---|
| | | LOOK THROUGH THE MGAP OBJECTS THAT WERE RETURNED, AND DETERMINE WHICH OF THESE ARE STRENGTHS/WE AKNESSES BASED ON RULES. CREATE A RESULT OBJECT (STREAM) AND SEND IT TO IM. | |
| | RECEIVE APPENDED RESULT, DISPLAY TO USER. | | |
| RECEIVE STRENGTHS OR | | | |

FIG. 36B

| WEAKNESS ANALYSIS | | | |
|---|---|---|---|
| | | | |

FIG. 36C

SCENARIO 5: THREATS OR OPPORTUNITIES, NO PROBLEMS DETECTED OR USER CONTINUES AFTER ERROR MESSAGE

| USER | IM | KM | DM |
|---|---|---|---|
| ENTER SURVEY INFO, REQUEST OPPTNTY OR THREAT ANALYSIS | | | |
| | ACCEPT/CHECK COMMAND CREATE COMPLEX_QUERY OBJECT, SEND TO KM. | | |
| | | RECEIVE COMPLEX_ QUERY, DETERMINE TYPE OF REPORTS NEEDED BASED ON PRODUCTS ETC. CREATE MULTIPLE KM_REQUESTS FOR DM BASED ON VENDOR AND PRODUCT KNOWLEDGE SEND TO DM. | |
| | | | RECEIVE KM_REQUESTS OBJECT CHECK |

FIG. 37A

| | | | EXISTING REPORTS & OBJECTS. IF NOT FOUND, RUN APPROPRIATE RAP REPORT AND GENERATE OBJECTS. IF FOUND, OR GENERATED, RETURN MGAP OBJECT TO KM. |
|---|---|---|---|
| | | LOOK THROUGH THE MGAP OBJECTS THAT WERE RETURNED, AND DETERMINE WHICH OF THESE ARE STRENGTHS/ WEAKNESSES BASED ON RULES. COMPARE THE STRENGTHS/ WEAKNESSES BASED ON VENDORS AND PRODUCTS, AND TURN THIS INTO THREATS AND OPPORT- UNITIES. CREATE A RESULT | |

FIG. 37B

| | | OBJECT (STREAM) AND SEND IT TO IM. | |
|---|---|---|---|
| | RECEIVE APPENDED RESULT, DISPLAY TO USER. | | |
| RECEIVE THREATS OR OPPORTUNITIES ANALYSIS | | | |

FIG. 37C

SCENARIO 6: SURVEY VALIDATION REQUEST, WITH REQUEST PROBLEM DETECTED

| USER | IM | KM | DM |
|---|---|---|---|
| ENTERS SURVEY VALIDATION REQUEST | | | |
| | ACCEPTS REQUEST, CREATES SURVEY_VALIDATION OBJECT FOR FURTHER ANALYSIS. SENDS TO KM FOR VERIFICATION. | | |
| | | RECEIVES SURVEY_VALIDATION OBJECT, USES RULES TO CHECK FOR PROBLEMS IN REQUEST, NOTES PROBLEMS, UPDATES REQUEST_CAVEATS, SENDS BACK TO IM. | |
| | APPENDS REQUEST CAVEATS | | |
| VIEWS REQUEST CAVEATS | | | |

FIG. 38

SCENARIO 7: SURVEY VALIDATION WITH NO QUERY PROBLEMS DETECTED OR USER CONTINUES AFTER ERROR MESSAGE

| USER | IM | KM | DM |
|---|---|---|---|
| ENTER SURVEY INFO, REQUEST SURVEY VALIDATION | | | |
| | ACCEPT/CHECK COMMAND CREATE SURVEY_VALIDATION OBJECT, SEND TO KM | | |
| | | RECEIVE SURVEY_VALIDATION OBJECT, DETERMINE TYPE OF REPORTS NEEDED BASED ON PRODUCTS ETC. CREATE KM_REQUESTS FOR DM SEND TO DM. | |
| | | | RECEIVE KM_REQUESTS OBJECT CHECK EXISTING REPORTS/ OBJECTS. IF NOT FOUND, RUN APPROPR- |

FIG. 39A

|  |  |  | IATE RAP REPORT AND GENERATE OBJECTS. IF FOUND, OR GENERATED, RETURN MGAP OBJECT TO KM. |
|---|---|---|---|
|  |  | LOOK THROUGH THE OBJECTS THAT WERE RETURNED, AND USE RULES TO GENERATE SURVEY VALIDATION RESULTS. CREATE A RESULT OBJECT (STREAM) AND SEND IT TO IM. |  |
|  | RECEIVE APPENDED RESULT, DISPLAY TO USER. |  |  |
| RECEIVE RESULTS |  |  |  |

FIG. 39B

SCENARIO 8: SWOT PARAMETER UPDATE USING THE SWOT EDITOR

| USER | IM | KM | DM |
|---|---|---|---|
| ENTER SWOT AND/OR ANALYSIS PARAMETERS VIA SWOT EDITOR | | | |
| | ACCEPT/CHECK PARAMETERS. INFORM USER OF NON-ACCEPTABLE PARAMETER VALUES. ALLOW USER TO STORE/RETRIEVE ENVIRONMENT. RECEIVE APPENDED RESULT, DISPLAY TO USER. | | |
| RECEIVE UPDATED DISPLAY | | | |

1286 → PASS #3

| RULE "B" | IF { (PAR "B") }<br>THEN { (CHANGE PAR "Z") }<br>    INCREMENT COUNTER "B" | PAR "Z" |
| RULE "C" | IF { (PAR "C") }<br>THEN { UPDATE SCREEN }<br>    INCREMENT COUNTER "C" | |
| RULE "Z" | IF { (PAR "Z") }<br>THEN { (CHANGE PAR "B") }<br>    INCREMENT COUNTER "Z" | PAR "B" |

1288 → PASS #4

| RULE "Z" | IF { (PAR "Z") }<br>THEN { (CHANGE PAR "B") }<br>    INCREMENT COUNTER "Z" | PAR "B" |
| RULE "B" | IF { (PAR "B") }<br>THEN { (CHANGE PAR "Z") }<br>    INCREMENT COUNTER "B" | PAR "Z" |

PASS #5

| ANALYSIS TYPE | RULE SET |
|---|---|
| Strength Analysis Type | RS_ver_analysis<br>RS_init_analysis<br>RS_init_strength_4<br>RS_xqt_strength_4<br>RS_post_strenth<br>RS_post_analysis |
| Weakness Analysis Type | RS_ver_analysis<br>RS_init_analysis<br>RS_init_weakness_4<br>RS_xqt_weakness_4<br>RS_post_weakness<br>RS_post_analysis |
| Opportunity Analysis Type | RS_ver_analysis<br>RS_init_analysis<br>RS_init_strength_4<br>RS_xqt_strength_4<br>RS_post_strenth<br>RS_init_weakness_4<br>RS_xqt_weakness_4<br>RS_post_weakness<br>RS_init_opportunity_4<br>RS_xqt_opportunity_4<br>RS_post_opportunity<br>RS_post_analysis |
| Threat Analysis Type | RS_ver_analysis<br>RS_init_analysis<br>RS_init_strength_4<br>RS_xqt_strength_4<br>RS_post_strenth<br>RS_init_weakness_4<br>RS_xqt_weakness_4<br>RS_post_weakness<br>RS_post_threat<br>RS_post_analysis |
| Survey Verification | RS_ver_validate<br>RS-init_validate_gen<br>RS_xqt_val_chk_tot_resp<br>RS_xqt_val_response<br>RS_xqt_val_dist<br>RS_xqt_val_resonse<br>RS_xqt_val_dist<br>RS_xqt_val_resonse<br>RS_xqt_val_dist<br>RS_xqt_val_resonse<br>RS_xqt_val_dist<br>RS_xqt_val_resonse<br>RS_xqt_val_dist<br>RS_xqt_val_resonse<br>RS_xqt_val_decrease<br>RS_init_importance<br>RS_xqt_importance<br>RS_post_strenth<br>RS_xqt_val_response<br>RS_xqt_val_pairs<br>RS_init_analysis<br>RS_init_strength_4<br>RS_xqt_strength_4<br>RS_post_strenth<br>RS_post_analysis<br>RS_xqt_val_response<br>RS_xqt_val_pairs |

FIG. 49

| Rule Set Definitions | Rules |
|---|---|
| RS_ver_analysis | o_or_t_chk_survey<br>query_error_check<br>query_no_error_check<br>RAP_chk_importance<br>RAP_chk_of_name<br>RAP_chk_request_type<br>RAP_chk_specific<br>RAP_set_importance<br>RAP_set_specific<br>srv1_chk_max_q<br>srv1_chk_overall_sat_q<br>srv1_chk_product_q<br>srv1_chk_recommend_q<br>srv1_chk_repurchase_q<br>srv1_chk_survey_name<br>srv1_chk_vender_q<br>srv2_chk_max_q<br>srv2_chk_overall_sat_q<br>srv2_chk_product_q<br>srv2_chk_recommend_q<br>srv2_chk_repurchase_q<br>srv2_chk_survey_name<br>srv2_chk_vender_q<br>srv2_required<br>SWOT_command_set<br>SWOT_overall_sat_req<br>SWOT_recommend_req<br>SWOT_repurchase_req<br>x_dist_chk_axis |
| RS_init_analysis | report_algorithm_1<br>report_algorithm_2<br>report_algorithm_3<br>report_algorithm_4<br>report_algorithm_5<br>report_algorithm_6<br>report_min_answers<br>report_overall_gap<br>report_srv_range_0to10<br>report_srv_range_1to5<br>swot_result_count_init |
| RS_init_strength_4 | corr_to_overall_sat<br>report_s_alg_4a<br>report_s_alg_4b<br>SWOT_use_STAT |
| RS_xqt_strength_4 | s_chk_ans_type<br>s_chk_gap_type<br>s_chk_imp_type<br>s_chk_sat_type<br>s_cre_composite_4a<br>s_cre_composite_4b<br>s_set_report<br>s_val_gap |

FIG. 50A

| Rule Set Definitions | Rules |
|---|---|
| RS_post_strength | report_custom_gap_error<br>report_custom_imp_error<br>report_strength_rule<br>s_chk_min_answers<br>s_chk_no_results |
| RS_init_weakness_4 | corr_to_overall_sat<br>report_w_alg_4a<br>report_w_alg_4b<br>SWOT_use_STAT |
| RS_xqt_weakness_4 | w_chk_ans_type<br>w_chk_gap_type<br>w_chk_imp_type<br>w_chk_sat_type<br>w_cre_composite_4a<br>w_cre_composite_4b<br>w_set_report<br>w_val_gap |
| RS_post_weakness | report_custom_gap_error<br>report_custom_imp_error<br>report_weakness_rule<br>s_chk_min_answers<br>s_chk_no_results |
| RS_init_opportunity_4 | No rules specified |
| RS_xqt_opportunity_4 | No rules specified |
| RS_post_opportunity | o_chk_min_answers<br>o_chk_no_results |
| RS_post_threat | t_chk_min_answers<br>t_chk_no_results |
| RS_post_analysis | o_chk_no_matches<br>o_chk_nonzero_s<br>o_chk_nonzero_w<br>report_answer_cardinality<br>report_opportunity_cardinality<br>report_strength_cardinality<br>report_strength_composite<br>report_threat_cardinality<br>report_weakness_cardinality<br>report_weakness_composite<br>t_chk_no_matches<br>t_chk_nonzero_s<br>t_chk_nonzero_w |
| RS_ver_validate | query_error_check<br>query_no_error_check<br>srv1_chk_survey_name<br>srv2_chk_survey_name |

FIG. 50B

| RULE SET DEFINITIONS | RULES |
|---|---|
| RS-init_validate_gen | v_gen_init_1<br>v_gen_init_2a<br>v_gen_init_2b<br>v_gen_init_2c<br>v_gen_init_2d<br>v_gen_init_2e<br>v_gen_init_2f<br>v_gen_init_2g<br>v_gen_init_2h<br>v_gen_init_2i<br>v_gen_init_4a<br>v_gen_init_4b<br>v_gen_init_5a<br>v_gen_init_5b<br>v_gen_init_5c |
| RS_xqt_val_chk_tot_resp | v_chk_tot_resp<br>v_rep_STM<br>v_rep_tot_resp<br>v_set_tot_resp |
| RS_xqt_val_response | v_chk_response<br>v_rep_response |
| RS_xqt_val_dist | v_chk_EQ_0<br>v_chk_GT_50pct<br>V_chk_GT_5x<br>v_chk_LT_1divSTM<br>v_chk_LT_5<br>v_rep_EQ_0<br>v_rep_GT_50pct<br>V_rep_GT_5x<br>v_rep_LT_1divSTM<br>v_rep_LT_5 |
| RS_xqt_val_decrease | v_chk_decrease<br>v_rep_decrease |
| RS_init_importance | corr_to_none<br>imp_report<br>SWOT_use_MGAP |
| RS_xqt_importance | imp_cre_composite<br>s_chk_ans_type<br>s_chk_gap_type<br>s_chk_imp_type<br>s_chk_sat_type<br>s_set_report |
| RS_xqt_val_response | v_chk_response<br>v_rep_response |
| RS_xqt_val_pairs | v_chk_mgap_pairs<br>v_rep_mgap_pairs |

FIG. 50C

| RULE NAME | COMMENT |
|---|---|
| check_Unisys_answers | If the question_text is Unisys, report the number of answers and the percentage of the total. |
| chk_forward_chain_args | Kappa-PC Forward Chaining was invoked without specifying a rule set name. |
| corr_to_custom_none | Set Correlation Question to NULL if the SWOT Algorithm selection is "Custom" and the Custom : correlation question selection is "None". |
| corr_to_custom_overall_sat | Set Correlation Question to "Overall Sastisfaction" if the SWOT Algorithm selection is "Custom" and the Custom : correlation question selection is "Overall Satisfaction". |
| corr_to_custom_recommend | Set Correlation Question to "FUTURE INTENTIONS" if the SWOT Algorithm selection is "Custom" and the Custom correlation question selection is "Repurchase". |
| corr_to_custom_repurchase | Set Correlation Question to "FUTURE INTENTIONS" if the SWOT Algorithm selection is "Custom" and the Custom correlation question selection is "Repurchase". |
| corr_to_none | Set the correlation question to NONE, i.e. this analysis will not be correlated to any other question. |
| corr_to_overall_sat | Set Correlation Question to "Overall Satisfaction". |
| corr_to_repurchase | Set Correlation Question to "Future Intentions (Repurchase)". |
| d_chk_min_answers | If the item had less than the minimum valid answers, then the item text and the actual number are returned as caveats. |
| g_cre_composite_1 | The composite value is the IMPORTANCE value. |
| gap_cre_composite | The composite value is the GAP value. |
| gap_report | Append the description of the Gap Report in the Result Caveats window. |
| HBM_set_axis_text | This rule initializes the Overall Sat and Loyalty generic text for the HBM Behavior Analysis model. |
| HBM_set_repurchase | This rule supplies the list of positive Loyalty (Repurchase) responses for the HBM Behavior Analysis model. |
| imp_cre_composite | The composite value is the IMPORTANCE value. |
| imp_report | Append the description of the Importance Report in the Result Caveats window. |

FIG. 51A

| RULE NAME | COMMENT |
|---|---|
| | |
| junk | |
| normalize_1_to_10 | If Survey is NOT WW1992, WW1993, WW1994, OR SSD95 then set the normalization flag to FALSE, meaning that no adjustment is required. |
| normalize_1_to_5 | If Survey is WW1992, WW1993, WW1994, or SSD, then set the normalization indicator to TRUE so that the Importance, Satisfaction, and GAP value are adjusted accordingly. |
| o_chk_min_answers | If the analysis type is Opportunity, the item is included as a result, and the item had less than the minimum valid answers, then the item text and the actual number are returned as caveats. |
| o_chk_no_matches | If analysis type is Opportunity, and the number of weakness results is >0, and the number of strength results is >0, then report that no strength/weakness matches were found. |
| o_chk_no_results | If the analysis type is Opportunity, and no results were found, add an appropriate message to the results window and refer the user to the caveats. |
| o_chk_nonzero_s | If analysis type is Opportunity, and the number of strength results is 0, then report that fact as the reason that no Opportunities were generated. |
| o_chk_nonzero_w | If analysis type is Opportunity, and the number of weakness results is 0, then report that fact as the reason that no Opportunities were generated. |
| o_or_t_chk_survey | For an Opportunity/Threat analysis, if the survey names are different then generate a request caveat, because the actual question text is used for comparision in this revision of Satisfax. |
| query_error_check | If a query error is detected by the verification rule sets, then report that fact as a request caveat. Query errors cause a Continue Y/N user prompt. |
| query_no_error_check | If no query errors were detected by the verification rule sets, then report that fact as a request caveat. Query errors cause a Continue Y/N user prompt. |
| RAP_chk_importance | If the command requires an importance selection, but one has not been specified (Null), then inform the user via the request caveats and set the "Command has Caveats" flag. |
| RAP_chk_of_name | If this is a RAP command, and the 'Analysis Of' value has not been supplied, then add this fact to the Request Caveats, and inform the user of the problem. |

FIG. 51B

| RULE NAME | COMMENT |
|---|---|
| RAP_chk_request_type | If the request type is a RAP command (a,c,d,f,g,h,j,m,o,s,v & u), then set the slot query_validation:RAP_command to be TRUE for additional RAP command checking. |
| RAP_chk_specific | If this is a RAP command that supports Specific questions, and the Specific button was selected, but no actual questions were chosen, then inform the user and cancel the command. |
| RAP_null_check | If the RAP command is null on a direct RAP transaction, then report that fact and prompt the user to continue. |
| RAP_set_importance | If RAP command, and gap, then set the flag indicating that the importance question must be supplied. |
| RAP_set_specific | If RAP command, and just_dom or mgap or statistics, and the "Specific" questions button has been selected, then set a flag indicating that additional questions must be selected. |
| report_algorithm_1 | If SWOT Algorithm is "Client Significant" then send the algorithm definition to result caveats. |
| report_algorithm_2 | If SWOT algorithm is "Repurchase Contributors" then send the algorithm definition to result caveats. |
| report_algorithm_3 | If SWOT algorithm is "Client Satisfiers" then send the algorithm definition to result caveats. |
| report_algorithm_4 | If SWOT algorithm is "Corporate Baseline (Overall Satisfaction)" then send the algorithm name to result caveats. |
| report_algorithm_5 | If SWOT algorithm is "Corporate Baseline (Repurchase)" then send the algorithm name to result caveats. |
| report_algorithm_6 | If SWOT algorithm is "Custom" then report that fact in Result Caveats, and include the current slider values (importance, gap, correlation cutoff). |
| report_answer_cardinality | Report the maximum number of items to report in a Strengths, Weakness, Opportunity, or Threat list. |
| report_custom_gap_error | If the survey range is 1..5, and the gap value (custom algorithm) > 5, then explain the lack of results in the result caveats. |
| report_custom_imp_error | If the survey range is 1..5, and the importance value (custom algorithm) > 5, then explain the lack of results in the result caveats. |

FIG. 51C

| RULE NAME | COMMENT |
|---|---|
| report_min_answers | Report the minimum number of answers that are deemed necessary to be a statiscally significant sample. |
| report_opportunity_cardinality | For an Opportunity analysis, report the number of Opportunities that were found, and the formula for computing the Opportunity composite value. |
| report_overall_gap | If the selection is Overall Gap, report that the Composite/Sort value is the IMPORTANCE. |
| report_s_alg_1a | If the survey range is 1..10, report that the composite rule to be used is: s_cre_composite_1a. |
| report_s_alg_1b | If the survey range is 1..5, report that the composite rule to be used is: s_cre_composite_1b. |
| report_s_alg_2a | If the survey range is 1..10, report that the composite rule to be used is: s_cre_composite_2a. |
| report_s_alg_2b | If the survey range is 1..5, report that the composite rule to be used is: s_cre_composite_2b. |
| report_s_alg_3a | If the survey range is 1..10, report that the composite rule to be used is: s_cre_composite_3a. |
| report_s_alg_3b | If the survey range is 1..5, report that the composite rule to be used is: s_cre_composite_3b. |
| report_s_alg_4a | If the survey range is 1..10, report that the composite rule to be used is: s_cre_composite_4a. |
| report_s_alg_4b | If the survey range is 1..5, report that the composite rule to be used is: s_cre_composite_4b. |
| report_s_alg_5a | If the survey range is 1..10, report that the composite rule to be used is: s_cre_composite_5a. |
| report_s_alg_5b | If the survey range is 1..5, report that the composite rule to be used is: s_cre_composite_5b. |
| report_s_alg_6a | If the survey range is 1..10, report that the composite rule to be used is: s_cre_composite_6a. |
| report_s_alg_6b | If the survey range is 1..5, report that the composite rule to be used is: s_cre_composite_6b. |
| report_srv_range_0to10 | Check the survey range, and report the 0..10 value if matched. |
| report_srv_range_1to5 | Check the survey range, and report the 1..5 value if matched. |

FIG. 51D

| RULE NAME | COMMENT |
|---|---|
| report_srv_range_default | Check the survey range, and report the use of the default (0..10) if it is 0 (Set by NULL or ERROR). |
| report_strength_cardinality | For a Strength, Opportunity, or a Threat analysis, report the number of Strengths that were found. |
| report_strength_composite | If the current activity is a Strength, Opportunity, or Threat analysis, Report the current value of the strength composite settings. |
| report_strength_rule | This rule calls methods to verify that only the expected strength composite generating rules were used. If this is not so, then error KM_037 is generated. |
| report_threat_cardinality | For a Threat analysis, report the number of Threats that were found, and the formula used to calculate the Threat Composite value. |
| report_w_alg_1a | If the survey range is 1..10, report that the composite rule to be used is: w_cre_composite_1a. |
| report_w_alg_1b | If the survey range is 1..5, report that the composite rule to be used is: w_cre_composite_1b. |
| report_w_alg_2a | If the survey range is 1..10, report that the composite rule to be used is: w_cre_composite_2a. |
| report_w_alg_2b | If the survey range is 1..5, report that the composite rule to be used is: w_cre_composite_2b. |
| report_w_alg_3a | If the survey range is 1..10, report that the composite rule to be used is: w_cre_composite_3a. |
| report_w_alg_3b | If the survey range is 1..5, report that the composite rule to be used is: w_cre_composite_3b. |
| report_w_alg_4a | If the survey range is 1..10, report that the composite rule to be used is: w_cre_composite_4a. |
| report_w_alg_4b | If the survey range is 1..5, report that the composite rule to be used is: w_cre_composite_4b. |
| report_w_alg_5a | If the survey range is 1..10, report that the composite rule to be used is: w_cre_composite_5a. |
| report_w_alg_5b | If the survey range is 1..5, report that the composite rule to be used is: w_cre_composite_5b. |
| report_w_alg_6a | If the survey range is 1..10, report that the composite rule to be used is: w_cre_composite_6a. |
| report_w_alg_6b | If the survey range is 1..5, report that the composite rule to be used is: w_cre_composite_6b. |

FIG. 51E

| RULE NAME | COMMENT |
|---|---|
| report_weakness_cardinality | For a Weakness, Opportunity, or Threat analysis, report the number of Weaknesses that were found. |
| report_weakness_composite | If the current activity is a Weakness, Opportunity, or Threat analysis, Report the current value of the weakness composite setting. |
| report_weakness_rule | This rule calls methods to verify that only the expected weakness composite generating rules were used. If this is not so, then error KM_037 is generated. |
| s_chk_ans_type | If ANSWERS is not numerical then report SATISFAX error # KM_022. |
| s_chk_gap_type | If GAP is not numerical then report SATISFAX error # KM_020. |
| s_chk_imp_type | If IMPORTANCE is not numerical then report SATISFAX error # KM_021. |
| s_chk_min_answers | If the analysis type is Strength, the item is included as a result, and the item had less than the minimum valid answers, then the item text and the actual number are returned as caveats. |
| s_chk_no_results | If the analysis type is Strength, and no results were found, add an appropriate message to the results window and refer the user to the caveats. |
| s_chk_sat_type | If SATISFACTION is not numerical then report SATISFAX error # KM_023. |
| s_cre_composite_1a | If survey range is 0..10 and importance > 8 then Composite = importance * satisfaction. |
| s_cre_composite_1b | If survey range is 1..5 and importance > 4 then Composite = importance * satisfaction. |
| s_cre_composite_2a | If the survey range is 0..10 and importance > 8 and gap < 2 and correlation to repurchase >= 0.4 then: composite = 1000 * (2- gap) * correlation. |
| s_cre_composite_2b | If the survey range is 1..5, then composite value is generated using: 1000 * (1- gap) * correlation where importance > 4 and gap < 1, and the correlation to repurchase is >= 0.4. |
| s_cre_composite_3a | If Survey Range = 0..10 and importance > 8, and gap < 2, and correlation to overall satisfaction >= .4, then Composite = 100 * (2- GAP) * importance * correlation. |
| s_cre_composite_3b | If Survey Range = 1..5 and importance > 4, and gap < 1, and correlation to overall satisfaction >= .4, then Composite = 100 * (1- gap) * importance * correlation. |

FIG. 51F

| Rule Name | Comment |
|---|---|
| s_cre_composite_4a | If Survey Range is 0..10 and importance >= 8, and gap <= 1, and correlation to overall satisfaction >= 0.4, then Composite = 100 * (1- GAP) * correlation. |
| s_cre_composite_4b | If Survey Range is 1..5 and importance >= 4, and gap <= .5, and correlation to overall satisfaction >= 0.4, then Composite = 100 * (0.5- gap) * correlation. |
| s_cre_composite_5a | If Survey Range is 0..10 and importance >= 8, and gap <= 1, and correlation to repurchase >= 0.4, then Composite = 100 * (1- GAP) * correlation. |
| s_cre_composite_5b | If Survey Range is 1..5 and importance >= 4, and gap <= .5, and correlation to repurchase >= 0.4, then Composite = 100 * (0.5- gap) * correlation. |
| s_cre_composite_6a | If Survey Range is 0..10 and importance >= [value], and gap <= [value], and correlation to [correlation question] >= [value], then Composite = 100 * ([value]- gap) * correlation. |
| s_cre_composite_6b | If Survey Range is 1..5 and importance >= [value], and gap <= [value], and correlation to [correlation question] is > [value], then Composite = 100 * ([value] - gap) * correlation. |
| s_normalize | If normalization is required due to the range of allowed values in the survey, then send a message to each strength object to normalize itself. |
| s_set_report | If the Strength composite is greater than the minimum value as set in the SWOT settings screen, then include this item as a potential strength. |
| s_val_gap | If the GAP <0, then set GAP = 0. |
| sat_cre_composite | The composite value is the SATISFACTION value. |
| sat_report | Append the description of the Importance Report in the Result Caveats window. |
| single_survey_validate | |
| srv_val_gen_xqt_1a | |
| srv_val_gen_xqt_1b | |
| srv_val_gen_xqt_2a | |
| srv_val_gen_xqt_2b | |

FIG. 51G

| RULE NAME | COMMENT |
|---|---|
| srv_val_gen_xqt_3a | |
| srv_val_gen_xqt_3b | |
| srv1_chk_max_q | If the maximum question number for Survey #1 is Null, then report this condition and prompt the user to continue. |
| srv1_chk_overall_sat_q | If this is a command which requires an "Overall Satisfaction" question on the survey, but the question number is not identified, then the error is reported to the user via the Request Caveats. |
| srv1_chk_product_q | If this is not a RAP command, and the Product Question number for Survey #1 was not identified, report it. |
| srv1_chk_recommend_q | If this is a command which requires a "Recommend" question on the survey, but the question number is not identified, then the error is reported to the user via the Request Caveats. |
| srv1_chk_repurchase_q | If this is a command which requires a "Repurchase" question on the survey, but the question number is not identified, then the error is reported to the user via the Request Caveats. |
| srv1_chk_survey_name | If the Survey #1 name is NULL (must not be for all commands), then report the problem and prompt the user for continuation. |
| srv1_chk_vendor_q | If this is not a RAP command, and the Vendor Question number for Survey #1 was not identified, report it. |
| srv2_chk_family_q | If the Family Question number for Survey #2 was not identified, report it. |
| srv2_chk_max_q | If the maximum question number for Survey #2 is Null, then report this condition and prompt the user to continue. |
| srv2_chk_overall_sat_q | If this is a command which requires an "Overall Satisfaction" question on the survey, but the question number is not identified, then the error is reported to the user via the Request Caveats. |
| srv2_chk_product_q | If the Product Question number for Survey #2 was not identified, report it. |
| srv2_chk_recommend_q | If this is a command which requires a "Recommend" question on the survey, but the question number is not identified, then the error is reported to the user via the Request Caveats. |

FIG. 51H

| Rule Name | Comment |
|---|---|
| srv2_chk_repurchase_q | If this is a command which requires a "Repurchase" question on the survey, but the question number is not identified, then the error is reported to the user via the Request Caveats. |
| srv2_chk_survey_name | If the Survey #2 name is NULL and required for the selected command, then report the problem and prompt the user for continuation. |
| srv2_chk_vendor_q | If the Vendor Question number for Survey # 2 was not identified, report it. |
| srv2_required | If the current activity is an Opportunity, Threat, or Validate command, then set the query_validation:srv2_required (survey 2 name is required) indicator to TRUE. |
| swot_chk_no_results | If no strength, weakness, opportunity, or threat results were generated, then report that fact in the results window. |
| SWOT_command_set | If a complex command has been selected, and the request type is Strength, Weakness, Opportunity or Threat, then set the SWOT_command indicator to TRUE to enable additional tests. |
| SWOT_overall_sat_req | If the algorithm chosen is "Client Satisfiers", "Corp. Baseline (Overall Sat)", or "Custom (Overall Satisfaction)", then set the 'Overall Satisfaction Required' flag to TRUE. |
| SWOT_recommend_req | If the algorithm chosen is "Custom (Recommend)", then set the 'Recommend Required' flag to TRUE. |
| SWOT_repurchase_req | If the algorithm chosen is "Repurchase Contributors", "Corp. Baseline (Repurchase)", or "Custom (Repurchase)", then set the 'Repurchase Required' flag to TRUE. |
| swot_result_count_init | Initialize the result counts of strength, weakness, opportunity, and threat objects to 0. |
| SWOT_use_MGAP | This rule sets the report type to be used for the SWOT analysis to MGAP. |
| SWOT_use_STAT | This rule sets the report type to be used for the SWOT analysis to STAT. |
| t_chk_min_answers | If the analysis type is Threat, the item is included as a result, and the item had less than the minimum valid answers, then the item text and the actual number are returned as caveats. |

FIG. 51I

| RULE NAME | COMMENT |
|---|---|
| t_chk_no_matches | If analysis type is Threat, and the number of weakness results is >0, and the number of strength results is >0, then report that no strength/weakness matches were found. |
| t_chk_no_results | If the analysis type is Threat, and no results were found, add an appropriate message to the results window and refer the user to the caveats. |
| t_chk_nonzero_s | If analysis type is Threat, and the number of strength results is 0, then report that fact as the reason that no Threats were generated. |
| t_chk_nonzero_w | If analysis type is Threat, and the number of weakness results is 0, then report that fact as the reason that no Threats were generated. |
| v_chk_decrease | If the responses to this distribution are not decreasing, then report this condition as a possible problem. |
| v_chk_distribution | Create an agenda object for survey validation, using the DISTRIBUTION report from RAP, and rule set RS. (Rule set needs to be updated!). |
| v_chk_EQ_0 | If the number of responses to this question is 0, then report this lack of responses as a possible problem. |
| v_chk_GT_50pct | If the number of responses to this question is greater than 50 percent, then report this concentration of responses as a possible problem. |
| v_chk_GT_5x | If the number of responses to this question is greater than 5 times the expected, where the expected is (100 percent/ number of categories), then report this concentration as a possible problem. |
| v_chk_increase | If the responses to this distribution are not increasing, then report this condition as a possible problem. |
| v_chk_LT_1divSTM | If the number of responses is less than the Expected / Sample_Threshold_Multiplier, then report this low value as a possible problem. Expected = (100 percent / number of categories). |
| v_chk_LT_5 | If the number of responses to this question is less than 5, then report this lack of responses as a possible problem. |
| v_chk_mgap_pairs | If the number of responses to this paired question is less than 90 percent of the total responses, then report this lack of responses as a possible problem. |

FIG. 51J

| RULE NAME | COMMENT |
|---|---|
| v_chk_response | If the number of responses to this question is less than 90 percent of the total for the questionnaire, then report this lack of responses as a possible problem. |
| v_chk_tot_resp | Check the results of the "Questionnaire Number" distribution, and include a result caveat if it is zero. |
| v_gen_init_1 | This rule creates the following operation for the generic validate:<br>    1. Distribution by Line of Business (Industry Sector)<br>    2. Execution of rule set: RS_xqt_validate_gen_1 to verify the results. |
| v_gen_init_2a | This rule creates the following operation for the generic validate:<br>    1. Distribution by Vendor (Vendor Name)<br>    2. Execution of rule set: RS_xqt_val_response to verify the results. |
| v_gen_init_2b | This rule creates the following operation for the generic validate:<br>    1. Distribution by Industry Sector<br>    2. Execution of rule sets to verify the results. |
| v_gen_init_2c | This rule creates the following operation for the generic validate:<br>    1. Distribution by Product Family<br>    2. Execution of rule sets to verify the results. |
| v_gen_init_2d | This rule creates the following operation for the generic validate:<br>    1. Distribution by Product Name<br>    2. Execution of rule sets to verify the results. |
| v_gen_init_2e | This rule creates the following operation for the generic validate:<br>    1. Distribution by Account Type<br>    2. Execution of rule sets to verify the results. |
| v_gen_init_2f | This rule creates the following operation for the generic validate:<br>    1. Distribution by Surveying Organization<br>    2. Execution of rule sets to verify the results. |

FIG. 51K

| RULE NAME | COMMENT |
|---|---|
| v_gen_init_2g | This rule creates the following operation for the generic validate:<br>1. Distribution by Subsidiary<br>2. Execution of rule sets to verify the results. |
| v_gen_init_2h | This rule creates the following operation for the generic validate:<br>1. Distribution by State<br>2. Execution of rule sets to verify the results. |
| v_gen_init_2i | This rule creates the following operation for the generic validate:<br>1. Distribution by Survey Module<br>2. Execution of rule sets to verify the results. |
| v_gen_init_3a | This rule creates the following operation for the generic validate:<br>1. Gap by Product Vendor for IMP: *Overall Satisfaction<br>2. Execution of rule set: RS_xqt_validate_gen_3 to verify the results. |
| v_gen_init_4a | This rule creates the following operation for the generic validate:<br>1. Distribution of "Purchase date of product"<br>2. Execution of rule sets: RS_xqt_val_response, RS_xqt_val_decrease. |
| v_gen_init_4b | This rule creates the following operation for the generic validate:<br>1. Distribution of "System installation date"<br>2. Execution of rule sets: RS_xqt_val_response, RS_xqt_val_decrease. |
| v_gen_init_5a | This rule creates the following operation for the generic validate:<br>1. MGAP report. |
| v_gen_init_5b | This rule creates the following operation for the generic validate:<br>1. Importance report<br>2. Execute rule set: RS_xqt_val_pairs to check pair responses vs total. |
| v_gen_init_5c | This rule creates the following operation for the generic validate:<br>1. Importance report<br>2. Execute rule set: RS_xqt_val_pairs to check pair responses vs total. |

FIG. 51L

| Rule Name | Comment |
|---|---|
| v_gen_init_Strength | This rule creates the following operation for the generic validate:<br>1. Gap by Product Vendor for IMP: *Overall Satisfaction<br>2. Execution of rule set: RS_xqt_validate_gen_4 to verify the results. |
| v_gen_init_X_distribution | This rule creates the following operation for the generic validate:<br>1. X-Distribution for Future Needs vs Overall Satisfaction<br>2. Execution of rule set: RS_xqt_validate_gen_5 to verify the results. |
| v_rep_decrease | Report that a check for DECREASING answers in a distribution is being peformed. |
|  |  |
| v_rep_EQ_0 | This rule indicates that a check for 0 responses is being performed. |
| v_rep_GT_50pct | This rule indicates that a check for high concentration (more than 50 percent of all responses) is being performed. |
| v_rep_GT_5x | Report that the check for more than 5 times the expected number of responses in a category is being peformed. |
| v_rep_increase | Report that a check for INCREASING answers in a distribution is being peformed. |
| v_rep_LT_1divSTM | This rule indicates that a check for low concentration (less than Expected/Sample Threshold Multiplier) is being performed. |
| v_rep_LT_5 | Report that the check for less than 5 answers in a category is being peformed. |
| v_rep_mgap_pairs | Report that the check for paired responses using MGAP is being peformed. |
| v_rep_response | This rule indicates that a check for question responses (compared to total responses) is being performed. |
| v_rep_STM | Add the current value of the Sample Threshold Multiplier to the Result Caveats. This value is used for all STM related queries in this command set. |
| v_rep_tot_resp | Report the total number of survey responses as part of the results. |
| v_set_previous_inc |  |
| v_set_tot_resp | Set the total responses for the survey. |

FIG. 51M

| RULE NAME | COMMENT |
|---|---|
| w_chk_ans_type | If ANSWERS is not numerical then report SATISFAX error # KM_022. |
| w_chk_gap_type | If GAP is not numerical then report SATISFAX error # KM_020. |
| w_chk_imp_type | If IMPORTANCE is not numerical then report SATISFAX error # KM_021. |
| w_chk_min_answers | If the analysis type is Weakness, the item is included as a result, and the item had less than the minimum valid answers, then the item text and the actual number are returned as caveats. |
| w_chk_no_results | If the analysis type is Weakness, and no results were found, add an appropriate message to the results window and refer the user to the caveats. |
| w_chk_sat_type | If SATISFACTION is not numerical then report SATISFAX error # KM_023. |
| w_cre_composite_1a | If survey range is 0..10 and importance >8 and gap>2 then Composite = importance * gap. |
| w_cre_composite_1b | If survey range is 1..5 and importance >4 and gap>1 then Composite = importance * gap. |
| w_cre_composite_2a | If the survey range is 0..10 and the correlation > 0, then the composite value is generated using: composite = answers * importance * gap * correlation. |
| w_cre_composite_2b | If the survey range is 1..5 and the correlation > 0, then the composite value is generated using: composite = answers * importance * gap * correlation. |
| w_cre_composite_3a | If survey range is 0..10 and importance > 8 and correlation to overall satisfaction > 0.4 and gap > 2 then Composite = 100 * importance * gap * correlation. |
| w_cre_composite_3b | If survey range is 1..5 and importance > 4 and correlation to overall satisfaction >= 0.4 and gap > 1 then Composite = 100 * importance * gap * correlation. |
| w_cre_composite_4a | If survey range is 0..10 And importance >= 8 and correlation to overall satisfaction >= 0.4 and gap > 1 then Composite = 100 * gap * correlation. |

FIG. 51N

| RULE NAME | COMMENT |
|---|---|
| w_cre_composite_4b | If survey range is 1..5 and importance >= 4 and correlation to overall satisfaction >= 0.4 and gap > 0.5 then Composite = 100 * gap * correlation. |
| w_cre_composite_5a | If survey range is 0..10 And importance >= 8 and correlation to repurchase >= 0.4 and gap > 1 then Composite = 100 * gap * correlation. |
| w_cre_composite_5b | If survey range is 1..5 and importance >= 4 and correlation to repurchase >= 0.4 and gap > 0.5 then Composite = 100 * gap * correlation. |
| w_cre_composite_6a | If survey range is 0..10 And importance >= [value] and correlation to [correlation question] >= [value] and gap > [value] then Composite = 100 * gap * correlation. |
| w_cre_composite_6b | If survey range is 1..5 and importance >= [value] and correlation to [correlation question] >= [value] and gap > [value] then Composite = 100 * gap * correlation. |
| w_normalize | If normalization is required due to the range of allowed values in the survey, then send a message to each weakness object to normalize itself. |
| w_set_report | If the Weakness composite is greater than the minimum value as set in the SWOT settings screen, then include this item as a potential weakness. |
| w_val_gap | If GAP <0 then set GAP = 0. |
| x_dist_chk_axis | If the command is X_distribution, then check that the x_axis and y_axis values are not Null. If either one is Null, then inform the user via request caveats. |

FIG. 51O

```
CLASS: Root
  INSTANCE: Global
  CLASS: Menu
    INSTANCE: menu_bar_1
    INSTANCE: menu_bar_2
    INSTANCE: menu_bar_3
    INSTANCE: menu_drop_file_1
    INSTANCE: menu_drop_file_2
    INSTANCE: menu_drop_view_3
    INSTANCE: menu_drop_view_1
  CLASS: DDE
    CLASS: DDEService
    CLASS: DDEProcess
      CLASS: DDETask
      CLASS: DDELink
  CLASS: Image
    CLASS: SlotView
      CLASS: OutputView
        CLASS: StateBox
        CLASS: Meter
          INSTANCE: Meter1
        CLASS: InputOutputView
          CLASS: ListBox
            CLASS: SingleListBox
              INSTANCE: SingleListBox1
              INSTANCE: SingleListBox2
              INSTANCE: SingleListBox3
              INSTANCE: SingleListBox4
            CLASS: ComboBox
              INSTANCE: ComboBox6
              INSTANCE: ComboBox5
              INSTANCE: ComboBox1
              INSTANCE: ComboBox2
              INSTANCE: ComboBox7
              INSTANCE: ComboBox8
              INSTANCE: ComboBox4
            CLASS: MultipleListBox
              INSTANCE: MultipleListBox3
              INSTANCE: MultipleListBox4
              INSTANCE: MultipleListBox1
          CLASS: Edit
            INSTANCE: Edit3
            INSTANCE: Edit2
          CLASS: Slider
            INSTANCE: Slider1
            INSTANCE: Slider2
            INSTANCE: Slider3
            INSTANCE: Slider4
            INSTANCE: Slider5
            INSTANCE: Slider6
            INSTANCE: Slider7
```

FIG. 52A

```
    INSTANCE: Slider8
  CLASS: CheckBox
  CLASS: CheckBoxGroup
  CLASS: RadioButtonGroup
      INSTANCE: RadioButtonGroup1
      INSTANCE: RadioButtonGroup8
      INSTANCE: RadioButtonGroup2
  CLASS: VBXControl
CLASS: Button
  INSTANCE: Button91
  INSTANCE: Button92
  INSTANCE: Button94
  INSTANCE: Button93
  INSTANCE: Button12
  INSTANCE: Button1
  INSTANCE: Button3
  INSTANCE: Button5
  INSTANCE: Button6
  INSTANCE: Button7
  INSTANCE: Button8
  INSTANCE: Button9
  INSTANCE: Button4
  INSTANCE: Button10
  INSTANCE: Button11
  INSTANCE: Button13
  INSTANCE: Button16
  INSTANCE: Button17
  INSTANCE: Button18
  INSTANCE: Button19
  INSTANCE: Button20
  INSTANCE: Button21
  INSTANCE: Button22
  INSTANCE: Button23
  INSTANCE: Button24
  INSTANCE: Button25
  INSTANCE: Button26
  INSTANCE: Button28
  INSTANCE: Button27
  INSTANCE: Button29
  INSTANCE: Button30
  INSTANCE: Button31
  INSTANCE: Button32
  INSTANCE: Button14
  INSTANCE: Button2
  INSTANCE: Button15
  INSTANCE: Button34
  INSTANCE: Button33
  INSTANCE: Button35
  INSTANCE: Button36
  INSTANCE: Button37
  INSTANCE: Button38
  INSTANCE: Button39
```

FIG. 52B

```
      INSTANCE: Button40
      INSTANCE: Button41
      INSTANCE: Button42
      INSTANCE: Button43
      INSTANCE: Button44
      INSTANCE: Button45
      INSTANCE: Button46
   CLASS: Text
      INSTANCE: Text8
      INSTANCE: Text10
      INSTANCE: Text4
      INSTANCE: Text2
      INSTANCE: Text5
      INSTANCE: Text6
      INSTANCE: Text7
      INSTANCE: Text9
      INSTANCE: Text1
   CLASS: Transcript
      INSTANCE: Transcript4
      INSTANCE: Transcript1
      INSTANCE: Transcript3
      INSTANCE: Transcript5
      INSTANCE: Transcript6
      INSTANCE: Transcript7
      INSTANCE: Transcript8
      INSTANCE: Transcript9
   CLASS: LinePlot
   CLASS: Bitmap
      INSTANCE: Bitmap1
      INSTANCE: Bitmap2
      INSTANCE: Bitmap3
      INSTANCE: Bitmap4
   CLASS: Drawing
CLASS: KWindow
   CLASS: KSession
      INSTANCE: SESSION
      INSTANCE: Config_editor
      INSTANCE: SATISFAX
      INSTANCE: Trans_Viewer
      INSTANCE: Script_Editor
      INSTANCE: Speed_Bar
      INSTANCE: SWOT_Editor
      INSTANCE: Explanation_Viewer
      INSTANCE: Trace
   CLASS: Setup
     INSTANCE: Satisfax
     INSTANCE: CSAT
     INSTANCE: RAP
     INSTANCE: RAPWORK
     INSTANCE: local
```

FIG. 52C

```
    INSTANCE: time_out_value
    INSTANCE: lpt1
    INSTANCE: lpt2
    INSTANCE: lpt3
CLASS: IM
  CLASS: SWOT
CLASS: Transactions
CLASS: Requests
  CLASS: complex_command
    INSTANCE: work2
CLASS: KM
  CLASS: KM_agenda
  CLASS: KM_requests
  CLASS: KM_results
    CLASS: survey_results
      CLASS: dist
      CLASS: stat
      CLASS: mgap
      CLASS: corr
    CLASS: SWOT_results
      CLASS: strength
      CLASS: weakness
      CLASS: opportunity
      CLASS: threat
    CLASS: RAP_results
  CLASS: inference_network
    CLASS: explain
    CLASS: rule_sets
      INSTANCE: RS_ver_analysis
      INSTANCE: RS_ver_RAP_cmd
      INSTANCE: RS_xqt_strength_1
      INSTANCE: RS_xqt_weakness_1
      INSTANCE: RS_xqt_threat_1
      INSTANCE: RS_xqt_opportunity_1
      INSTANCE: RS_xqt_strength_2
      INSTANCE: RS_xqt_strength_3
      INSTANCE: RS_xqt_strength_4
      INSTANCE: RS_xqt_strength_5
      INSTANCE: RS_xqt_strength_6
      INSTANCE: RS_ver_validate
      INSTANCE: RS_init_validate_gen
      INSTANCE: RS_post_validate
      INSTANCE: RS_xqt_opportunity_2
      INSTANCE: RS_xqt_opportunity_3
      INSTANCE: RS_xqt_opportunity_4
      INSTANCE: RS_xqt_opportunity_5
      INSTANCE: RS_xqt_opportunity_6
      INSTANCE: RS_init_strength_1
      INSTANCE: RS_init_strength_2
      INSTANCE: RS_init_strength_3
      INSTANCE: RS_init_strength_4
```

FIG. 52D

```
INSTANCE: RS_init_strength_5
INSTANCE: RS_init_strength_6
INSTANCE: RS_init_opportunity_1
INSTANCE: RS_init_opportunity_2
INSTANCE: RS_init_opportunity_3
INSTANCE: RS_init_opportunity_4
INSTANCE: RS_init_opportunity_5
INSTANCE: RS_init_opportunity_6
INSTANCE: RS_init_threat_1
INSTANCE: RS_init_threat_2
INSTANCE: RS_init_threat_3
INSTANCE: RS_init_threat_4
INSTANCE: RS_init_threat_5
INSTANCE: RS_init_threat_6
INSTANCE: RS_init_weakness_1
INSTANCE: RS_init_weakness_2
INSTANCE: RS_init_weakness_3
INSTANCE: RS_init_weakness_4
INSTANCE: RS_init_weakness_5
INSTANCE: RS_init_weakness_6
INSTANCE: RS_xqt_threat_2
INSTANCE: RS_xqt_threat_3
INSTANCE: RS_xqt_threat_4
INSTANCE: RS_xqt_threat_5
INSTANCE: RS_xqt_threat_6
INSTANCE: RS_xqt_weakness_2
INSTANCE: RS_xqt_weakness_3
INSTANCE: RS_xqt_weakness_4
INSTANCE: RS_xqt_weakness_5
INSTANCE: RS_xqt_weakness_6
INSTANCE: RS_post_strength
INSTANCE: RS_post_opportunity
INSTANCE: RS_post_threat
INSTANCE: RS_post_analysis
INSTANCE: RS_init_analysis
INSTANCE: RS_xqt_RAP_cmd
INSTANCE: RS_post_weakness
INSTANCE: RS_check_general_dist
INSTANCE: RS_xqt_overall_gap
INSTANCE: RS_xqt_importance
INSTANCE: RS_xqt_satisfaction
INSTANCE: RS_xqt_val_response
INSTANCE: RS_xqt_val_dist
INSTANCE: RS_xqt_val_pairs
INSTANCE: RS_init_HBM
INSTANCE: RS_init_importance
INSTANCE: RS_init_satisfaction
INSTANCE: RS_define
INSTANCE: RS_init_validate
INSTANCE: RS_xqt_val_increase
INSTANCE: RS_xqt_val_decrease
INSTANCE: RS_xqt_gap
```

FIG. 52E

```
            INSTANCE: RS_init_gap
            INSTANCE: RS_xqt_val_chk_tot_resp
      CLASS: query_analysis
         CLASS: query_execution
         CLASS: query_validation
   CLASS: DM
      CLASS: Report
         CLASS: RAP_Report_Parser
         CLASS: Survey_Data
            CLASS: Direct_Report
            CLASS: Gap_Mgap_Report
            CLASS: Dist_List
            CLASS: Corr_Report
            CLASS: Stat_Report
      CLASS: RAP_Activity_Manager
         CLASS: RAP_Batch_Interface
         CLASS: RAP_File_Manager
      CLASS: Correlation_Data
         CLASS: Correlation_Table_Manager
         CLASS: Correlation_Table
            CLASS: Question_String
               INSTANCE: question_obj
            CLASS: Survey_Xlation
               INSTANCE: WW1992
               INSTANCE: CS93
               INSTANCE: EUCS93
               INSTANCE: WW1993
               INSTANCE: CS94
               INSTANCE: JAPAN94
               INSTANCE: WW1994
               INSTANCE: CS95
               INSTANCE: SSD95
               INSTANCE: WW1995
               INSTANCE: CS96NA
               INSTANCE: CS96AP
               INSTANCE: SW95NA
               INSTANCE: WW1996
         CLASS: MakeMqa
            CLASS: mqa
               INSTANCE: mqaCS95
               INSTANCE: mqaWW1994
               INSTANCE: mqaWW1992
               INSTANCE: mqaCS93
               INSTANCE: mqaEUCS93
               INSTANCE: mqaWW1993
               INSTANCE: mqaCS94
               INSTANCE: mqaJAPAN94
               INSTANCE: mqaSSD95
               INSTANCE: mqaWW1995
               INSTANCE: mqaCS96NA
               INSTANCE: mqaCS96AP
               INSTANCE: mqaSW95NA
               INSTANCE: mqaWW1996
```

FIG. 52F

```
CLASS: Root
  INSTANCE: Global
  CLASS: Menu
    INSTANCE: menu_bar_1
    INSTANCE: menu_bar_2
    INSTANCE: menu_bar_3
    INSTANCE: menu_drop_file_1
    INSTANCE: menu_drop_file_2
    INSTANCE: menu_drop_view_3
    INSTANCE: menu_drop_view_1
  CLASS: DDE
    CLASS: DDEService
    CLASS: DDEProcess
      CLASS: DDETask
      CLASS: DDELink
  CLASS: Image
    CLASS: SlotView
      CLASS: OutputView
        CLASS: StateBox
        CLASS: Meter
          INSTANCE: Meter1
      CLASS: InputOutputView
        CLASS: ListBox
          CLASS: SingleListBox
            INSTANCE: SingleListBox1
            INSTANCE: SingleListBox2
            INSTANCE: SingleListBox3
            INSTANCE: SingleListBox4
          CLASS: ComboBox
            INSTANCE: ComboBox6
            INSTANCE: ComboBox5
            INSTANCE: ComboBox1
            INSTANCE: ComboBox2
            INSTANCE: ComboBox7
            INSTANCE: ComboBox8
            INSTANCE: ComboBox4
          CLASS: MultipleListBox
            INSTANCE: MultipleListBox3
            INSTANCE: MultipleListBox4
            INSTANCE: MultipleListBox1
        CLASS: Edit
          INSTANCE: Edit3
          INSTANCE: Edit2
        CLASS: Slider
          INSTANCE: Slider1
          INSTANCE: Slider2
          INSTANCE: Slider3
          INSTANCE: Slider4
          INSTANCE: Slider5
          INSTANCE: Slider6
          INSTANCE: Slider7
          INSTANCE: Slider8
        CLASS: CheckBox
        CLASS: CheckBoxGroup
```

FIG. 53A

```
    CLASS: RadioButtonGroup
       INSTANCE: RadioButtonGroup1
       INSTANCE: RadioButtonGroup8
       INSTANCE: RadioButtonGroup2
    CLASS: VBXControl
CLASS: Button
    INSTANCE: Button91
    INSTANCE: Button92
    INSTANCE: Button94
    INSTANCE: Button93
    INSTANCE: Button12
    INSTANCE: Button1
    INSTANCE: Button3
    INSTANCE: Button5
    INSTANCE: Button6
    INSTANCE: Button7
    INSTANCE: Button8
    INSTANCE: Button9
    INSTANCE: Button4
    INSTANCE: Button10
    INSTANCE: Button11
    INSTANCE: Button13
    INSTANCE: Button16
    INSTANCE: Button17
    INSTANCE: Button18
    INSTANCE: Button19
    INSTANCE: Button20
    INSTANCE: Button21
    INSTANCE: Button22
    INSTANCE: Button23
    INSTANCE: Button24
    INSTANCE: Button25
    INSTANCE: Button26
    INSTANCE: Button28
    INSTANCE: Button27
    INSTANCE: Button29
    INSTANCE: Button30
    INSTANCE: Button31
    INSTANCE: Button32
    INSTANCE: Button14
    INSTANCE: Button2
    INSTANCE: Button15
    INSTANCE: Button34
    INSTANCE: Button33
    INSTANCE: Button35
    INSTANCE: Button36
    INSTANCE: Button37
    INSTANCE: Button38
    INSTANCE: Button39
    INSTANCE: Button40
    INSTANCE: Button41
    INSTANCE: Button42
    INSTANCE: Button43
    INSTANCE: Button44
```

FIG. 53B

```
    INSTANCE: Button45
    INSTANCE: Button46
  CLASS: Text
    INSTANCE: Text8
    INSTANCE: Text10
    INSTANCE: Text4
    INSTANCE: Text2
    INSTANCE: Text5
    INSTANCE: Text6
    INSTANCE: Text7
    INSTANCE: Text9
    INSTANCE: Text1
  CLASS: Transcript
    INSTANCE: Transcript4
    INSTANCE: Transcript1
    INSTANCE: Transcript3
    INSTANCE: Transcript5
    INSTANCE: Transcript6
    INSTANCE: Transcript7
    INSTANCE: Transcript8
    INSTANCE: Transcript9
  CLASS: LinePlot
  CLASS: Bitmap
    INSTANCE: Bitmap1
    INSTANCE: Bitmap2
    INSTANCE: Bitmap3
    INSTANCE: Bitmap4
  CLASS: Drawing
CLASS: KWindow
  CLASS: KSession
    INSTANCE: SESSION
    INSTANCE: Config_editor
    INSTANCE: SATISFAX
    INSTANCE: Trans_Viewer
    INSTANCE: Script_Editor
    INSTANCE: Speed_Bar
    INSTANCE: SWOT_Editor
    INSTANCE: Explanation_Viewer
    INSTANCE: Trace
CLASS: Setup
  INSTANCE: Satisfax
  INSTANCE: CSAT
  INSTANCE: RAP
  INSTANCE: RAPWORK
  INSTANCE: local
  INSTANCE: time_out_value
  INSTANCE: lpt1
  INSTANCE: lpt2
  INSTANCE: lpt3
CLASS: IM
  CLASS: SWOT
CLASS: Transactions
  INSTANCE: TR_0
```

FIG. 53C

```
CLASS: Requests
  CLASS: complex_command
    INSTANCE: work2
    INSTANCE: REQ_0
CLASS: KM
  CLASS: KM_agenda
  CLASS: KM_requests
    INSTANCE: request_1
    INSTANCE: request_2
    INSTANCE: request_3
  CLASS: KM_results
    CLASS: survey_results
      CLASS: dist
      CLASS: stat
      CLASS: mgap
      CLASS: corr
    CLASS: SWOT_results
      CLASS: strength
        INSTANCE: s_result_1
        INSTANCE: s_result_2
        INSTANCE: s_result_3
        INSTANCE: s_result_4
        INSTANCE: s_result_5
        INSTANCE: s_result_6
        INSTANCE: s_result_7
        INSTANCE: s_result_8
        INSTANCE: s_result_9
        INSTANCE: s_result_10
        INSTANCE: s_result_11
        INSTANCE: s_result_12
        INSTANCE: s_result_13
        INSTANCE: s_result_14
        INSTANCE: s_result_15
        INSTANCE: s_result_16
        INSTANCE: s_result_17
        INSTANCE: s_result_18
        INSTANCE: s_result_19
        INSTANCE: s_result_20
        INSTANCE: s_result_21
        INSTANCE: s_result_22
        INSTANCE: s_result_23
        INSTANCE: s_result_24
        INSTANCE: s_result_25
        INSTANCE: s_result_26
        INSTANCE: s_result_27
        INSTANCE: s_result_28
        INSTANCE: s_result_29
        INSTANCE: s_result_30
        INSTANCE: s_result_31
        INSTANCE: s_result_32
        INSTANCE: s_result_33
        INSTANCE: s_result_34
        INSTANCE: s_result_35
```

FIG. 53D

```
            INSTANCE: s_result_36
            INSTANCE: s_result_37
            INSTANCE: s_result_38
            INSTANCE: s_result_39
            INSTANCE: s_result_40
            INSTANCE: s_result_41
            INSTANCE: s_result_42
            INSTANCE: s_result_43
            INSTANCE: s_result_44
            INSTANCE: s_result_45
            INSTANCE: s_result_46
            INSTANCE: s_result_47
            INSTANCE: s_result_48
            INSTANCE: s_result_49
            INSTANCE: s_result_50
            INSTANCE: s_result_51
            INSTANCE: s_result_52
            INSTANCE: s_result_53
         CLASS: weakness
         CLASS: opportunity
         CLASS: threat
      CLASS: RAP_results
   CLASS: inference_network
      CLASS: explain
         INSTANCE: explain_1
      CLASS: rule_sets
         INSTANCE: RS_ver_analysis
         INSTANCE: RS_ver_RAP_cmd
         INSTANCE: RS_xqt_strength_1
         INSTANCE: RS_xqt_weakness_1
         INSTANCE: RS_xqt_threat_1
         INSTANCE: RS_xqt_opportunity_1
         INSTANCE: RS_xqt_strength_2
         INSTANCE: RS_xqt_strength_3
         INSTANCE: RS_xqt_strength_4
         INSTANCE: RS_xqt_strength_5
         INSTANCE: RS_xqt_strength_6
         INSTANCE: RS_ver_validate
         INSTANCE: RS_init_validate_gen
         INSTANCE: RS_post_validate
         INSTANCE: RS_xqt_opportunity_2
         INSTANCE: RS_xqt_opportunity_3
         INSTANCE: RS_xqt_opportunity_4
         INSTANCE: RS_xqt_opportunity_5
         INSTANCE: RS_xqt_opportunity_6
         INSTANCE: RS_init_strength_1
         INSTANCE: RS_init_strength_2
         INSTANCE: RS_init_strength_3
         INSTANCE: RS_init_strength_4
         INSTANCE: RS_init_strength_5
         INSTANCE: RS_init_strength_6
         INSTANCE: RS_init_opportunity_1
         INSTANCE: RS_init_opportunity_2
```

FIG. 53E

```
INSTANCE: RS_init_opportunity_3
INSTANCE: RS_init_opportunity_4
INSTANCE: RS_init_opportunity_5
INSTANCE: RS_init_opportunity_6
INSTANCE: RS_init_threat_1
INSTANCE: RS_init_threat_2
INSTANCE: RS_init_threat_3
INSTANCE: RS_init_threat_4
INSTANCE: RS_init_threat_5
INSTANCE: RS_init_threat_6
INSTANCE: RS_init_weakness_1
INSTANCE: RS_init_weakness_2
INSTANCE: RS_init_weakness_3
INSTANCE: RS_init_weakness_4
INSTANCE: RS_init_weakness_5
INSTANCE: RS_init_weakness_6
INSTANCE: RS_xqt_threat_2
INSTANCE: RS_xqt_threat_3
INSTANCE: RS_xqt_threat_4
INSTANCE: RS_xqt_threat_5
INSTANCE: RS_xqt_threat_6
INSTANCE: RS_xqt_weakness_2
INSTANCE: RS_xqt_weakness_3
INSTANCE: RS_xqt_weakness_4
INSTANCE: RS_xqt_weakness_5
INSTANCE: RS_xqt_weakness_6
INSTANCE: RS_post_strength
INSTANCE: RS_post_opportunity
INSTANCE: RS_post_threat
INSTANCE: RS_post_analysis
INSTANCE: RS_init_analysis
INSTANCE: RS_xqt_RAP_cmd
INSTANCE: RS_post_weakness
INSTANCE: RS_check_general_dist
INSTANCE: RS_xqt_overall_gap
INSTANCE: RS_xqt_importance
INSTANCE: RS_xqt_satisfaction
INSTANCE: RS_xqt_val_response
INSTANCE: RS_xqt_val_dist
INSTANCE: RS_xqt_val_pairs
INSTANCE: RS_init_HBM
INSTANCE: RS_init_importance
INSTANCE: RS_init_satisfaction
INSTANCE: RS_define
INSTANCE: RS_init_validate
INSTANCE: RS_xqt_val_increase
INSTANCE: RS_xqt_val_decrease
INSTANCE: RS_xqt_gap
INSTANCE: RS_init_gap
INSTANCE: RS_xqt_val_chk_tot_resp
   CLASS: query_analysis
      CLASS: query_execution
      CLASS: query_validation
```

FIG. 53F

```
CLASS: DM
  CLASS: Report
    CLASS: RAP_Report_Parser
    CLASS: Survey_Data
      CLASS: Direct_Report
      CLASS: Gap_Mgap_Report
      CLASS: Dist_List
        INSTANCE: DCNAd200w4i208a5i74o75
      CLASS: Corr_Report
        INSTANCE: CCNAc191v1t995w4i208a5i74o75
      CLASS: Stat_Report
        INSTANCE: SCNAs1t995w4i208a5i74o75
    CLASS: RAP_Activity_Manager
      CLASS: RAP_Batch_Interface
      CLASS: RAP_File_Manager
  CLASS: Correlation_Data
    CLASS: Correlation_Table_Manager
    CLASS: Correlation_Table
      CLASS: Question_String
        INSTANCE: question_obj
      CLASS: Survey_Xlation
        INSTANCE: WW1992
        INSTANCE: CS93
        INSTANCE: EUCS93
        INSTANCE: WW1993
        INSTANCE: CS94
        INSTANCE: JAPAN94
        INSTANCE: WW1994
        INSTANCE: CS95
        INSTANCE: SSD95
        INSTANCE: WW1995
        INSTANCE: CS96NA
        INSTANCE: CS96AP
        INSTANCE: SW95NA
        INSTANCE: WW1996
    CLASS: MakeMqa
      CLASS: mqa
        INSTANCE: mqaCS95
        INSTANCE: mqaWW1994
        INSTANCE: mqaWW1992
        INSTANCE: mqaCS93
        INSTANCE: mqaEUCS93
        INSTANCE: mqaWW1993
        INSTANCE: mqaCS94
        INSTANCE: mqaJAPAN94
        INSTANCE: mqaSSD95
        INSTANCE: mqaWW1995
        INSTANCE: mqaCS96NA
        INSTANCE: mqaCS96AP
        INSTANCE: mqaSW95NA
        INSTANCE: mqaWW1996
```

FIG. 53G

METHOD AND APPARATUS FOR DETECTING AN ENDLESS LOOP IN A RULES-BASED EXPERT SYSTEM

CROSS REFERENCE TO CO-PENDING APPLICATIONS

The present application is related to U.S. patent application Ser. No. 08/937,024, filed Sep. 23, 1997, entitled "Survey Analysis System and Method"; U.S. patent application Ser. No. 08/937,025, filed Sep. 23, 1997, entitled "Method and Apparatus for Warning a User of Potential Limitations of a Database Request and/or the Results Provided Thereby"; U.S. patent application Ser. No. 08/937,354, filed Sep. 23, 1997, entitled "Method and Apparatus for Using Prior Results When Processing Successive Database Requests"; U.S. patent application Ser. No. 08/937,351, filed Sep. 23, 1997, entitled "Method and Apparatus for Validating a Survey Database"; and U.S. patent application Ser. No. 08/937,352, filed Sep. 23, 1997, entitled "Method and Apparatus for Identifying the Coverage of a Test Sequence in a Rules-Based Expert System", all of which are assigned to the assignee of the present invention and incorporated herein by reference.

BACKGROUND OF THE INVENTION

1. Field of the Invention

The present invention generally relates to data processing systems, and more particularly relates to rules-based expert systems.

2. Description of the Prior Art

With the rapid advancement of modern electronics, data processing systems have found many new and useful applications. Today, almost every industry sector uses some form of data processing systems in its daily activities. The banking industry, for example, uses mainframe type data processing systems to maintain large accounting databases, and to manage the large number of banking transactions that occur every day. The manufacturing industry uses data processing systems to maintain process flows, and manage inventory. Engineering and scientific applications are self evident. Even in the home, personal computers have become widely used.

Numerous software programs exist to support each of these varying applications. Traditionally, most software is written using a conventional high level computer programming language such as FORTRAN, PASCAL, COBOL, C++, Visual Basic, etc. A common statement in all of these programming languages is some form of a conditional statement. One example of a conditional statement is an if-then type statement, and typically includes an if type clause and a corresponding then type clause. The if type clause usually has a corresponding expression, which if true, allows the execution of the then type clause. When using conventional programming languages, all statements including the conditional statements must be explicitly specified in the context of the overall program flow.

Recently, rules-based expert systems have gained popularity, and are particularly suited for certain applications. In a rules-based expert system, a number of rules are provided. Each rule is similar to a conditional statement in a conventional programming language. However, in a rules-based expert system, a special program called an inference engine is typically provided. The inference engine manages the rules and applies them as appropriate, rather than simply executing the rules in a strictly sequential manner as in a conventional computer programming language.

Typically, the inference engine applies the rules in an iterative manner. During a first pass, the inference engine typically sequentially executes a number of selected rules. For each rule, the inference engine determines if the expression of the if type clause is true. If the expression is found to be true, the corresponding then type clause is executed. Often, the then type clause executes statements that change a variable or parameter within the system. The inference engine maintains a listing of the updated parameters.

During a subsequent pass, the inference engine determines which of the rules have an expression of the if type clause that is dependent on one or more of the parameters in the listing of updated parameters. The inference engine re-executes only those rules, and again updates the listing of updated parameters. This is repeated until no parameters exist in the listing of updated parameters.

As can readily be seen, the precise flow of rule processing in a rules-based expert system can vary dramatically, depending on the particular interactions of the rules that are processed. The interactions between rules can be very difficult to predict, particularly since hundreds of rules may exist within the system. Thus, robust debug and product testing of rules-based expert systems can be difficult, time consuming, and tedious.

For these and other reasons, rules based expert systems may be particularly susceptible to errors caused by unforeseen interactions between rules, including those interactions that cause the system to become stuck in an endless loop. This may occur, for example, when the expression of the if type clause of a first rule is dependent upon a parameter that is changed by the statement of the then type clause of a second rule, and the if type clause of the second rule is dependent upon a parameter that is changed by the statement of the then type clause of the first rule. In this instance, the rules-based expert system may become stuck in an endless loop.

SUMMARY OF THE INVENTION

The present invention overcomes many of the disadvantages of the prior art by providing a method and apparatus for detecting an endless loop in a rules-based expert system. This is preferably accomplished by maintaining a count for each of the rules during rule processing. The count indicates the number of times a corresponding rule is executed by the rules based expert system. If the count corresponding to any of the rules exceeds a predetermined value, the rules-based expert system is determined to be stuck in an endless loop. When stuck in an endless loop, the present invention contemplates interrupting the rules-based expert system, and returning control to a calling program or to the user.

As described above, the rules-based expert system preferably includes an inference engine for processing the rules. When it is concluded that the rules-based expert system is stuck in an endless loop, the inference engine is interrupted, and control is passed back to the rules-based expert system.

Each of the rules preferably includes an if type clause which specifies an expression, and a then type clause which may include one or more statements. The then type clause is executed only if the expression of the if type clause is satisfied. In accordance with a preferred embodiment of the present invention, the then type clause preferably includes a statement that increments a counter for the corresponding rule. In this way, a counter value is maintained for selected rules in the system, and preferably all rules. The value stored in each rule counter is periodically compared to a predetermined value. If any of the counter values exceed the predetermined value, it is concluded that the rules based expert system is stuck in an endless loop, and the inference engine is interrupted.

More specifically, and during a first pass, the inference engine executes a number of selected rules. The count is incremented for each of the rules that have their then type clause executed. In addition, the rules-based expert system maintains a listing of updated parameters, wherein the listing of updated parameters includes those parameters that are changed by the execution of a then type clause of the selected rules.

During a second pass, the inference engine determines which of the number of rules have an if type clause that is dependent on one or more of the parameters in the listing of updated parameters. The inference engine then re-executes those rules, and updates the listing of updated parameters. The count is also updated for those rules that have their then type clause re-executed.

The inference engine continues to re-execute those rules that are determined to have an if type clause that is dependent on one or more of the parameters in the listing of updated parameters, update the listing of updated parameters, and increment the corresponding counters until either the listing of updated parameters becomes empty or the count corresponding to any of the number of selected rules exceeds a predetermined value.

It is contemplated that the present invention may be implemented either in hardware, software or a combination thereof. When implemented in hardware, a counting means may be provided for maintaining a count for each of a number of rules. A comparing means may be provided for comparing the count for each of the number of rules to a predetermined value. Finally, an interrupting means may be provided for interrupting the system if the count corresponding to any of the number of rules exceeds a predetermined value.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 15 is a diagram showing the resulting transaction viewer window after the execute.request button of FIG. 14 is depressed;

FIG. 19 is a table showing an illustrative correlation table;

FIG. 33 is a table showing the execution of an illustrative direct RAP request, with a problem detected in the request;

FIGS. 34A–34B show the execution of an illustrative direct RAP request, when no problems are detected in the request or when the user indicates that the request should be executed despite the detected problem;

FIGS. 35A–35B show the execution of an illustrative strength or weakness analysis, when problems are detected in the request;

FIGS. 36A–36C show the execution of an illustrative strength or weakness analysis, when no problems are detected in the request or when the user indicates that the request should be executed despite the detected problem;

FIGS. 37A–37C show the execution of an illustrative threat or opportunity analysis, when no problems are detected in the request or when the user indicates that the request should be executed despite the detected problem;

FIG. 38 is a table showing the execution of an illustrative survey validation request, with request problems detected;

FIGS. 39A–39B show the execution of an illustrative survey validation request, when no request problems are detected or when the user indicates that the request should be executed despite the detected problems;

FIG. 40 is a table showing the execution of an illustrative SWOT parameter update using the SWOT editor of FIG. 17;

FIG. 46A and FIG. 46B show an illustrative method for processing a number of rules using an inference engine in accordance with the present invention;

FIG. 49 is a table showing illustrative analysis types, and the corresponding rule sets that are associated therewith;

FIGS. 50A–50C show a table of preferred rule sets, and the corresponding rules that are associated therewith;

FIGS. 51A–51O show a table of preferred rule names along with corresponding rule comments;

FIGS. 52A–52F shows an illustrative listing of the object oriented database before any analysis runs are executed; and FIGS. 53A–53G shows an illustrative listing of the object oriented database before after a strength analysis type is executed.

DETAILED DESCRIPTION OF THE PREFERRED EMBODIMENTS

Figure 1:
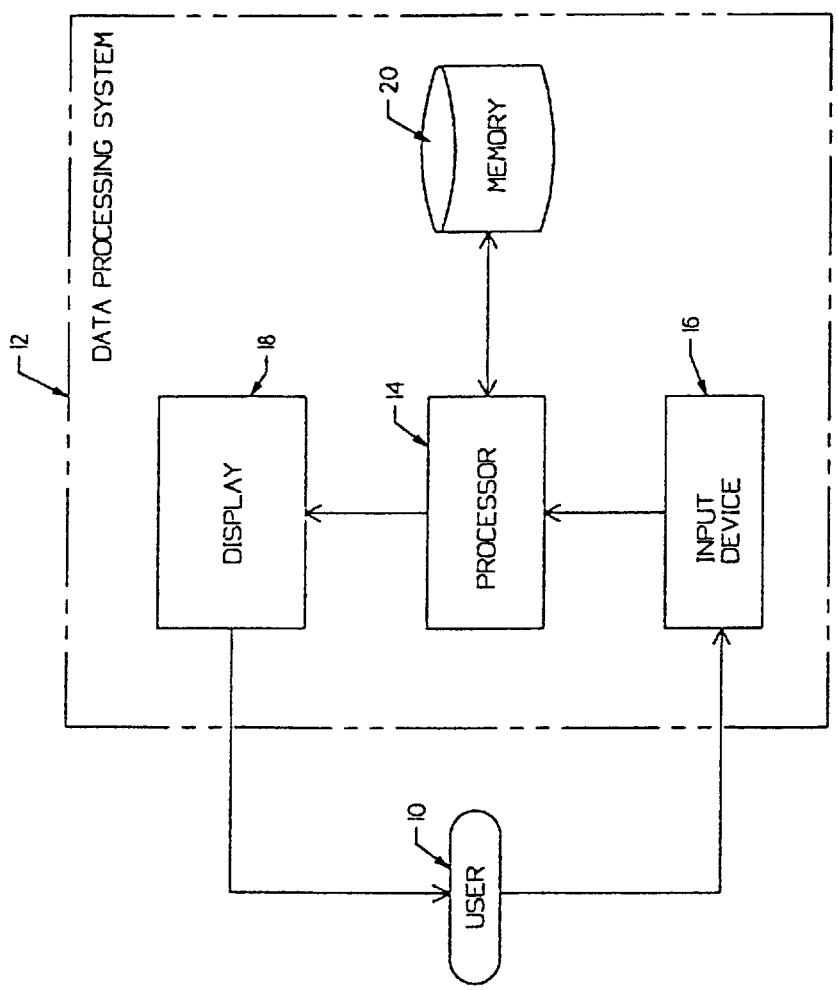
FIG. 1 is a block diagram of the computer-based environment of the present invention.

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers or the like. It should be kept in mind, however, that all of these and similar terms are to be associated with the appropriate physical quantities and are merely convenient labels applied to these quantities.

Furthermore, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, it should be kept in mind the distinction between the method of operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer system or other apparatus. In particular, various general purpose computer systems may be used with computer programs written in accordance with the teachings of the present invention, or it may prove more convenient to construct more specialized apparatus, to perform the required method steps. The required structure for such machines will be apparent from the description given below.

In sum, the present invention preferably is implemented for practice by a computer, e.g., a source code expression of the present invention is input to the computer to control operations therein. It is contemplated that a number of source code expressions, in one of many computer languages, could be utilized to implement the present invention. A variety of computer systems can be used to practice the present invention, including, for example, a personal computer, an engineering work station, an enterprise server, etc. The present invention, however, is not limited to practice on any one particular computer system, and the selection of a particular computer system (including a computer network) can be made for many reasons.

FIG. 1 is a block diagram of the computer-based environment of the present invention. A user 10 interacts with the data processing system 12, which includes a processor 14, which executes operating system software, as well as application programs including the present invention. The processor is found in all general purpose computers and almost all special purpose computers. The data processing system 12 is intended to be representative of a category of data processors suitable for supporting survey analysis operations. In the preferred embodiment, the data processing system 12 is an IBM compatible personal computer (PC) running Windows 3.1, 95 or NT.

The user 10 enters information into the data processing system by using a well-known input device 16, such as a mouse, keyboard, or a combination of the two devices. It should be understood, however, that the input device may actually consist of a card reader, magnetic or paper tape reader, or other well-known input devices (including another computer system). A mouse or other cursor control device is typically used as an input device as a convenient means to input information to the data processing system to select command modes, edit input data, and the like. Visual feedback is given to the user by showing characters, graphical symbols, windows, buttons or the like on display 18. The display is used to display messages and symbols to the user. Such a display 18 may take;the form of any of several well-known varieties of CRT displays. Display 18 may also be in the form of a printer, file storage system, magnetic tape, etc. The software executed by the processor 14 stores information relating to the operation thereof in memory 20. The memory may take the form of a semiconductor memory, magnetic disks, optical disks, magnetic tape or other storage device.

Figure 2:
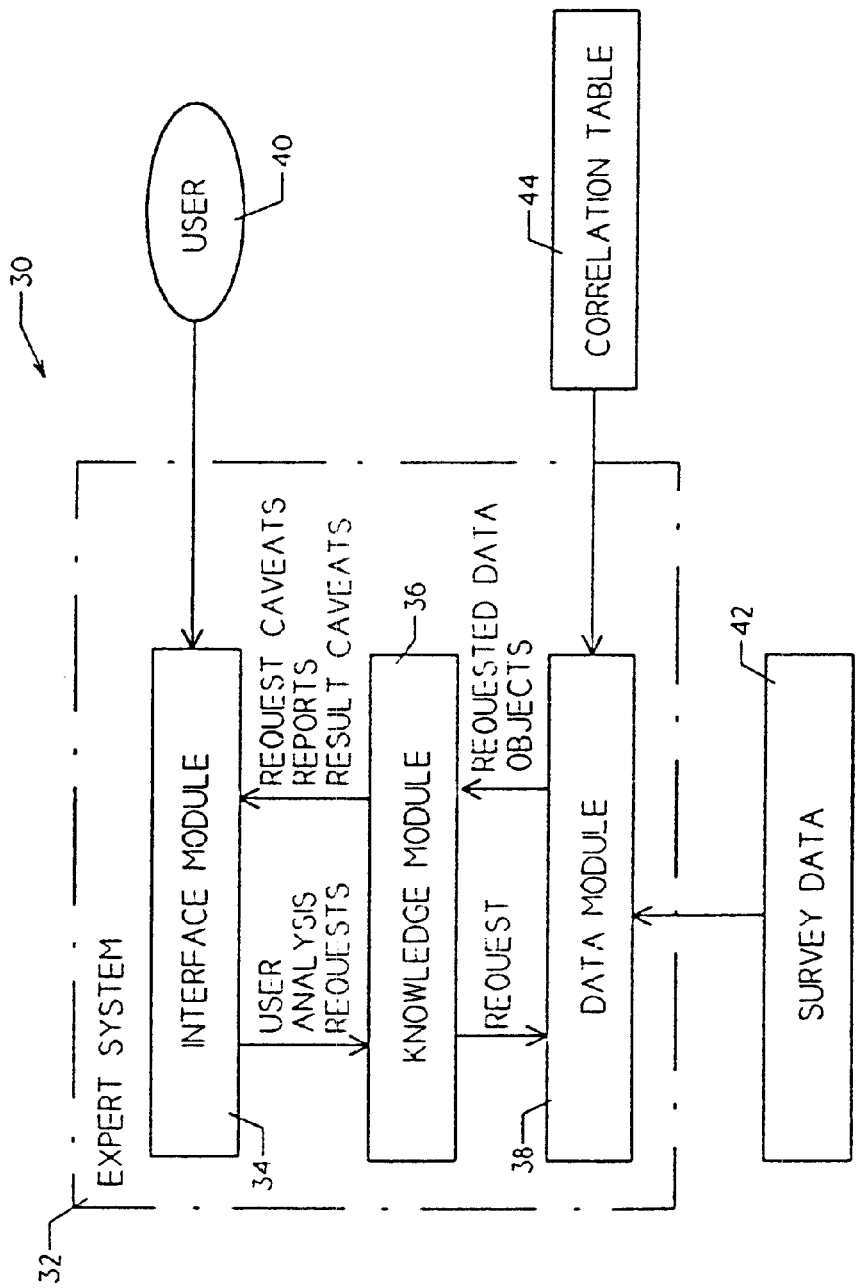
FIG. 2 is a block diagram showing a first illustrative embodiment of the present invention.

FIG. 2 is a block diagram showing a first illustrative embodiment of the present invention. The block diagram is generally shown at 30, and includes an expert system 32, which communicates with a survey database 42. The expert system 32 includes an interface module 34, a knowledge module 36, and a data module 38. A user 40 communicates with the system via interface module 34, as shown. The interface module 34 helps the user 40 assemble a user request, which is provided to knowledge module 36.

Knowledge module 36 checks the user request both for syntax and content. This is preferably done using an inference engine (not shown), which executes a number of rules. The rules contain "knowledge" provided by a number of, survey database analysis experts. Knowledge module 36 then stores a number of request caveats for later reference. The request caveats indicate if the user request provided by the interface module is a proper request based on the knowledge within the rules. Knowledge module 36 then assembles an appropriate survey request, and provides the request to data module 38.

Data module 38 accesses the survey database 42 and provides the requested data objects back to knowledge module 36. Knowledge module 36 processes the requested data objects and provides a number of reports back to interface module 34. Knowledge module 36 may also assemble a number of result caveats, and provide the result caveats to interface module 34. Knowledge module, 36 preferably processes the requested data objects using an inference engine within a rules-based expert system. The user 40 can view the request caveats, reports and result caveats via interface module 34.

When a number of survey results are included in survey database 42, it may be necessary to provide a correlation table 44 which correlates the various questions of each of the surveys. Data module 38 may read the correlation table 44, and determine the appropriate requested data objects therefrom. This may occur, for instance, when the request provided by knowledge module 36 requires access to survey data from two separate years. The surveys used during these two separate years may have different questions or the questions may be in a different order relative to one another. In this instance, correlation table 44 may provide a correlation between the survey questions in the various surveys.

In addition, it is contemplated that the interface module 34 may display a listing of the generic questions, which may be selected by the user when forming the user request. To determine the appropriate generic questions for a selected survey, the interface module may access the correlation table 44 via the data module, and retrieve the generic questions that correspond to the actual questions in the selected survey.

Once a user request is formed, the knowledge module 36 may access the correlation table 44 to identify the actual question numbers and the appropriate surveys that correspond to the generic questions provided in the user request. The data requests provided by the knowledge module 36 to the data module 38 preferably specify the actual questions numbers, and the corresponding survey names in the survey database 42 to access. The data requests provided by the knowledge module 36 thus may identify selected data elements within the survey database 42 for analysis.

The data module 38 accesses the survey database 42 and provides the resulting data objects to knowledge module 36. Knowledge module 36 determines the requested response and provides the results to interface module 34.

Figure 3:
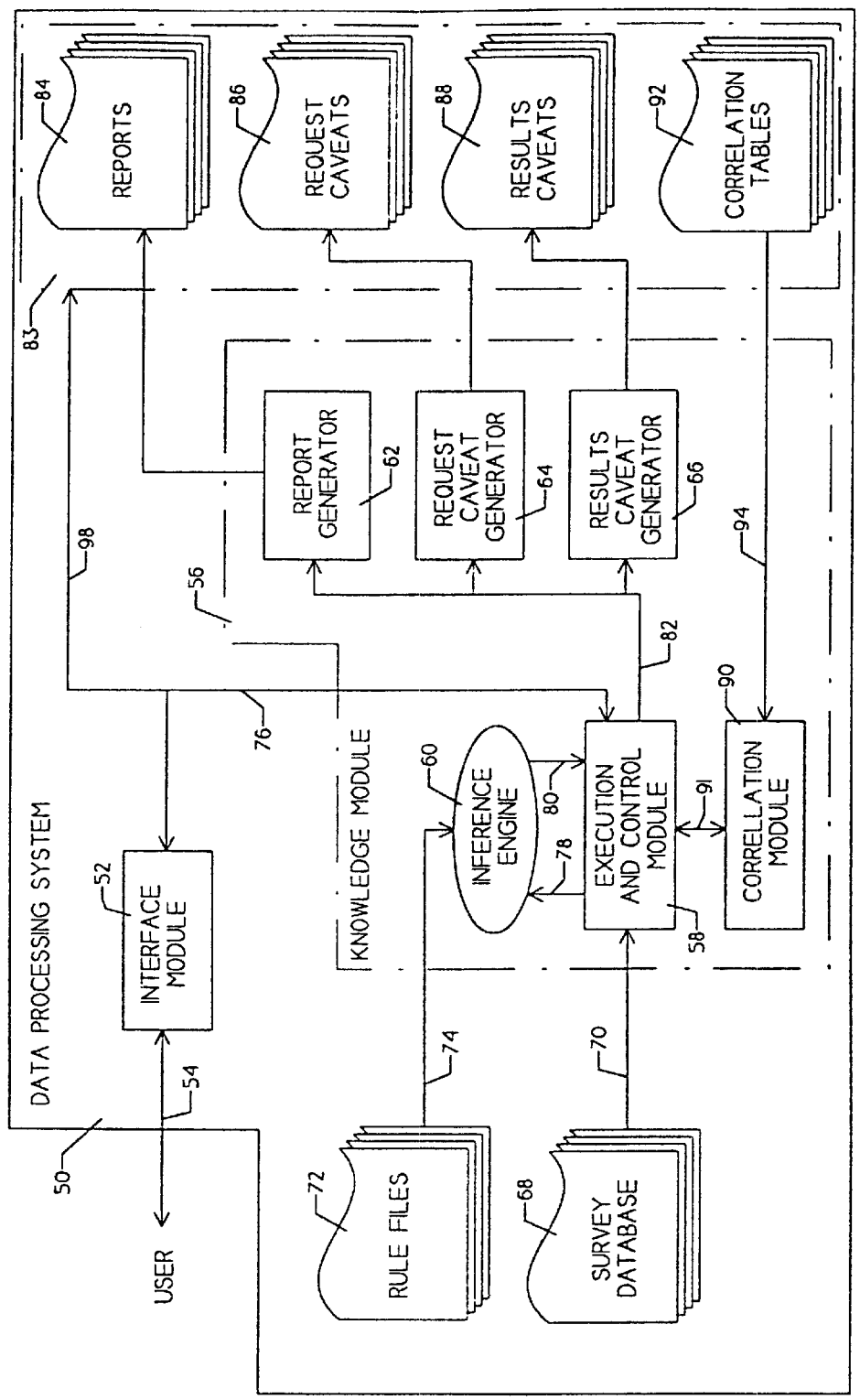
FIG. 3 is a block diagram showing an illustrative data processing system in accordance the present invention.

FIG. 3 is a block diagram showing an illustrative data processing system in accordance with the present invention. The data processing system includes an interface module 52, a knowledge module 56, and a file storage area 83. The interface module 52 communicates with a user via interface 54. The interface module 52 may aid the user in assembling a survey database request.

Interface module 52 provides the resulting request to execution and control module 58 of knowledge module 56. The execution and control module 58 may check the requests received from interface module 52 by initiating execution of a number of rules 72 via inference engine 60. That is, execution and control module 58 may initiate inference engine 60 via interface 78, wherein inference engine 60 may execute a number of rules to check the request. Execution and control module 58 may then receive the results from inference engine 60 via interface 80, wherein execution and control module 58 may assemble a number of request caveats. Execution and control module 58 provides these request caveats to request caveat generator 64 via interface 82. Request caveat generator 64 stores the request caveats in the file storage area 83, as shown at 86.

Execution and control module 58 may also read survey database 68 via interface 70. After the appropriate data elements are read from the survey database 68, execution and control module 58 may again direct inference engine 60 to execute a number of rules 72. The rules may generate the desired results, and may further check the validity of the results. Execution and control module 58 may then provide the results to report generator 62 via interface 82, and any result caveats to result caveat generator 66. Report generator 62 and result caveat generator 66 may store the reports 84 and result caveats 88 in the file storage area 83, respectively.

As indicated above, when a request from interface module 52 requires data from more than one survey, it may be desirable to correlate various questions of the various surveys. To do so, execution and control module 58 may provide a request to correlation module 90 via interface 91. Correlation module 90 may read correlation tables 92 via interface 94, and provide the desired correlation data between the various survey questions.

In addition, the interface module 52 preferably displays a listing of the generic questions for selection by the user when forming the user request. To determine the appropriate generic questions for a selected survey, the interface module 52 may access the correlation module 90 via execution and control module 58, and retrieve the generic questions that correspond to the actual questions in the selected survey.

Once a user request is formed, the knowledge module may identify the actual question numbers and the appropriate surveys that correspond to the generic questions provided in the user request. The data requests provided by the knowledge module, either directly or indirectly to the survey database, preferably specify the actual questions numbers and the corresponding surveys to access. The data requests provided by the knowledge module may thus identify selected data elements within the survey database for analysis.

Figure 4:
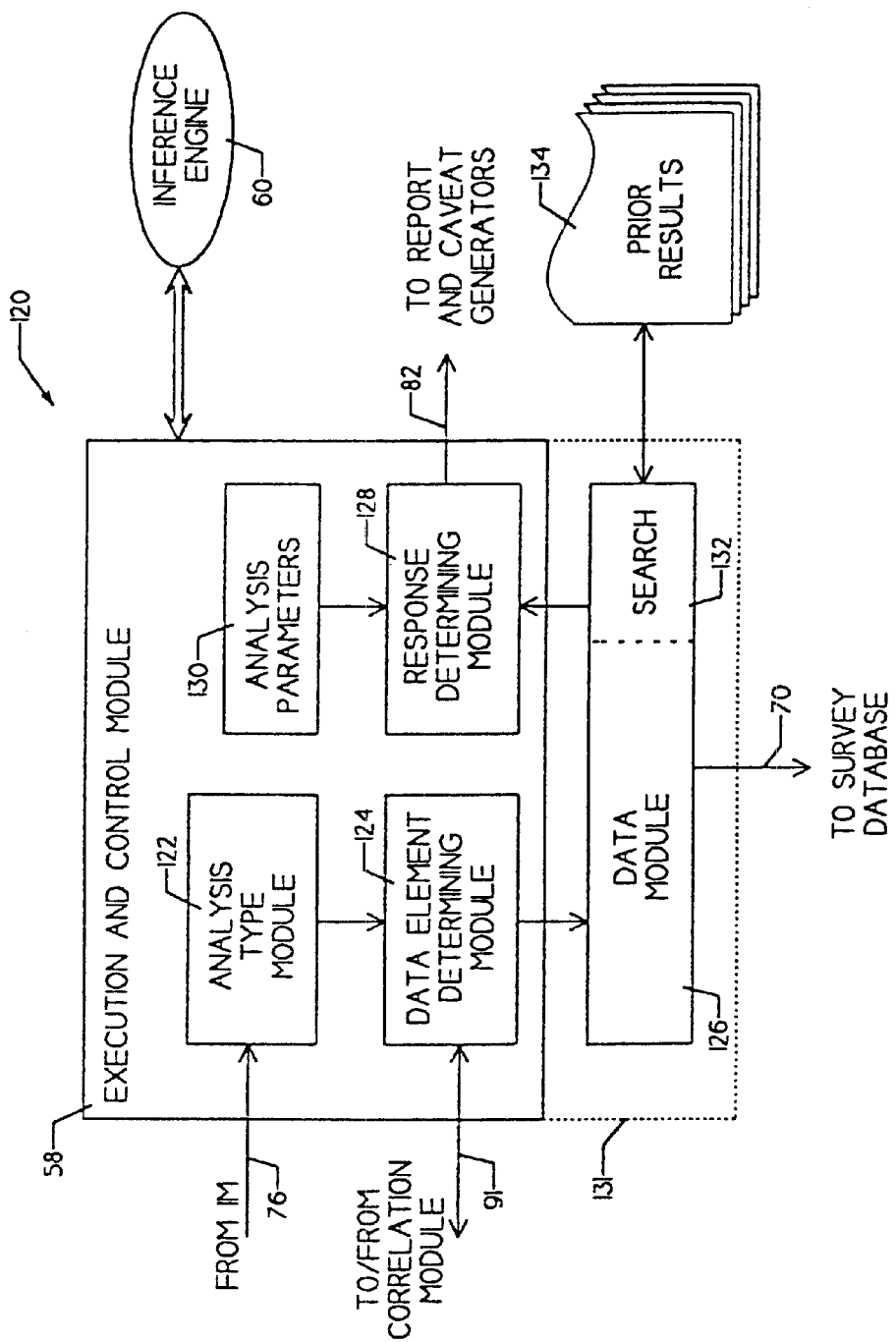
FIG. 4 is a block diagram showing in more detail the execution and control module 58 of FIG. 3.

FIG. 4 is a block diagram showing in more detail the execution and control module 58 of FIG. 3. The execution and control module 58 may include an analysis type module 122, a data element determining module 124, and a response determining module 128. The analysis type module 122 determines the analysis type of the user request provided by the interface module. In a preferred embodiment, the analysis types include a strength analysis type, a weakness analysis type, an opportunity analysis type, a threat analysis type, etc.

Once the analysis type is determined, data element determining module 124 determines which of the data elements in the survey database are to be accessed. For some requests, the request itself may identify the data elements to be accessed. That is, the user request may indicate which questions from which surveys are to be processed. For other requests, however, the correlation table may be required to identify the appropriate questions within each of the surveys.

Data element determining module 124 provides a corresponding request to data module 126, as shown. Data module 126 accesses the survey database and provides the resulting data objects to response determining module 128. Response determining module 128 determines the requested response and provides the results to the report and caveat generators (see FIG. 3).

The desired response can be dependent upon a number of analysis parameters 130. In accordance with one feature of the present invention, the analysis parameters 130 are user programmable. It is contemplated that response determining module 128 may determine the appropriate response by executing a number of rules via inference engine 60. The analysis parameters 130 preferably are referenced by a number of these rules. Thus, the analysis parameters 130 may affect the results provided by the rules, and therefore, the response provided by response determining module 128.

For each request, data module 126 may store the results in prior results file 134. A search block 132 may be used to search the prior results file 134 before accessing the survey database. If a request from data element determining module 124 requires access to results that were already generated for a previous request, data module 126 may read the appropriate prior results file 134 and provide the appropriate results directly to response determining module 128. Because accessing the survey database may require more time than simply accessing the prior results file 134, this feature can save considerable time in processing a request. This is particularly true when data module 126 accesses the survey database via a survey analysis program, which must calculate and assemble a number of intermediate reports which are provided to response determining module 128.

Figure 5:
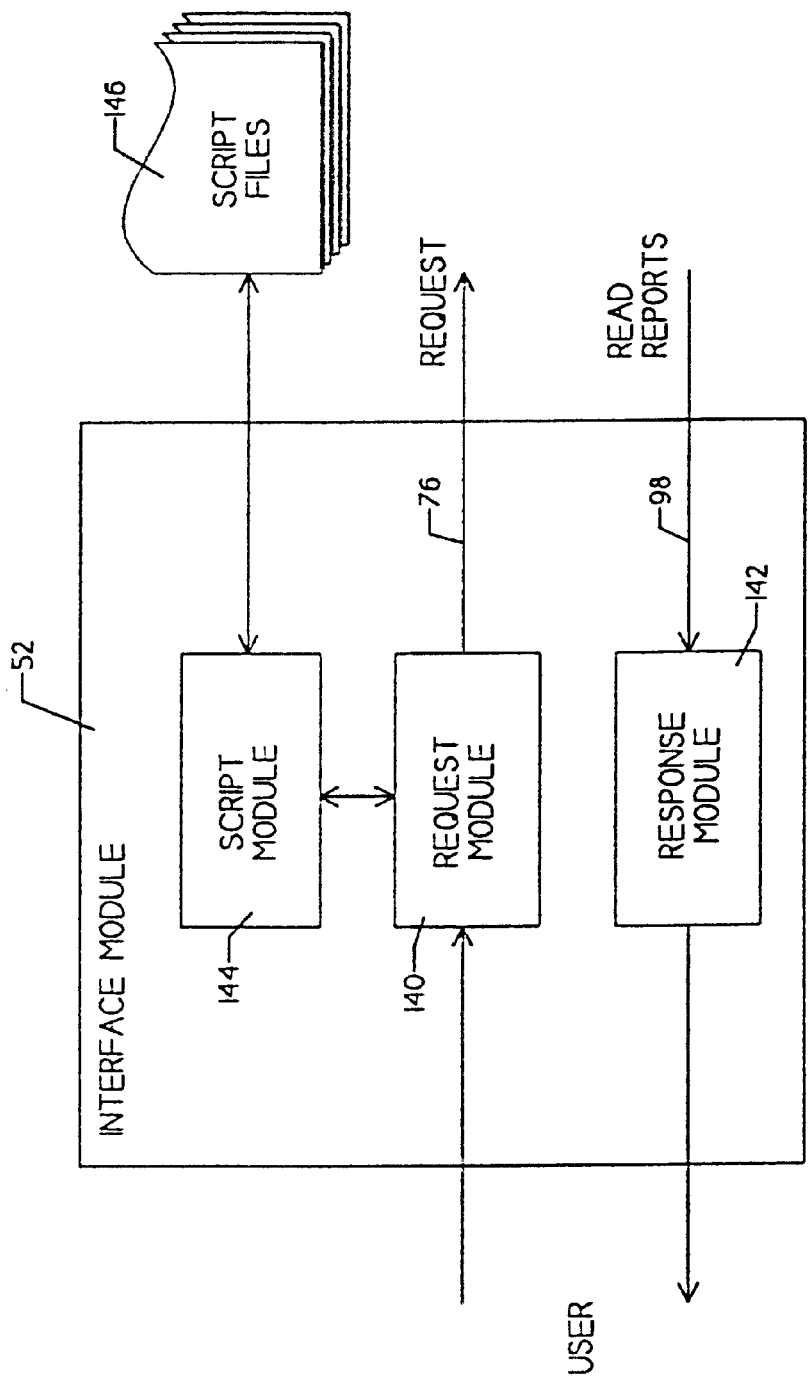
FIG. 5 is a block diagram showing in more detail the interface module 52 of FIG. 3.

FIG. 5 is a block diagram showing in more detail the interface module 52 of FIG. 3. Interface module 52 may include a request module 140, and a response module 142. The request module may aid the user in assembling the user requests which are provided to knowledge module 56 via interface 76. The response module 142 aids the user in reading and viewing the reports and various caveats received via interface 98.

It is contemplated that interface module 52 may include a script module 144. Script module 144 is preferably coupled to request module 140, as shown. In a scripting mode, request module 140 may provide the assembled user request to script module 144, rather than to knowledge module 56. Script module 144 may store a number of assembled user requests in a number of script files 146, as shown. Upon a user's command, the assembled requests within a script file 146 may then be provided to knowledge module 56 from request module 140 via interface 76.

Accordingly, this feature may allow a user to build a number of script files 146 without having to wait for the knowledge module to process the results. Thereafter, the user may execute all of the assembled requests within a script by simply executing one of the script files 146. The request module 140 may then sequentially provide the assembled user requests within a selected script file to the knowledge module 56 in a batch like mode.

Figure 6:
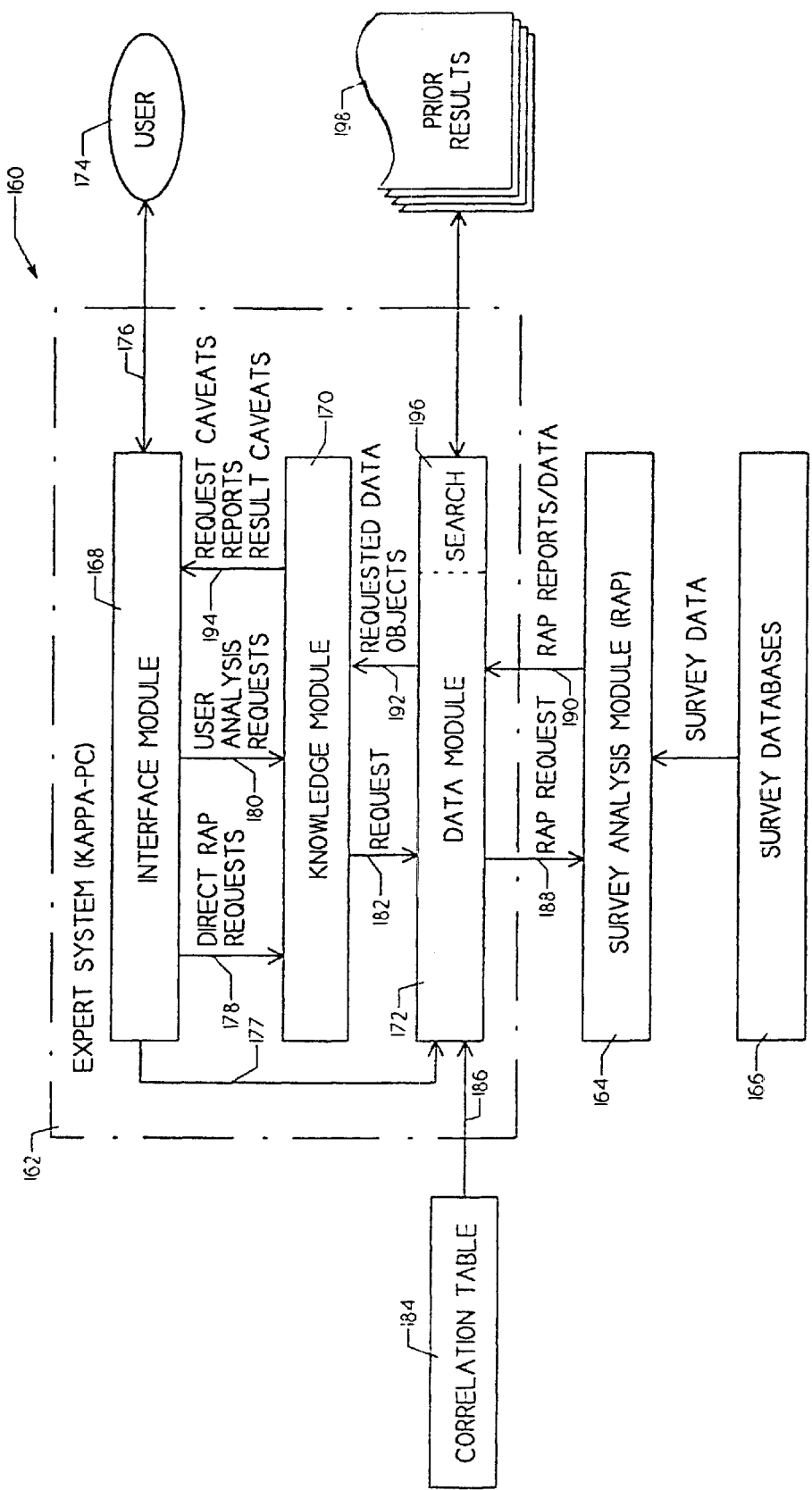
FIG. 6 is a block diagram showing a second illustrative embodiment of the present invention.

FIG. 6 is a block diagram showing a second illustrative embodiment of the present invention. In this embodiment, a rules based expert system is utilized. Rules are similar to conditional statements in a conventional computer program. However, rules are typically executed using an inference engine, which manages the application of the rules. A conventional program, by contrast, has to indicate explicitly when given conditional statements should be applied. The rules are defined by the application developer and are incorporated into the rules-based expert system.

The preferred rules based expert system is the KAPPA-PC programming environment. KAPPA-PC is available from IntelliCorp, Inc., and provides an object-oriented programming environment with an inference engine for rule-based reasoning. A further discussion of the KAPPA-PC programming environment can be found in the KAPPA-PC on-line help files, which are incorporated herein by reference.

The interface module 168, knowledge module 170 and data module 196 are all preferably implemented using the KAPPA-PC programming language KAL. The interface module 168 helps a user 174 assemble a desired survey request, and preferably includes all necessary objects and methods to interact with the user including all input screens, RAP command prompts, analysis processing values (object attributes), response windows, etc.

To help the user focus the requests, the interface module 168 may allow the user to select one of a number of surveys, and any number of certain questions from the selected survey. Because corresponding questions in selected surveys may differ from one survey to another, the interface module 168 preferably displays a listing of generic questions for selection by the user when forming the user request. To determine the appropriate generic questions for a selected survey, the interface module 168 may access the correlation table 184 via data module 172, and retrieve the generic questions that correspond to the actual questions in the selected survey.

After a request is assembled, the interface module 168 provides the user requests to knowledge module 170. Knowledge module 170 determines which RAP reports will be required to derive the desired result. Knowledge module 170 may also determine a number of request caveats, as described above. After determining which RAP reports are required to derive the desired result, the knowledge module 170 provides appropriate data requests to data module 172 via interface 182. Data module 172 provides the data requests to survey analysis module 164 via interface 188. Survey analysis module 164 executes the data requests. This typically includes accessing the survey database 166 and providing the requested RAP reports back to data module 172 via interface 190.

Data module 172 may then parse the RAP reports received from the survey analysis module 164, and provide a number of data objects to knowledge module 170. Knowledge module 170, using a number of rules, may then determine the requested results, and provide the requested results to interface module 168. Knowledge module 170 may also provide a number of result caveats to interface module 168 via interface 194. The user 174 may then view the request caveats, the desired results, and the result caveats.

In a preferred embodiment, the survey analysis module is implemented using the Research Analysis Program (RAP) available from Prognostics, Inc., located in Menlo Park, Calif. RAP is a software program developed by Prognostics to access a survey database and provide a number of reports. These reports include a correlation report, a distribution report, a GAP report, a multi-GAP report, etc. The RAP manual, available from Prognostics, Inc., describes these various reports, and is incorporated herein by reference.

Generally, the correlation report determines the correlation between the importance and/or satisfaction in one segment of the survey database with the importance and/or satisfaction in another. The distribution report provides the number of responses in a segment of the survey database. The GAP report identifies the gaps between the importance and satisfaction responses for a particular segment of the survey database. The multi-GAP report identifies the gaps between the importance and satisfaction responses for a range of questions in the survey database.

While these RAP reports can be useful in analyzing survey data, it has been found that more complex reports are often desired. To produce these more complex reports, it has been necessary to generate selected reports offered by the RAP program, and then manually calculate the desired data elements therefrom. This is often tedious and error prone, particularly since the desired reports may have to be updated each time a new survey database is received.

For those situations where the reports provided by the program are sufficient, the interface module 168 may allow a user 174 to provide direct RAP requests to knowledge module 170. Knowledge module 170 may pass the direct RAP requests to data module 172. Data module 172 may then pass the direct RAP requests to the RAP program 164. The RAP program may execute the direct RAP requests, and provide corresponding reports to data module 172. Data module 172 may then provide the reports to the interface module 168, via knowledge module 170. It is contemplated that the knowledge module 170 may generate request caveats and/or result caveats for the direct RAP requests.

For complex requests, interface module 168 may assemble a user request and provide the user request to knowledge module 170 via interface 180. Knowledge module 170 performs a check of the user request and provides a number of request caveats to interface module 168 via interface 194. Preferably, knowledge module 170 determines the request caveats by executing a number of rules using the inference engine within the KAPPA-PC environment.

Thereafter, the knowledge module 170 determines the appropriate data elements that are required to respond to the user request by executing a number of rules. The Knowledge Module may include references to a number of rules, some of which are generic (executed for each complex command), and others that are intended to be executed only for certain commands. For this reason, the knowledge module uses the KAPPA-PC notion of a rule-set for rule-based execution.

In addition, an object called "inference_network" may be provided in the object oriented database (see FIG. 52D and FIG. 53E). The inference_network objects may contain many multi-valued slots (lists), where each slot corresponds to a rule set. The list of rules to be executed in each instance may be stored in the slot name, and the knowledge module may determine which rule sets to invoke.

As indicated above, the user request provided by the interface module preferably includes the text of a generic question. To identify the actual question number within the selected survey, the knowledge module 170 may access the correlation table 184 via the data module 172. The correlation table may provide a cross-reference between the generic question text and the corresponding actual question numbers in each of the surveys. In this way, the knowledge module 170 may identify the data elements within the survey database that are required to respond to the user request. A further discussion of the correlation table 184 can be found with reference to FIG. 32.

The knowledge module 170 provides a number of data requests to data module 172, preferably identifying the appropriate data elements within the survey database. Data module 173 forwards the data requests to the survey analysis module 164, wherein the data requests are executed. The survey analysis module 164 provides a number of resulting reports to data module 172. In the preferred embodiment, the reports provided by the survey analysis module 164 are in an ASCII format. Data module 172 may parse the reports into a number of data objects, and provides the data objects to knowledge module 170.

Using the data objects, knowledge module 170 determines the requested results. Knowledge module 170 may also determine a number of result caveats. The results and result caveats may then be provided to interface module 168.

It is contemplated that data module 172 may store the data objects received from survey analysis module 164 in a prior results file 198. Once a request is received by data module 172 from knowledge module 170, data module 172 may search the prior results file 198 via search engine 196 to determine whether the requested data objects have already been generated and stored. If so, data module 172 may provide the requested data objects from prior results file 198 directly to knowledge module 170, rather than regenerating the data objects via survey analysis module 164. This may decrease the execution time for a corresponding request, particularly since the re-use of prior results objects can occur for different request types.

Figure 7:
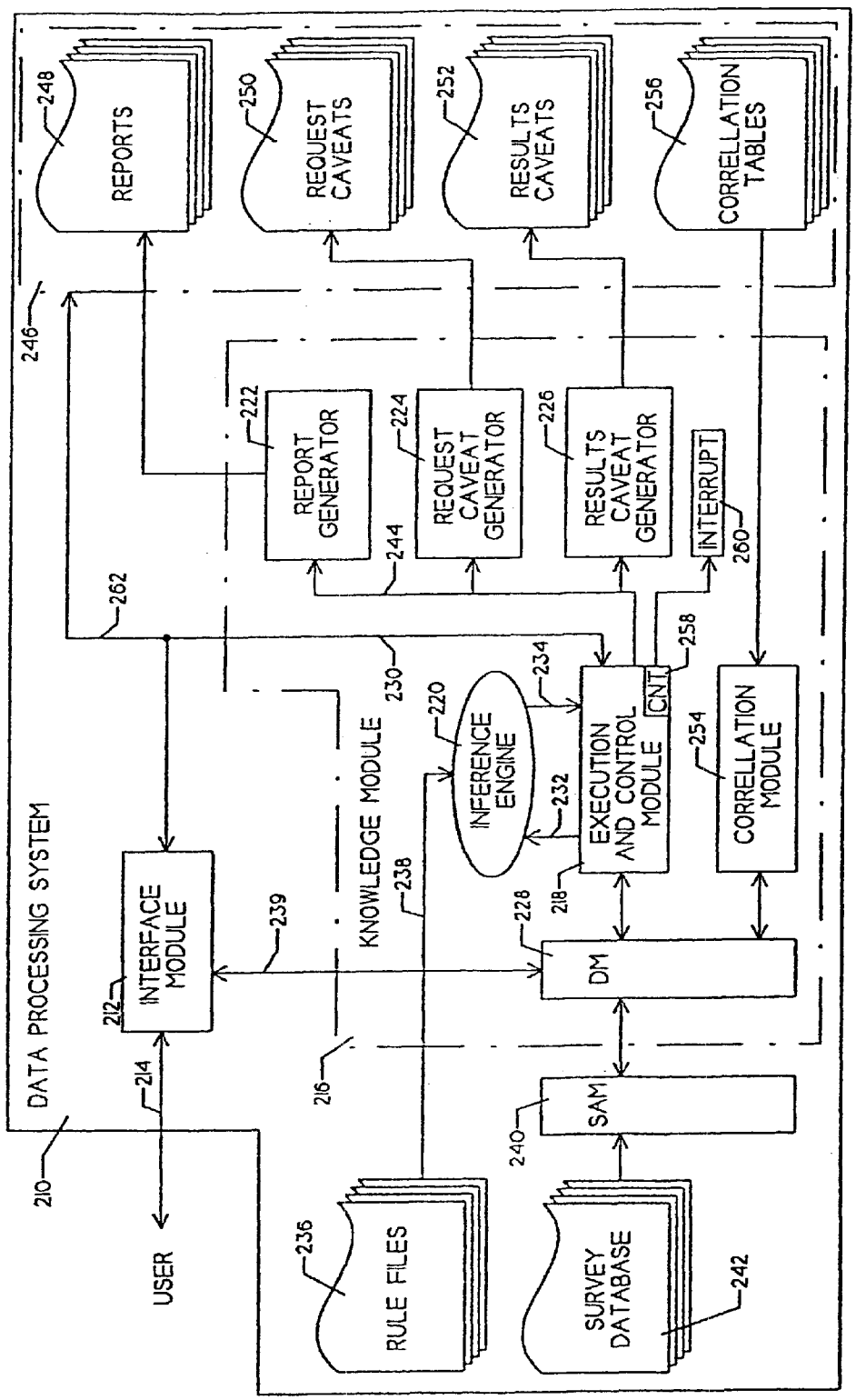
FIG. 7 is a block diagram showing an illustrative data processing system in accordance with another embodiment of the present invention.

FIG. 7 is a block diagram showing an illustrative data processing system 210 in accordance with another embodiment of the present invention. The data processing system 210 includes an interface module 212, a knowledge module 216, and a file storage area 246. The interface module 212 communicates with a user via interface 214. The interface module 212 aids the user in assembling survey database requests, as described above. Interface module 212 provides the resulting request to execution and control module 218 of knowledge module 216.

Preferably, execution and control module 218 checks the requests received from interface module 212 by initiating execution of a number of rules 236 via inference engine 220. That is, execution and control module 218 may provide a request to inference engine 220 via interface 232, wherein inference engine 220 may execute a number of selected rules. Execution and control module 218 may then receive the results from inference engine 220 via interface 234, wherein execution and control module 218 may determine a number of request caveats. Execution and control module 218 provides these request caveats to request caveat generator 224 via interface 244. Request caveat generator 224 stores the request caveats in the file storage area 246, as shown at 250.

Execution and control module 218 may also provide a corresponding request to data module 228. Data module 228 determines the appropriate requests to submit to survey analysis module 240. Survey analysis module 240 receives the requests from data module 228, and performs the requests on the survey database 242. The survey analysis module receives the results and provides the results to data module 228. Data module 228 forwards the results to execution and control module 218. It is contemplated that data module 228 may process the results prior to forwarding the results to execution and control module 218.

Execution and control module 218 may initiate execution of the inference engine 220 to check the results. The inference engine 220, by executing a number of the rules 236, may provide a number of result caveats. Execution and control module 218 may then either provide the results directly to report generator 222 via interface 244, or perform further processing on the results and provide those results to report generator 222. Also, execution and control module 218 may provide the result to result caveat generator 226. Report generator 222 and result caveat generator 226 may store reports 248 and result caveats 252 in the file storage area 246.

As indicated above, when a request from interface module 212 requires data from more than one survey, it may be desirable to correlate various questions of the various surveys. To do so, execution and control module 218 may provide a request to data module 228, which may then access correlation module 254. Correlation module 254 may read correlation tables 256, and provide the desired correlation data between the various survey questions.

In addition, the interface module 212 preferably displays a listing of the generic questions for selection by the user when forming the user request. To determine the appropriate generic questions for a selected survey, the interface module 212 may access the correlation module 254 via data module 228, and retrieve the generic questions that correspond to the actual questions in the selected survey.

Finally, to help detect when the inference engine is stuck in an endless loop, it is contemplated that a count block 258 may be provided. Count block 258 may include a number of count values, one for each of the rules in the system. The count block 258 is preferably located either in the inference engine 220 or in execution and control module 218. Count block 258 counts the number of times each rule or rule set is executed by inference engine 220.

Count block 258 may further include a comparator block for comparing the count value of each rule with a predetermined value. By including a comparator block, it can be determined if any rule is executed more than a predetermined number of times. If a rule or rule set is executed more than a predetermined number of times, the count block 258 may interrupt the inference engine 220 via interrupt block 260. This may provide an efficient way to detect when the inference engine 220 is stuck in a loop.

Figure 8:
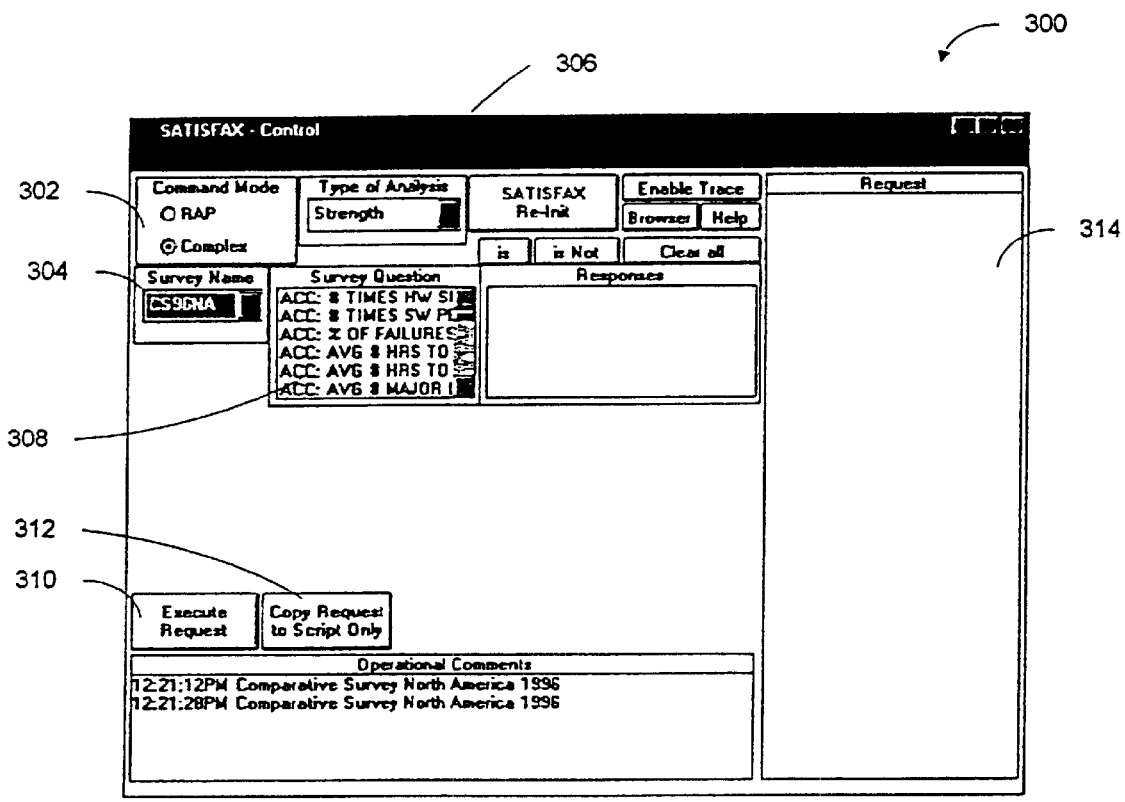
FIG. 8 is a diagram showing a preferred analysis control window in accordance with the present invention.

FIG. 8 is a diagram showing a preferred analysis control window in accordance with the present invention. The control window is generally shown at 300, and includes a number of regions. A first region is the command mode region 302. The command mode region 302 includes a direct RAP request selection and a complex request selection. The direct RAP request selection allows direct RAP requests to be provided to the research analysis program (RAP). When the direct RAP request is selected and the execute request button 310 is depressed, a direct RAP request is executed by RAP, and the corresponding RAP reports are generated.

In the illustrative diagram, the command mode region 302 shows the complex request mode selected. In this mode, analysis type region 306 provides a number of complex mode analysis types for selection (see, for example, FIG. 9). In the illustrative diagram, a strength type analysis is selected.

A survey name region 304 is also provided. The survey name region 304 allows a user to select one of a number of surveys from a survey database. In the illustrative diagram, a survey named CS96NA is selected. The survey question region 308 displays the survey questions that correspond to the selected survey. Preferably, the survey question region 308 displays a listing of generic questions that correspond to the actual question in the selected survey. This provides consistency to the questions listed in the survey question region 308, regardless of the selected survey. The user may identify one or more of the items in survey question region 308 to further focus the analysis. None are selected in the illustrative diagram of FIG. 8.

Figure 9:
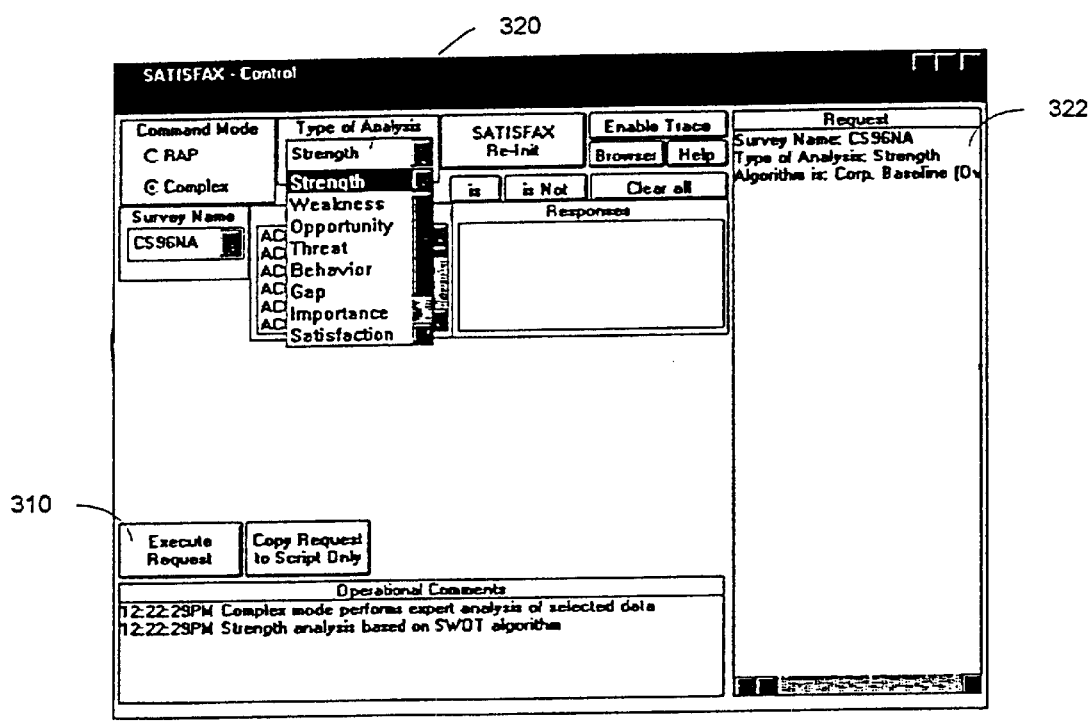
FIG. 9 is a diagram showing the preferred analysis control window of FIG. 8, with the type of analysis window expanded.

FIG. 9 is a diagram showing the analysis control window of FIG. 8, with the type of analysis region 306 expanded. As indicated above, a number of analysis types can be selected by the user. In the illustrative diagram, a strength analysis is selected, as shown at 320. The resulting request is shown in the request region 322. Other complex analysis types include weakness, opportunity, threat, behavior, GAP, importance, satisfaction, etc.

Figure 10:
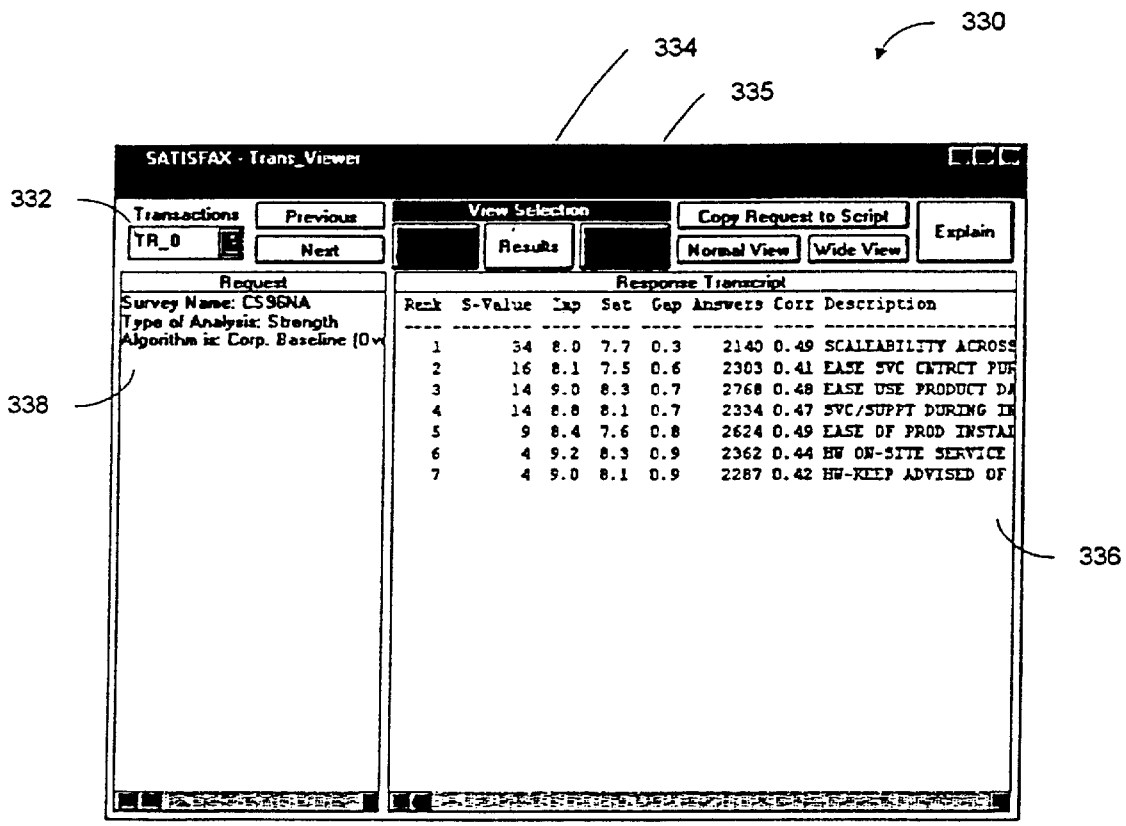
FIG. 10 is a diagram showing a preferred transaction viewer window, which is displaying the results of a strength type analysis.

FIG. 10 is a diagram showing a preferred transaction viewer window, which is displaying the results of the strength analysis request of FIG. 9. The execution of each request produces a transaction. The transaction viewer window 330 displays the results of each transaction. In the illustrative diagram, a transaction which has been given the name TR_0 is displayed, as shown at 332. The request information that was used to generate the transaction is shown in the request region 338. The request region 338 indicates that the results shown correspond to a strength type analysis, using a survey named CS96NA, and using the corporate baseline algorithm.

A view selection region is provided at 335. The results button 334 is shown highlighted, indicating that the results are shown in the response transcript region 336, rather than the request caveats or result caveats.

Figure 11:
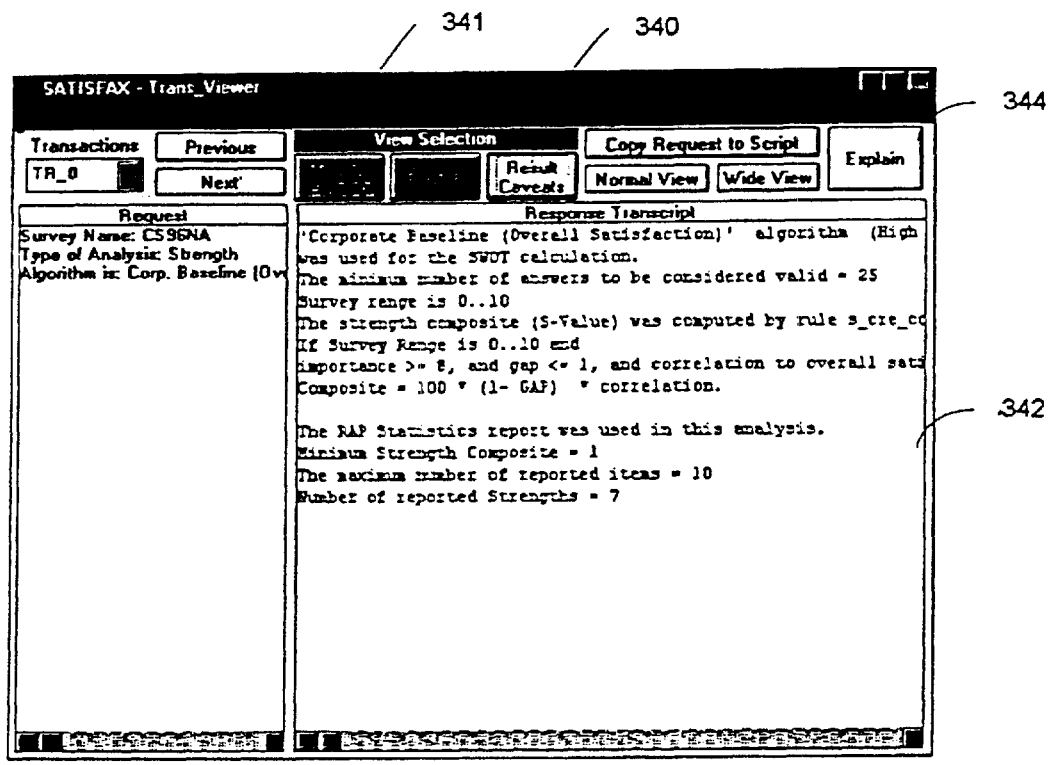
FIG. 11 is a diagram showing the transaction viewer window of FIG. 10, with the Result Caveats button selected.

FIG. 11 is a diagram showing the transaction viewer window of FIG. 10, with the Result Caveats button selected. When the result caveat button 340 is selected, the response transcript region 342 displays the result caveats for the selected transaction. The request caveat button 341, if selected, would display the request caveats for the selected transaction.

The transaction viewer window also may include an explain button 344, as shown. The explain button, when selected, displays the rule sets and rules that were activated by the inference engine during the execution of the selected transaction. The display provided by the explain button is further described with reference to FIG.

Figure 12:
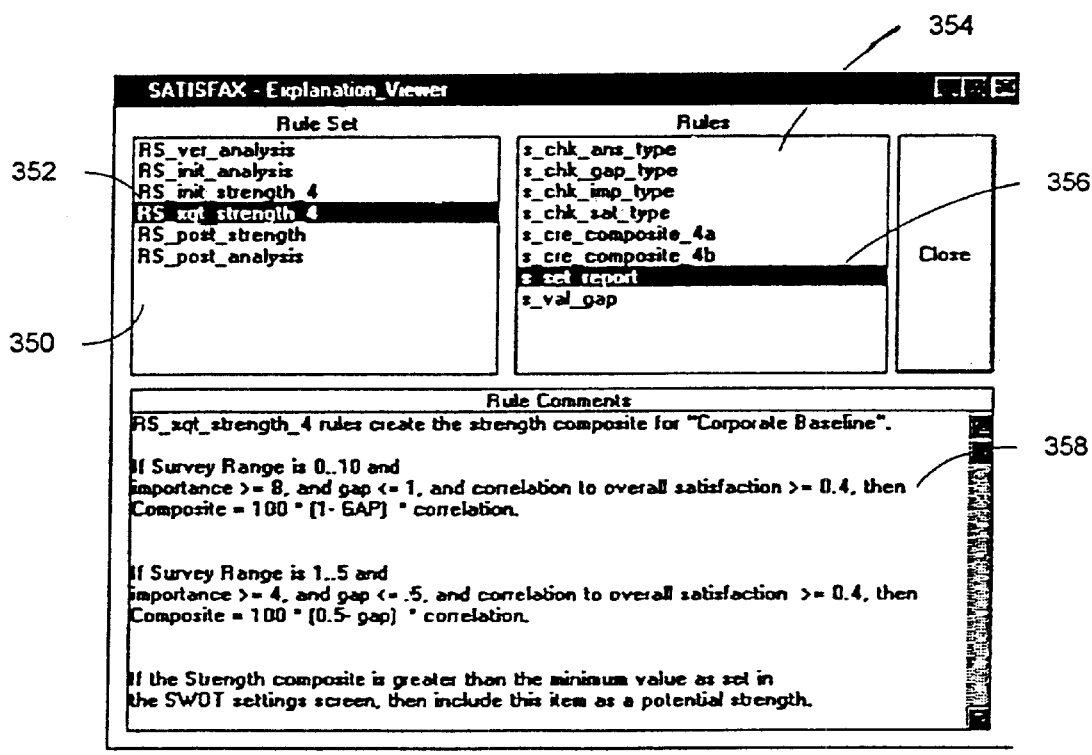
FIG. 12 is a diagram showing a preferred explanation viewer window.

FIG. 12 is a diagram showing an explanation viewer window. The explanation viewer window is activated by the explain button of the transaction viewer window (see, FIG. 11). The explanation viewer window has a rule set region 350 that shows the rule sets that were activated during a selected transaction. When a particular rule set is selected within the rule set region 350, such as RS_XQT_STRENGTH_4 as shown at 352, the rules within that rule set are displayed in rules region 354. For example, the rules in rule set RS_XQT_STRENGTH_4 are shown at 354.

By selecting a particular rule, for example, rule S_SET_REPORT as shown at 356, the corresponding comment for that rule is displayed in the rule comments region 358. Accordingly, the user can determine which rule sets and rules were activated for a selected transaction, and can further view the comments for each of the rules.

Each rule typically includes an IF clause, THEN clause, and a COMMENT. As indicated above, the comment is accessed through the Explain button by selecting a rule within a rule set. An "Explain" object instance is created for every transaction, and includes the list of rule sets invoked during the transaction.

Figure 13:
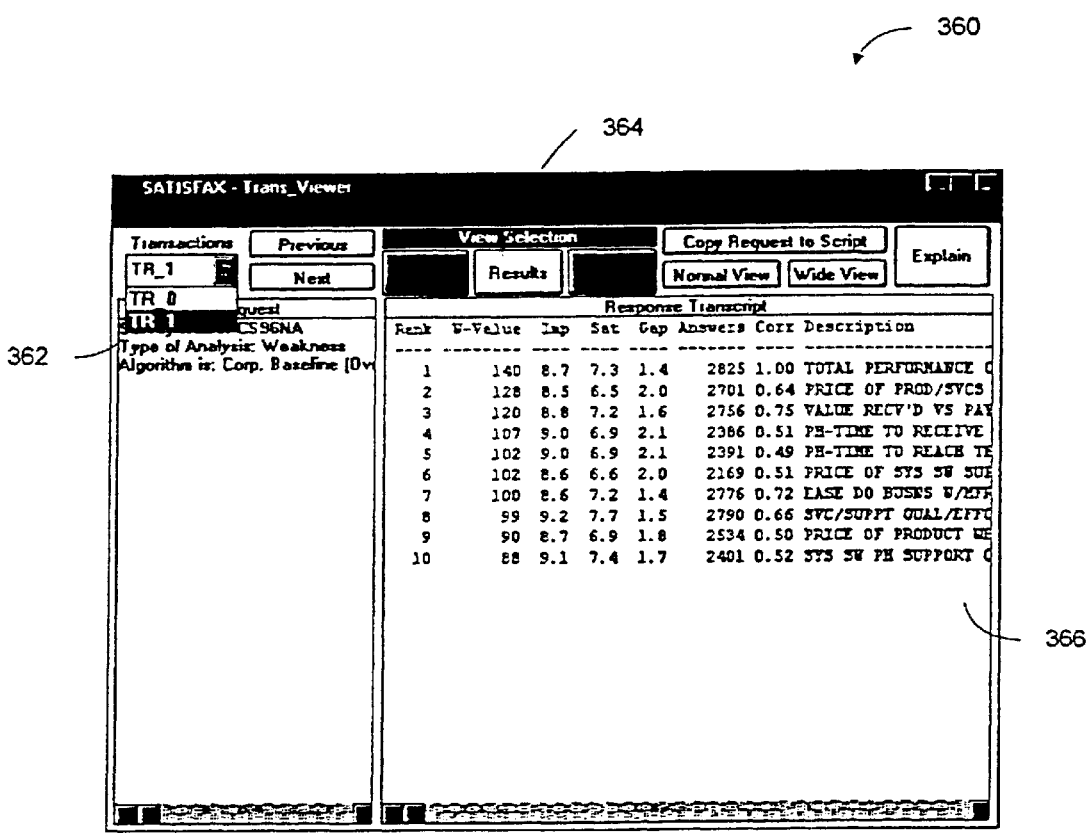
FIG. 13 is a diagram showing the preferred transaction viewer window of FIG. 10, after a subsequent weakness request has been executed.

FIG. 13 is a diagram showing the transaction viewer window of FIG. 10 after a subsequent weakness request is executed. The transaction region now shows two transactions including TR_0 and TR_1, with TR_1 selected. The corresponding results are shown at 366 in the response transcript region 366. By selecting the appropriate transaction in the transaction region, the corresponding results are displayed in the response transcript region 366.

Figure 14:
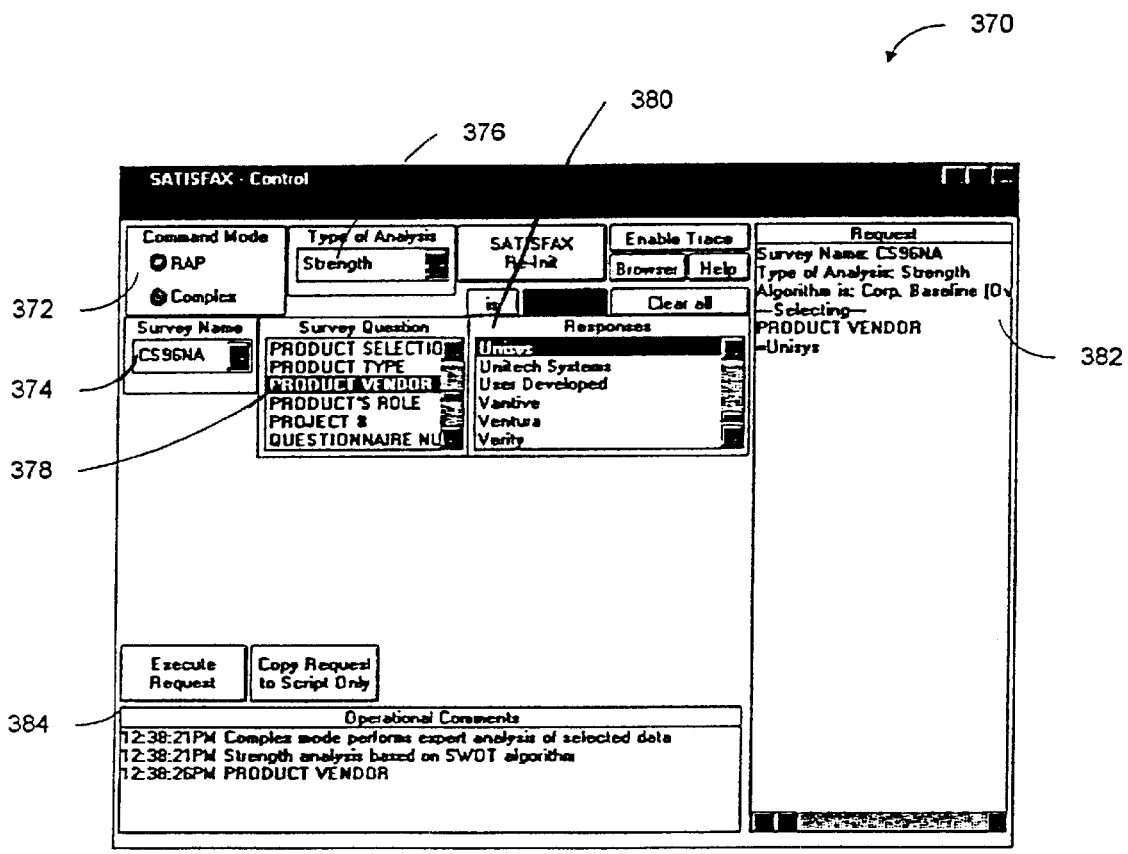
FIG. 14 is a diagram showing the preferred analysis control window of FIG. 8, with the survey question selected to be Product Vender, and a response of Unisys.

FIG. 14 is a diagram showing the analysis control window of FIG. 8, with the Product Vendor question selected. As can be seen, a complex request is selected at 372, and a strength analysis type is selected at 376. The survey name CS96NA is selected at 374, which provides a number of survey question selections in the survey question region. As indicated above, a number of generic questions are displayed in the survey question region.

In the illustrative diagram, the generic question "product vendor" is selected at 378. The available answers to the product vendor question for the survey CS96NA are displayed in the response region adjacent to the survey question region. The available answers are obtained by accessing a MQA routine. Preferably, the MQA routine accesses a MQA table that is provided by the survey database vendor. The MQA table stores the available answers to each question in a survey.

The user may select one or more of the product vendor responses. In the illustrative diagram, the UNISYS product vendor is selected at 380. The request region 382 displays the resulting request. The user may execute the request by depressing the Execute Request button 384.

Figure 15:
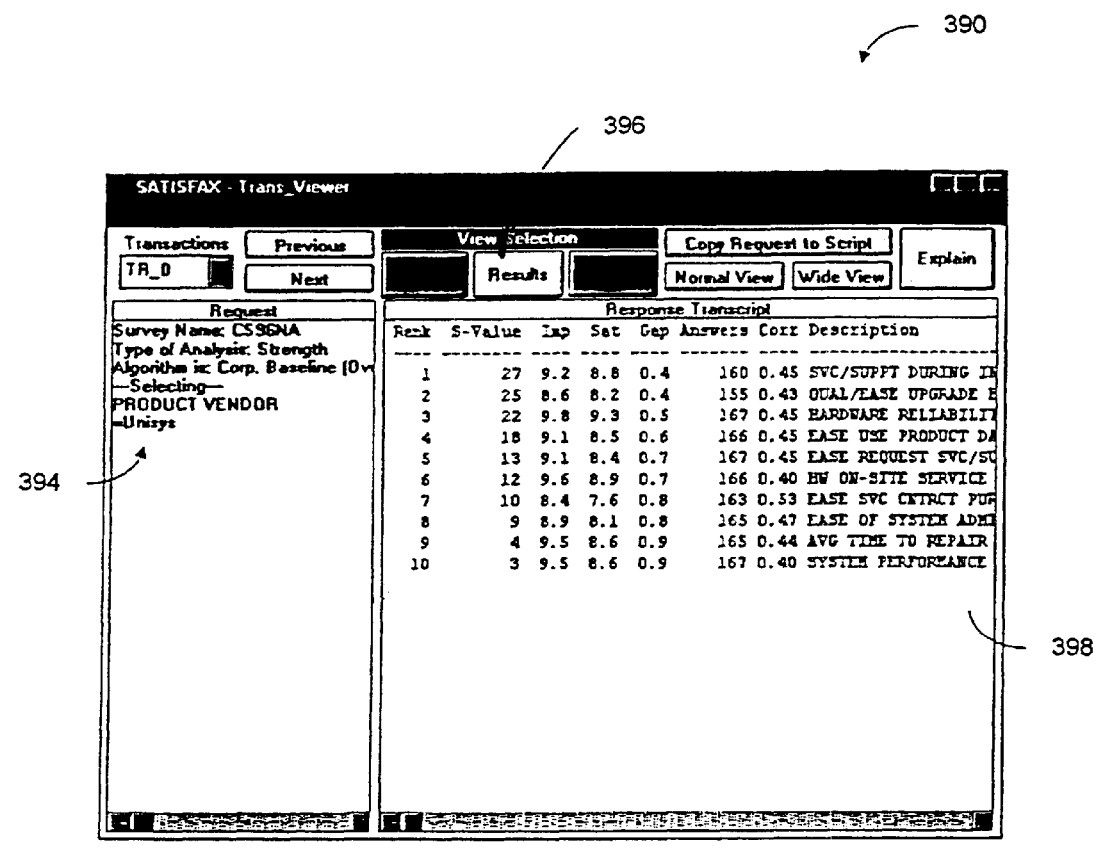

FIG. 15 is a diagram showing the resulting transaction viewer window after the execute request button of FIG. 14 is depressed. A description of the request is shown at 394, indicating that a product vendor of Unisys is selected. The corresponding results are shown in the response transcript region 398.

Figure 16:
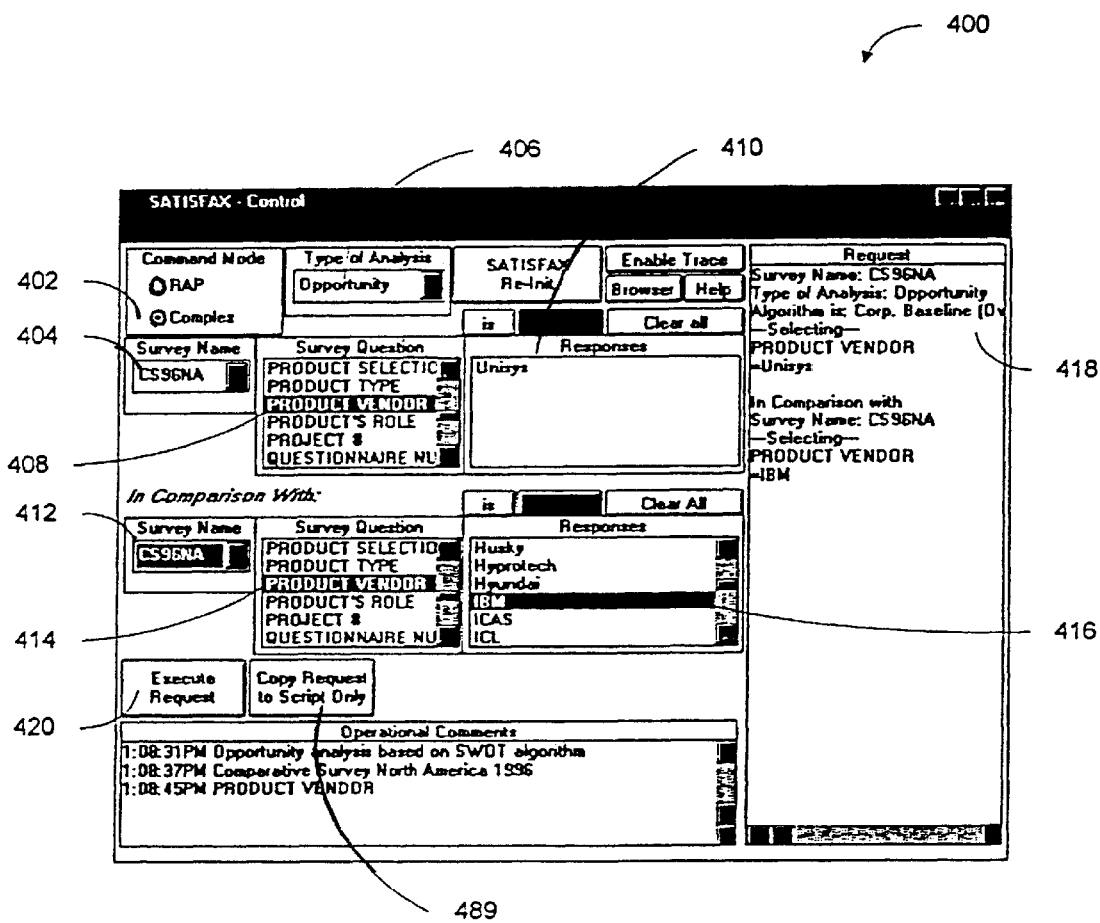
FIG. 16 is a diagram showing the preferred analysis control window with an opportunity analysis type selected.

FIG. 16 is a diagram showing an illustrative analysis control window with an opportunity analysis type selected. The complex request command mode is selected at 402, and an opportunity analysis type is selected as shown at 406. An opportunity analysis determines those areas that a particular vendor has an opportunity for gaining market share over other vendors. In the example shown, the primary request selects the survey name CS96NA at 404, and a Product Vendor of UNISYS at 408 and 410,, respectively.

The secondary request. selects survey CS96NA as shown at 412, and a Product Vendor of IBM at 414. The resulting opportunity request is shown in the request region 418.

If a product vendor is selected that is not in competition with, or is otherwise determined to be not compatible with UNISYS, for example, then the system may generate a request caveat indicating the incompatibility. In another example, if an opportunity request is assembled which compares two product types which are incompatible (like a main frame versus a PC), then the system may generate a request caveat indicating the incompatibility. It is contemplated that a user may select a different survey name, survey question and/or survey answer.

Figure 17:
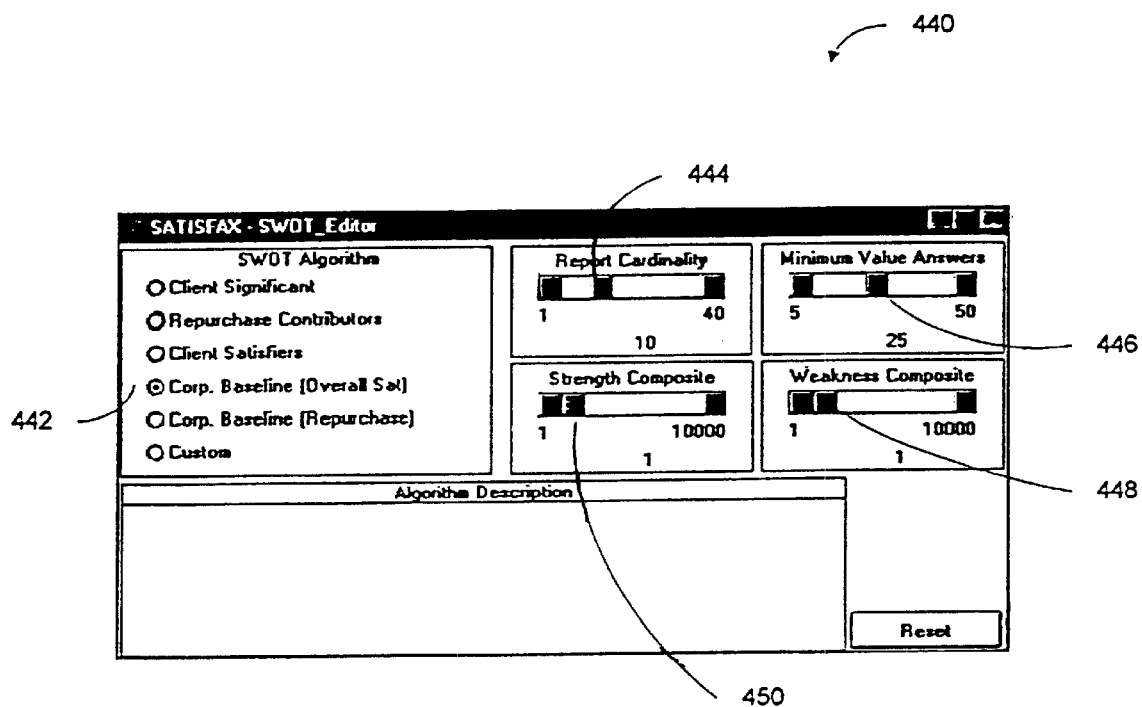
FIG. 17 is a diagram showing a preferred SWOT editor window for editing SWOT parameters.

FIG. 17 is a diagram showing a SWOT editor window for editing SWOT parameters. Preferably, some of the rules within the expert system have parameters or variables that can be set or changed by the user. The SWOT editor window 440 provides an interface for changing these variables and/or parameters. The SWOT editor window first allows a user to select one of a number of SWOT algorithms. The acronym "SWOT" refers to one of the Strength, Weakness, Opportunity or Threat analysis types.

The first SWOT algorithm shown is entitled client significant. The client significant algorithm (importance× satisfaction) analyzes the client satisfaction data using the hypothesis that the relationship between importance and satisfaction reveals whether the vendor is meeting the client's expectations. On the opposite end of the continuum, a client that rates a vendor low on both importance and satisfaction, thus having a low satisfaction and importance product, is indicating to the vendor that the vendor is systematically out of sync with the client's expectations. The result of the client significant algorithm is a continuum of questions ordered on the cumulative effect of the importance/satisfaction product, and allows the user to evaluate the need for changes in business unit strategy.

The second SWOT algorithm is entitled repurchase contributors. The repurchase contributors algorithm (using MGAP times correlation to repurchase, filtered for high importance, low GAP, and high correlation to purchase intent) provides the vendor with an analysis of the client's importance/satisfaction GAP and the correlation with the client's intent to repurchase the vendor's products. This algorithm uses only paired responses (questions that have both importance and satisfaction responses) to perform the analysis. The hypothesis used by this analysis type is that the most important things to improve are those things that correlate with the client's intent to repurchase.

The next algorithm selection is entitled client satisfiers. The client satisfiers algorithm (using MGAP times correlation to repurchase filtered for high importance, low GAP and high correlation to satisfaction) provides the vendor with the client's importance/satisfaction GAP in a particular area, and the correlation thereof with the client's overall satisfaction with the vendor. This algorithm also only uses paired responses to perform the analysis. The hypothesis of the client satisfiers analysis type is that the most important things to improve are those things that correlate with the client's overall satisfaction.

The next algorithm selection is entitled corporate baseline (overall satisfaction). The corporate baseline algorithm (overall satisfaction) uses the STAT GAP times correlation to repurchase filtered for high importance, low GAP, and high correlation to satisfaction. The corporate baseline algorithm (overall satisfaction) provides the vendor with the client's importance/satisfaction GAP, and the correlation thereof with the client's overall satisfaction with UNISYS. This algorithm uses all importance and satisfaction responses in the sample set in order to perform the analysis. The hypothesis of this analysis is that the most important areas to improve are those things that correlate with the client's overall satisfaction.

The next algorithm selection is;entitled corporate baseline (repurchase). The corporate baseline (repurchase) algorithm uses MGAP times correlation to repurchase filtered for high performance, low GAP, and high correlation to repurchase intent. The corporate baseline algorithm (repurchase) provides the vendor with the client's importance/satisfaction GAP, and the correlation thereof with the client's intent to repurchase the vendor's products. This algorithm uses all importance and satisfaction responses in the sample 'set in order to perform the analysis. The hypothesis is that the most important areas to improve are those things that correlate with the client's intent to repurchase.

The last algorithm selection is,entitled custom. The custom analysis type allows the vendor to configure the analysis based on various SWOT parameters including the correlation question, correlation cut-off, GAP, importance, etc.

The SWOT editor window 440 shows the corporate baseline (overall satisfaction) selected at 442. With this selected,, a number of corresponding system settings and/or parameters may be changed by the user, including the report cardinality 440, the minimum value answers 446, the strength composite 450, and the weakness composite 448. These parameters may be used by selected rules when a request is executed.

Each of the algorithms in the SWOT editor screen is assigned a unique number, X=1 . . . n, which corresponds with rule sets RS_init_strength_X, RS_xqt strength_X, etc. Each algorithm therefore may have an unlimited number of rules associated with initialization and execution in order to generate the desired composite value. The "Custom" or "build-your-own" algorithm uses the values from the SWOT Editor objects as parameters in the rules associated with that selection.

Figure 18:
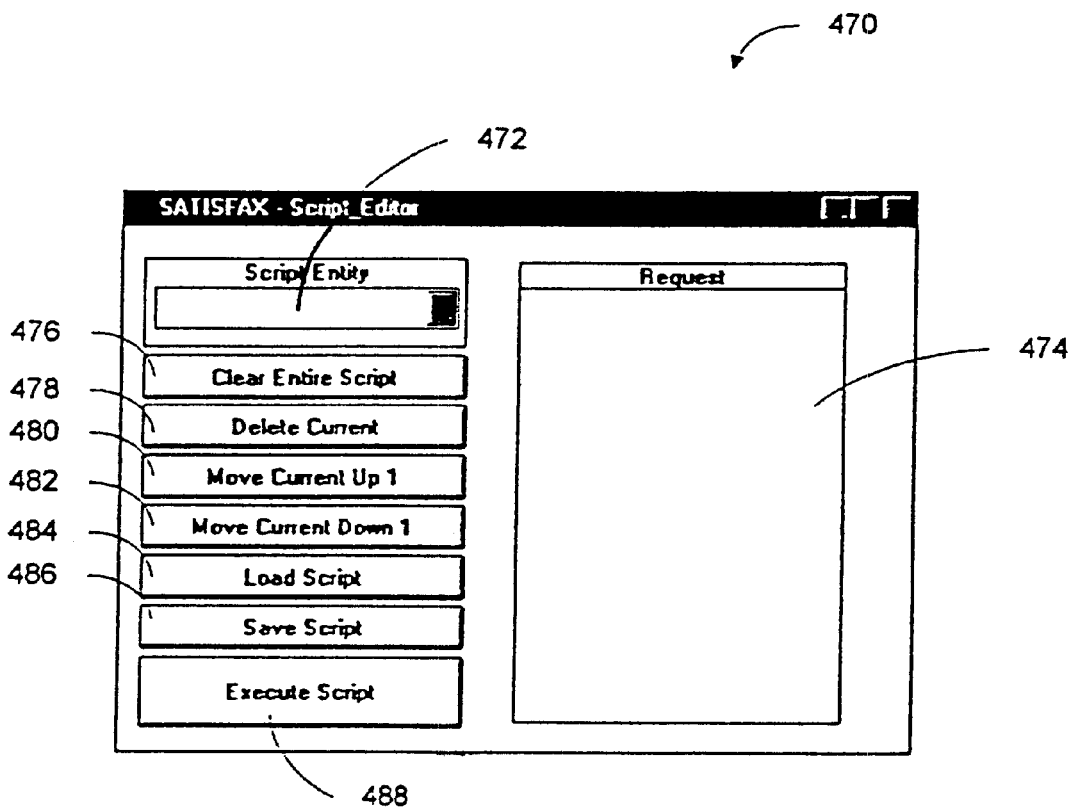
FIG. 18 is a diagram showing a preferred script editor window in accordance with the present invention.

FIG. 18 is a diagram showing a script editor window in accordance with the present invention. The script editor window allows the user to manage scripts of requests. Referring briefly back to FIG. 16, the analysis control window allows the user to copy a request to a script via button 489, rather than execute the request. Thus, a number of requests can be assembled by the user and saved to a script file. At a later date, for example when a subsequent survey database arrives, the user may execute one or more of the script files.

Referring specifically to FIG. 18, a script entity may be selected at 472. Once selected, the contents of the script entity are displayed in the request window 474. The script can be cleared via button 476. The order of the requests within the script entity can be rearranged by deleting or moving a currently selected request via buttons 478, 480, and 482. The resulting script may be saved via button 486. Finally, a particular script may be loaded or appended to a current script via button 484. The script may be executed by simply depressing the execute script button 488.

FIG. 19 is a table showing an illustrative correlation table. The correlation table is generally shown at 500 and includes a generic heading column 502, and a number of survey columns 504, 506, 508 and 510. Each of the survey columns corresponds to a particular survey within the survey database. For example, the survey shown in column 504 may have been taken in 1995, while the survey shown in column 506 may have been taken in 1996. On one embodiment of the present invention, the correlation table correlates each of the questions within each survey to a generic question. For example, generic heading-1 corresponds to question 122 for surveys S-1 and S-2, and question 143 for surveys S-3 and S-4.

Under some circumstances, some of the surveys may not have a question that correspond to a generic heading. For example, surveys S-1 and S-2 do not have questions that correspond to generic heading-2. By using such a correlation table, questions within a particular survey can be identified as corresponding to a request that relates to a particular generic heading.

As indicated above, a result caveat may be provided when a comparison is requested between, for example, surveys S-2 and S-3 with respect to the area addressed by heading-2. That is, the system may provide a result caveat that indicates there is insufficient data in survey S-2 to provide a statistically significant result, if appropriate.

Figure 20:
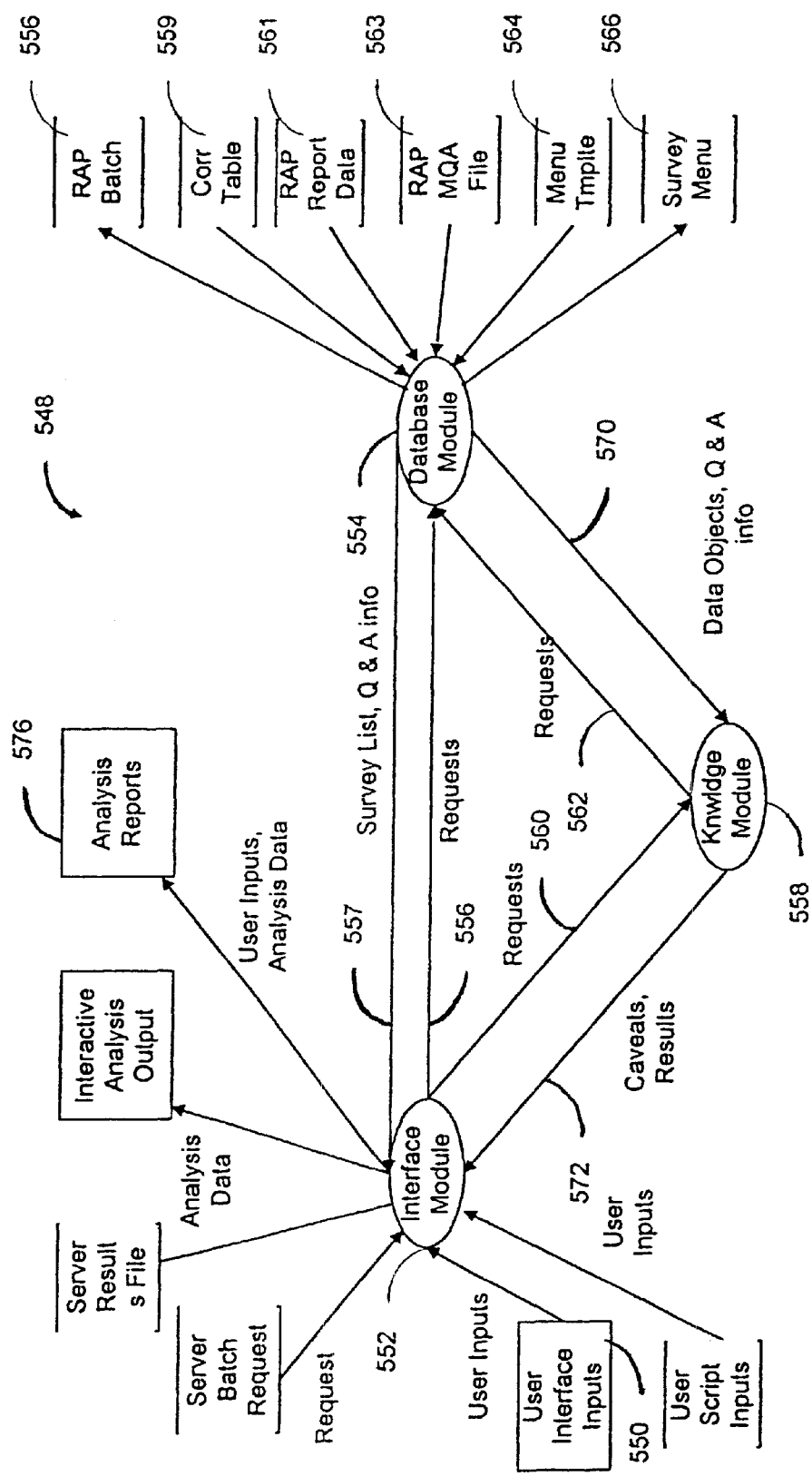
FIG. 20 is a functional diagram showing the interaction of the interface module, knowledge module and data module of the preferred embodiment of the present invention.

FIG. 20 is a functional diagram showing the interaction of the interface module, knowledge module and data module of the preferred embodiment of the present invention. The diagram is generally shown at 548. The interface module 552 receives user inputs, user script inputs, server batch requests, etc., as shown.

To help the user focus the requests, the interface module 552 may allow the user to select one of a number of surveys, and certain questions from the selected survey. Because corresponding questions in selected surveys may differ from one survey to another, the interface module 552 preferably displays a listing of generic questions for selection by the user when forming the user request. To determine the appropriate generic questions for a selected survey, the interface module 552 may access the correlation table 559 via data module 554 and interface 556, and retrieve the generic questions that correspond to the actual questions in the selected survey via interface 557.

Likewise, the interface module 552 may allow the user to select one of a number of answers to a selected question. The available answers are obtained by accessing a RAP MQA file 563 via data module 554 and interfaces 556 and 557. The RAP MQA file includes the available answers to each question in a survey.

After a request is assembled, the interface module 552 provides the requests to knowledge module 558 via interface 560. Knowledge module 558 may then determine a number of request caveats for the user request, preferably using a number of rules executed by a rules-based expert system. The request caveats may then be provided back to interface module 552 via interface 572.

Knowledge module 558 determines which data requests are required to provide the requested results. When determining the appropriate data requests to access the survey database, knowledge module 558 may gain access to the correlation table 559 via data module 554. Correlation table 559 may provide a correlation between generic questions provided in the user request to question numbers in the various surveys. Thus, knowledge module 558 may determine which data elements in the survey database to access. Knowledge module 558 provides a number of data requests to data module 554, via interface 562.

Data module 554 submits the data requests provided by the knowledge module 558 to a survey analysis program, and preferably to the RAP survey analysis program. Data module 554 may submit the data requests as a batch RAP command 556, which may execute the RAP requests in a batch mode. The RAP survey analysis program may then provide a number of intermediate RAP reports 561 to data module 554. The intermediate RAP reports 561 may be in an ASCII text format. Data module 554 may then parse the intermediate RAP reports 561 into a number of data objects, and may send the resulting data objects to knowledge module 558 via interface 570.

Knowledge module 558 uses the parsed intermediate reports and/or data objects to calculate and/or assemble the desired reports. Preferably, this is accomplished by executing a number of rules in a rules-based expert system. The desired reports are then provided to interface module 552 via interface 572, and stored as a number of analysis reports 576.

It is contemplated that knowledge module 558 may determine a number of result caveats, preferably by executing a number of rules on a rules-based expert system. The result caveats may indicate if the desired results should be viewed with caution. For example, the result caveats may indicate if the results provided to the user are based on a statistically insignificant sample size.

Figure 21:
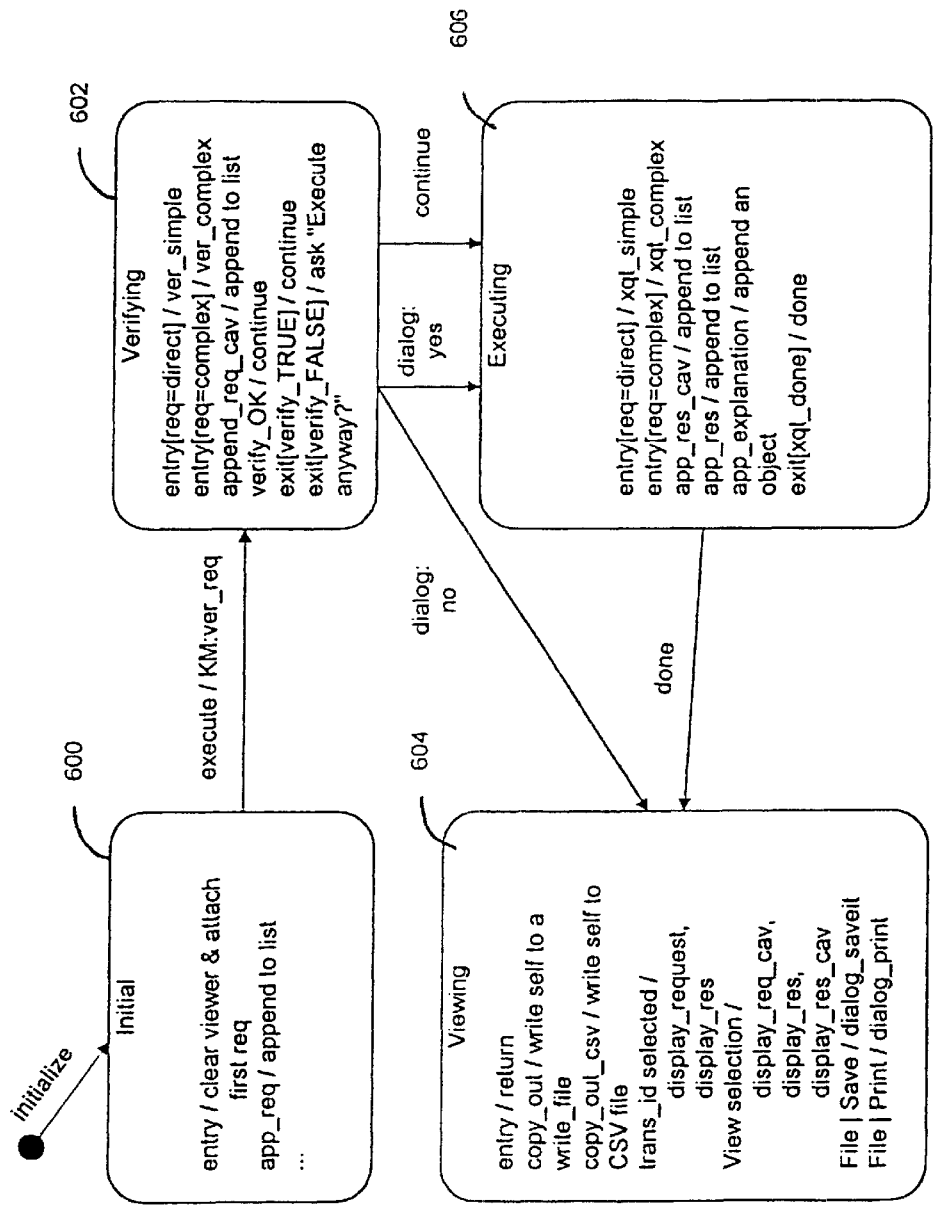
FIG. 21 is a flow diagram showing the general execution of a request in accordance with the preferred embodiment of the present invention.

FIG. 21 is a flow diagram showing the general execution of a request in accordance with the preferred embodiment of the present invention. Initializing block 600 clears the transaction viewer and attaches a first user request. The first user request is sent to the knowledge module for verification. Verifying block 602 verifies the user request and appends any appropriate request caveats to a list of request caveats. If the user request is determined to be appropriate, control is passed directly to executing block 606. If the user request is not determined to be appropriate, verifying block 602 asks whether the user request should be executed anyway. If the user indicates that the user request should be executed anyway, control is passed to executing block 606. If, the user indicates that the user request should not be executed anyway, control is passed to viewing block 604.

Executing block 606 executes the user request, and generates a number of results and result caveats. Control is then passed to viewing element 604. Viewing element 604 displays the user request, the request caveats, the results, and the result caveats.

Figure 22:
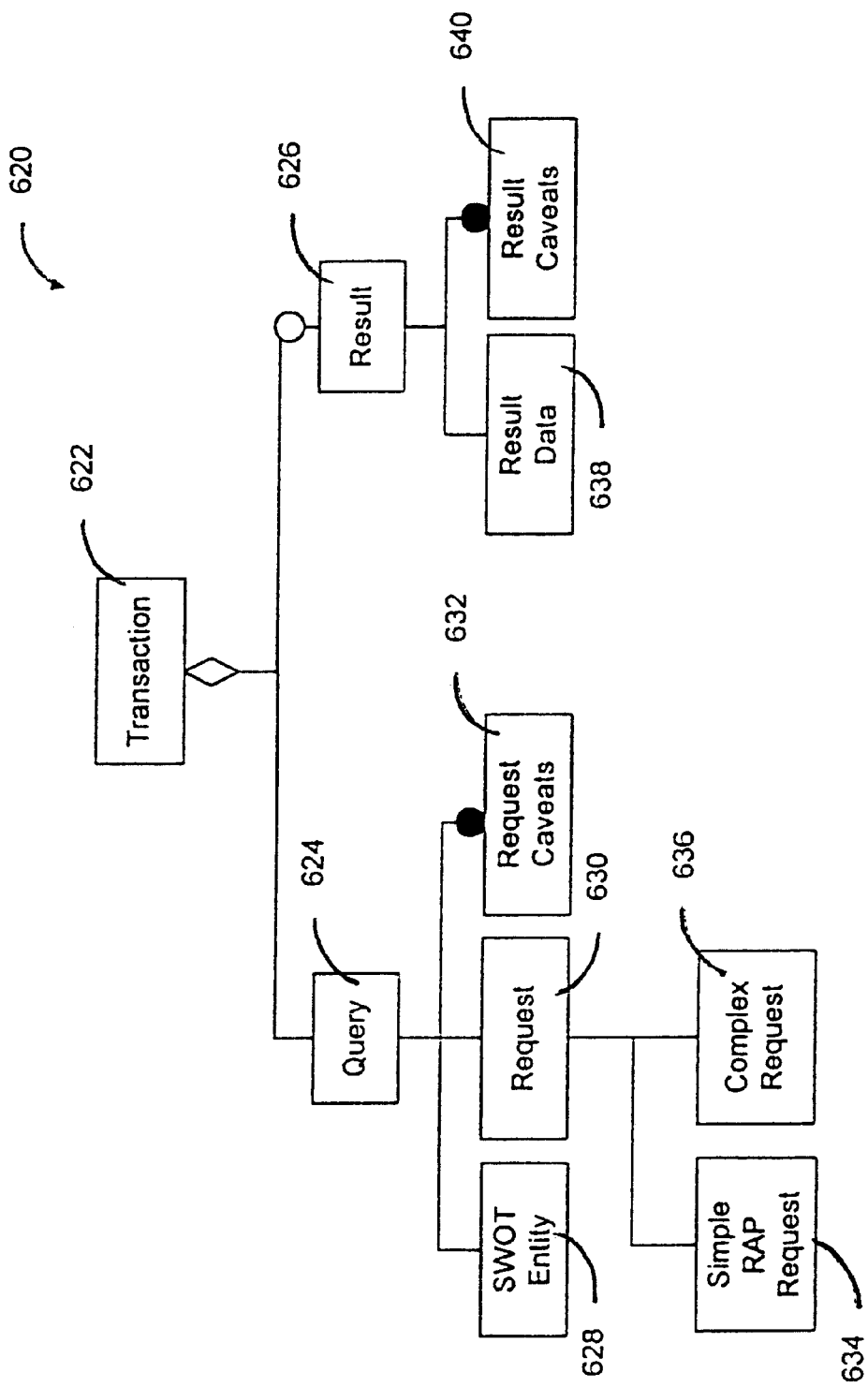
FIG. 22 is a low level object model of the preferred interface module.

FIG. 22 is a low level object model of the preferred interface module. For illustration purposes, each transaction 622 may include a query class 624 and a result class 626. It should be understood, however, that in the preferred embodiment, the query class 624 and the result class 626 are not actually provided, and are only shown for illustrative purposes. The query class 624 may include a SWOT entity class 628, a request class 630 and a number of request caveat objects 632. Preferably, the request caveat objects 632 are built by the knowledge module, and can be viewed by the user.

The request class 630 can be saved, independent of any system settings or parameters to support the scripting feature of the present invention. The request class 630 may include a simple RAP request class 634 and/or a complex request class 636. The simple RAP request class 634 identifies specific RAP reports that are requested. The complex request class 636 identifies, a specific SWOT request or survey analysis request. The result class 622 includes result data class 638 and a number of result caveats objects 640. The results are preferably built using data objects provided to the knowledge module from the data module.

Figure 23:
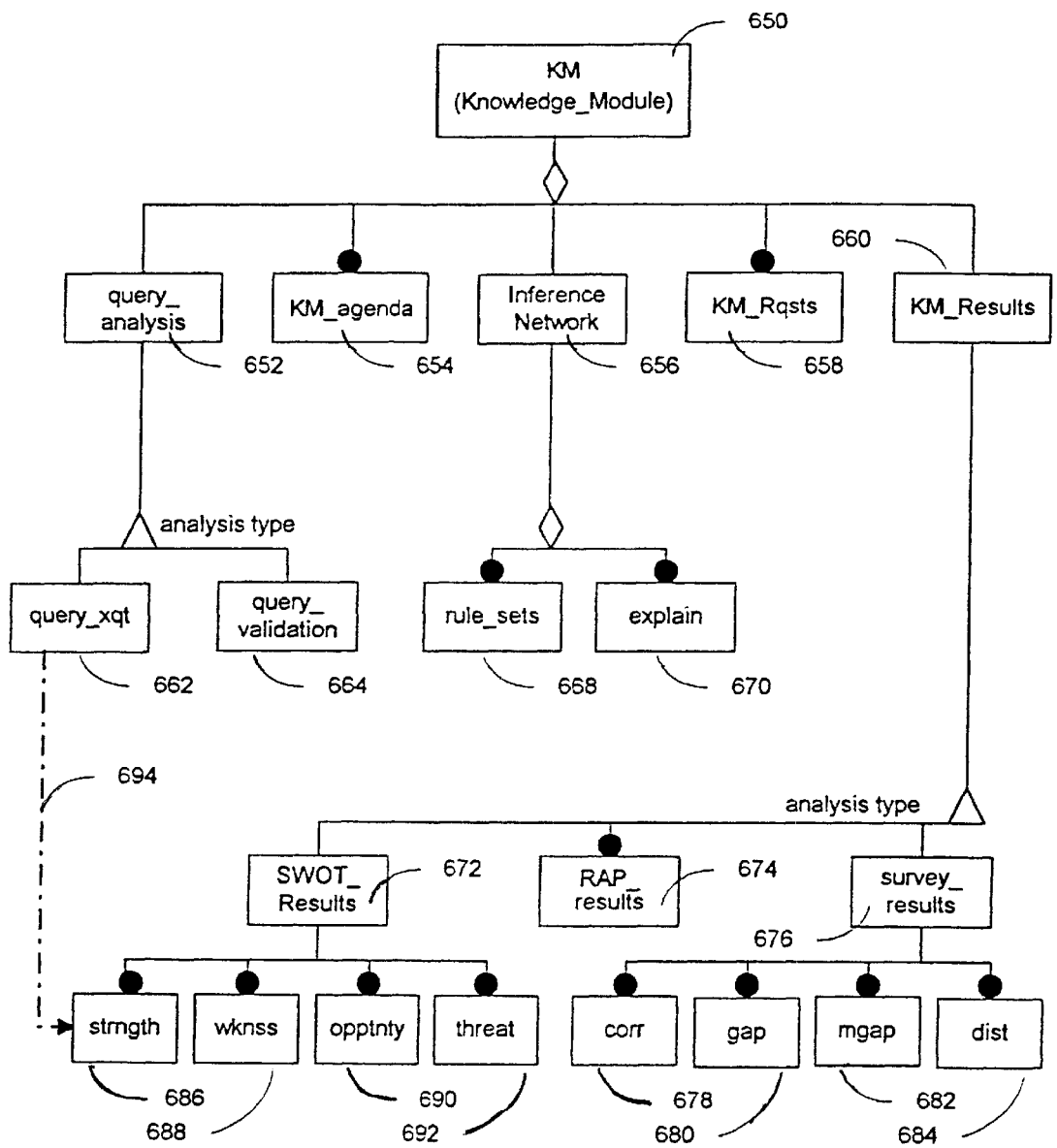
FIG. 23 is a composite object model for the preferred knowledge module.

FIG. 23 is a composite object model for the preferred embodiment of the knowledge module. The knowledge module is shown at 650, and may include query analysis class 652, KM_AGENDA objects 654, inference network class 656, KM_REQUESTS class 658 and KM_RESULTS class 660. Query analysis class 652 may include query execute class 662 and a query validation class 664. Query execute class 662 builds the result objects, and sends the result caveats to the interface module. Query validation class 664 builds the request caveats and sends them to the interface module. KM_AGENDA objects 654 may store agenda objects which control the rule driven report generation and rule-set application by the inference network 656.

The inference network class 656 may include rule-set objects 668 and explain objects 670. Preferably, the inference network class contains a number of multi-valued slots (lists), where each slot corresponds to a rule set. The list of rules to be executed in each instance is stored in the slot name, and the knowledge module determines which rule sets to invoke. A list of rule'sets for each type of SWOT analysis is shown in FIG. 49. A list of rules for each rule set is shown in FIGS. 50A–50C. A description of each rule is shown in FIGS. 51A–51O. Finally, inference network class 656 preferably stores a number of explanation objects 670 which correspond to each request. The explanation objects 670 are returned to the interface module to support the "explain" function.

KM_REQUEST class 658 preferably stores a number of objects that correspond to the knowledge module requests. The request objects are sent to the data module for processing. KM_RESULTS class 660 includes a SWOT results class 672, a number of RAP result objects 674 and a survey results class 676. SWOT results class 672 stores strength objects 686, weakness objects 688, opportunity objects 690 and threat objects 692. The executed queries indicated at 662 provide the strength objects 686, weakness objects 688, opportunity objects 690 and threat objects 692, as indicated by line 694.

The survey results class 676 includes correlation objects 678, GAP objects 680, MGAP objects 682 and distribution objects 684. The correlation objects 678, GAP objects 680, MGAP objects 682 and distribution objects 684 are created as a result of RAP requests made to the survey database. The strength objects 686, weakness objects 688, opportunity objects 690, threat objects 692, correlation objects 678, GAP objects 680, MGAP objects 682 and distribution objects 684 can be returned to the interface module.

Figure 24:
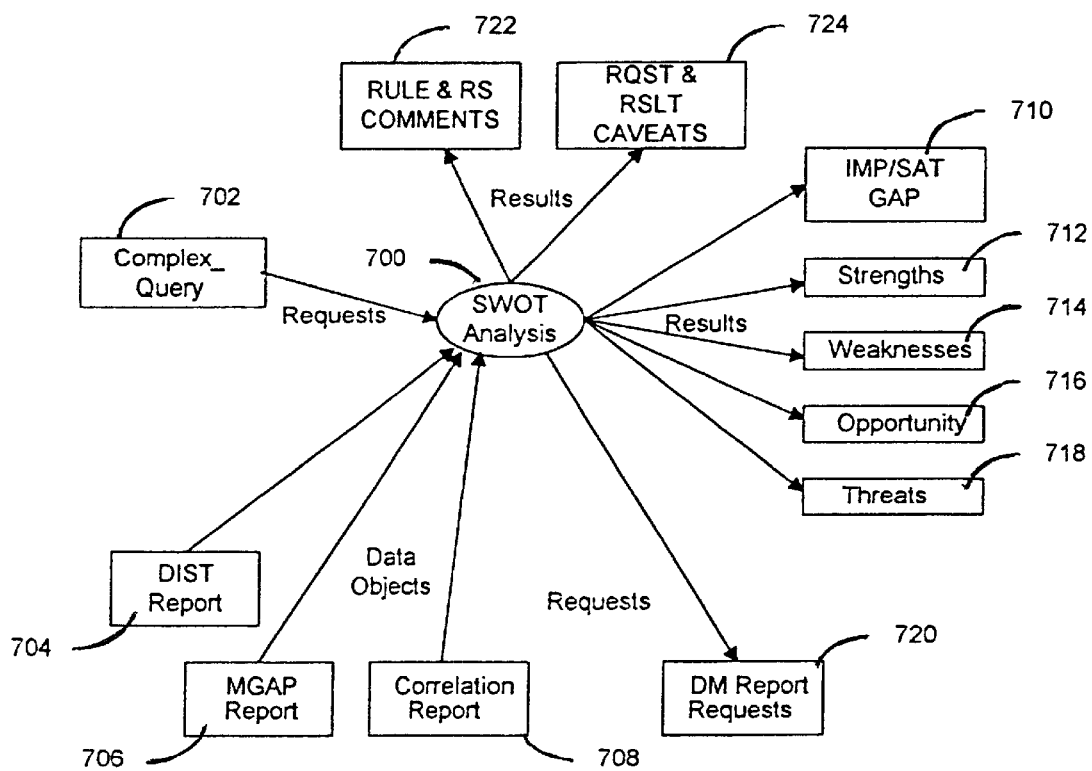
FIG. 24 is a diagram showing a functional model for a SWOT analysis.

FIG. 24 is a diagram showing a functional model of a SWOT (Strength/Weakness/Opportunity/Threat) analysis 700. SWOT analysis 700 is initiated by a complex query 702. The complex query 702 indicates whether a, strength, weakness, opportunity or threat analysis is to be performed. SWOT analysis 700 determines the type of analysis to be performed, analyzes the request, and provides a number of request caveats 724. This is preferably done by executing a number of rules in a rules-based expert system.

SWOT analysis 700 then provides a number of report requests to the data module, as shown at 720. The data module 720 may generate a distribution report 704, a MGAP report 706 and/or a correlation report 708. The data module may either execute the requests directly on a survey database, or provide the request to a survey analysis program, as described above. SWOT analysis 700 then reads the distribution report 704, MGAP report 706 and/or correlation report 708 returned as data objects from data module. From these reports, SWOT analysis 700 generates the appropriate results as shown at 710 through 718, depending on the type of analysis performed. For example, if the request provided by the complex query 702 is a strength analysis, SWOT analysis 700 provides strength results 712. In addition to providing the results, SWOT analysis 700 may provide a number of result caveats, as shown at 724. Further, SWOT analysis 700 may indicate which rules and rule sets were executed during the SWOT analysis as shown at 722.

Figure 25:
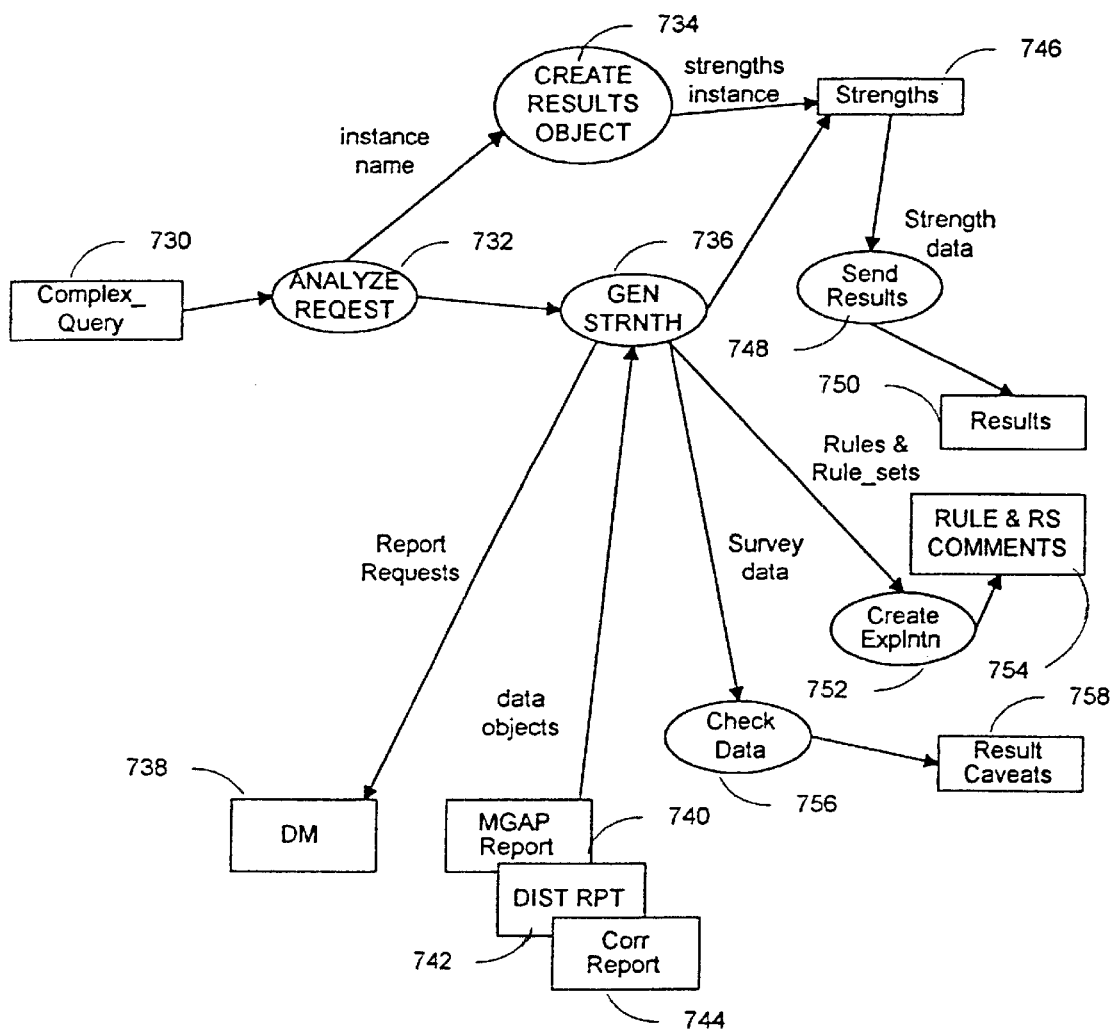
FIG. 25 is a diagram showing a functional model of a strength analysis.

FIG. 25 is a diagram showing a functional model of a strength analysis. The complex query is formed at 730 and provided to analyze request block 732. Analyze request block 732 determines the type of request that has been provided. In the illustrative diagram, analyze request block 732 determines that the request provided by complex query 730 is a strength request, as indicated at 736. Thereafter, analyze request block 732. creates the appropriate result objects, as shown at 734.

Generate strength block 736 requests the appropriate reports from data module 738. Data module 738 either directly access the survey database, or provides a request to a survey analysis program. In either case, the MGAP report 740, distribution report 742 and correlation report 744 may be created. The generate strength block 736 reads the MGAP report 740, distribution report 742 and/or correlation report 744, and determines the requested strengths. The generate strength block 736 then stores the strengths under the proper strength instance, as shown at 746. The strength data is then provided to send results block 748, which sends the results to results block 750.

Generate strength block 736 also checks the survey data at 756 and provides a number of result caveats, as shown at 758. Finally, generate strength block 736 creates explanation objects, as shown at 752, and provides the rules and rule sets that were executed during the strength analysis including comments therefor, as shown at 754.

Figure 26:
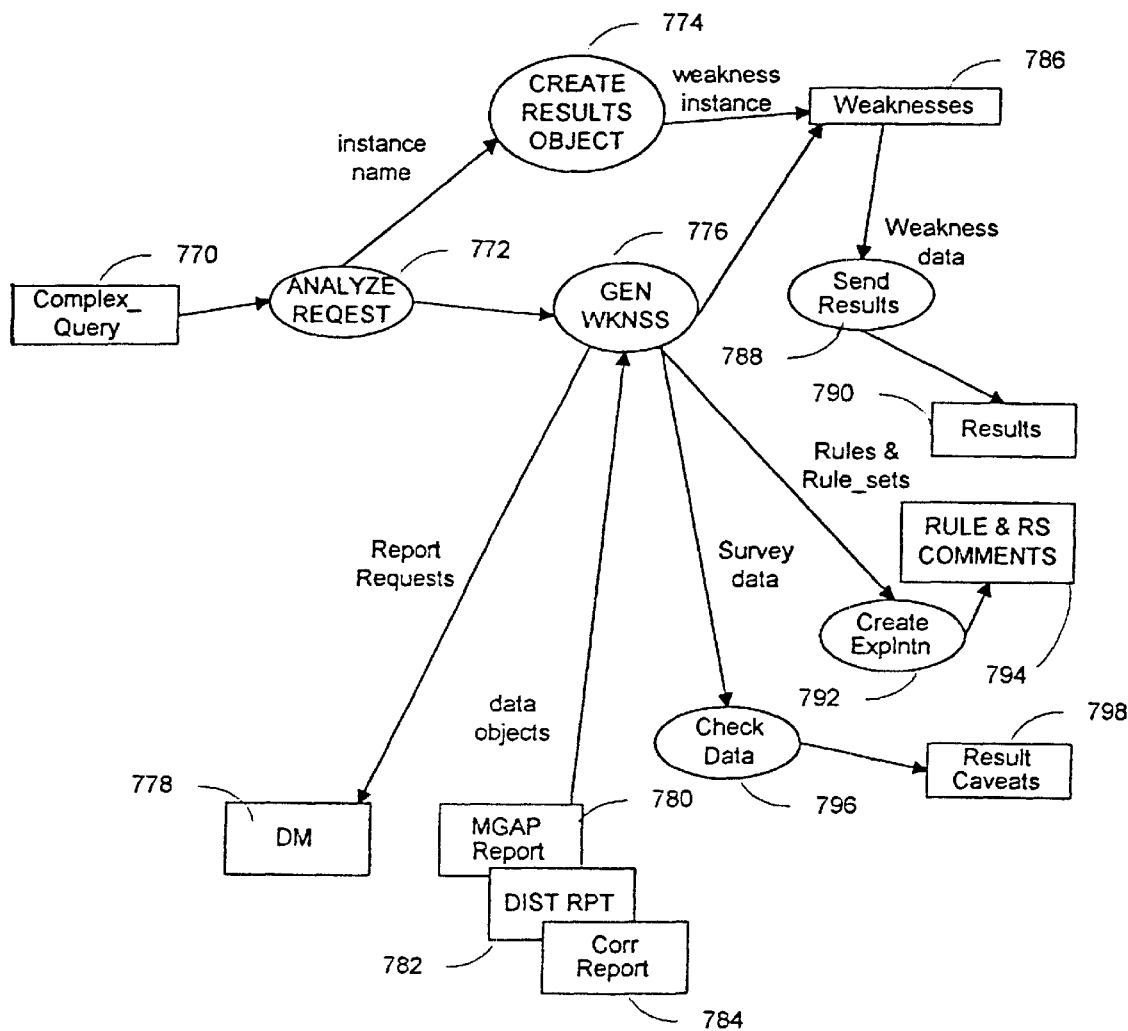
FIG. 26 is a diagram showing a functional model of a weakness analysis.

FIG. 26 is a diagram showing a functional model of a weakness analysis. The complex query is formed at 770 and provided to analyze request block 772. Analyze request block 772 determines the type of request that has been provided. In the illustrative diagram, analyze request block 772 determines that the request provided by complex query 770 is a weakness request, as indicated at 776. Thereafter, analyze request block 772 creates the appropriate result objects, as shown at 774.

Generate weakness block 776 requests the appropriate reports from data module 778. Data module 778 either directly access the survey database, or provides a request to a survey analysis program. In either case, the MGAP report 780, distribution report 782 and correlation report 784 may be created. The generate weakness block 776 reads the MGAP report 780, distribution report 782 and/or correlation report 784, and determines the requested weaknesses. The generate weakness block 776 then stores the weaknesses under the proper weakness instance, as shown at 786. The weakness data is then provided to send results block 788, which sends the results to results block 790.

Generate weakness block 776 also checks the survey data at 796 and provides a number of result caveats, as shown at 798. Finally, generate weakness block 776 creates explanation objects, as shown at 792, and provides the rules and rule sets that were executed during the weakness analysis including comments therefor, as shown at 794.

Figure 27:
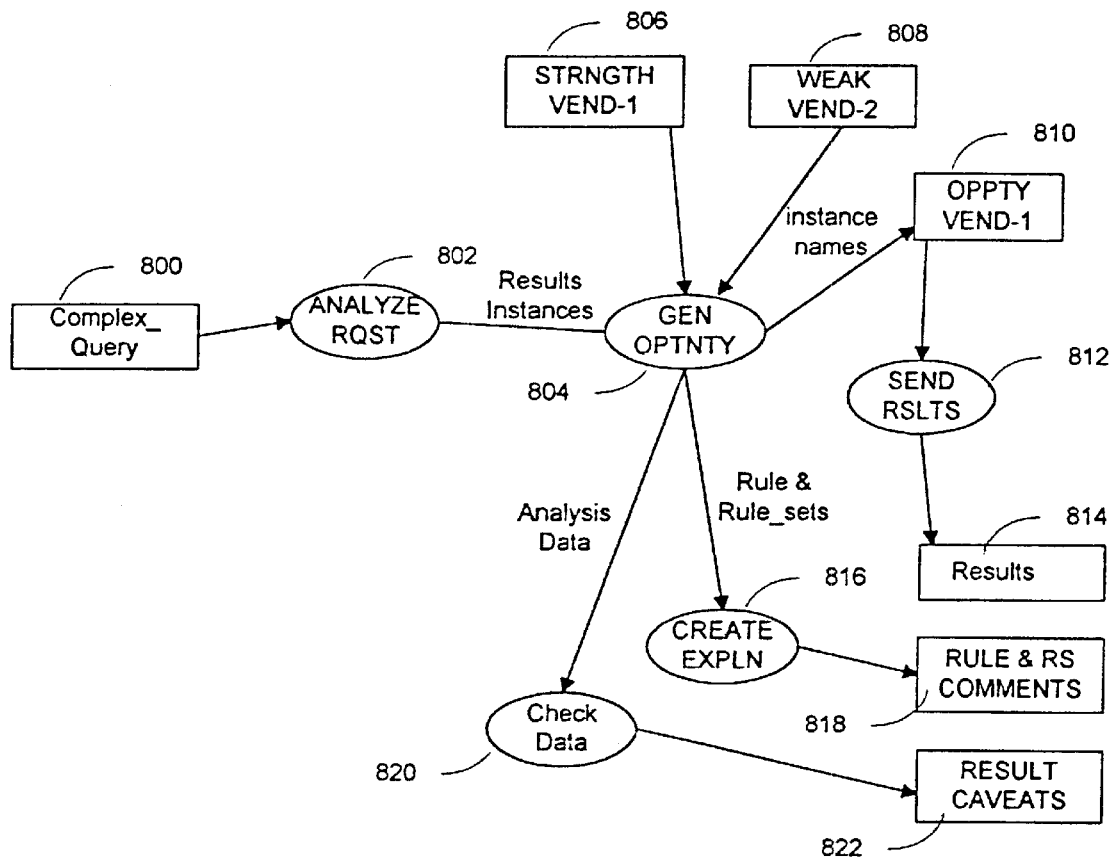
FIG. 27 is a diagram showing a functional model of an opportunity analysis.

FIG. 27 is a diagram showing a functional model of an opportunity analysis. The complex query is formed at 800 and provided to analyze request block 802. Analyze request block 802 determines the type of request that has been provided. In the illustrative diagram, analyze request block 802 determines that the request provided by complex query 800 is an opportunity request, as indicated at 804. Thereafter, analyze request block 802 creates the appropriate result objects.

Generate opportunity block 804 requests the appropriate reports from the data module. For an opportunity request, this includes both a strength analysis 806 for selection-1 and a weakness analysis 808 for selection-2. Selection-1 and selection-2 may correspond to any selection set including selected vendors, geographic regions, products, years, etc.

The generate opportunity block 804 reads the results from the strength analysis 806 for selection-1 and from the weakness analysis 808 for selection-2, and determines the requested opportunities for selection-1. The generate opportunity block 804 then stores the opportunities under the proper opportunity instance, as shown at 810. The opportunity data is then provided to send results block 812, which sends the results to results block 814.

Generate opportunity block 804 also checks the survey data at 820 and provides a number of result caveats, as shown at 822. Finally, generate opportunity block 804 creates explanation objects, as shown at 816, and provides the rules and rule sets that were executed during the opportunity analysis including comments therefor, as shown at 818.

Figure 28:
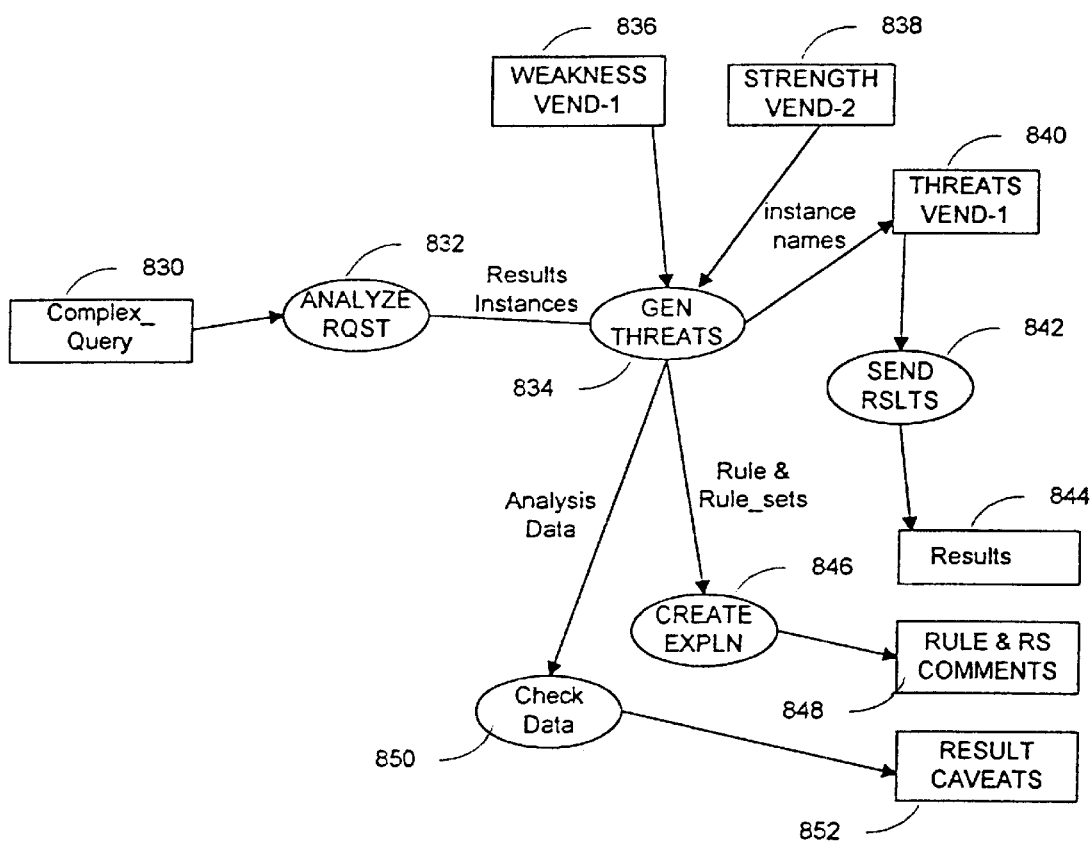
FIG. 28 is a diagram showing a functional model of a threat analysis.

FIG. 28 is a diagram showing a functional model of a threat analysis. The complex query is formed at 830 and provided to analyze request block 832. Analyze request block 832 determines the type of request that has been provided. In the illustrative diagram, analyze request block 832 determines that the request provided by complex query 830 is a threat request, as indicated at 834. Thereafter, analyze request block 832 creates the appropriate result objects.

Generate threat block 834 requests the appropriate strength and weakness analysis, as described above. For a threat request, this includes both a weakness analysis 836 for selection-1 and a strength analysis 838 for selection-2. Selection-1 and selection-2 may correspond to any selection set including selected vendors, geographic regions, products, years, etc.

The generate threat block 834 reads the results from the weakness analysis 836 for selection-1 and from the strength analysis 838 for selection-2, and determines the requested threats for selection-1. The generate threat block 804 then stores the threats under the proper threat instance, as shown at 840. The threat data is then provided to send results block 842, which sends the results to results block 844.

Generate threat block 834 also checks the survey data at 850 and provides a number of result caveats, as shown at 852. Finally, generate threat block 834 creates explanation objects, as shown at 846, and provides the rules and rule sets that were executed during the threat analysis including comments therefor, as shown at 848.

Figure 29:
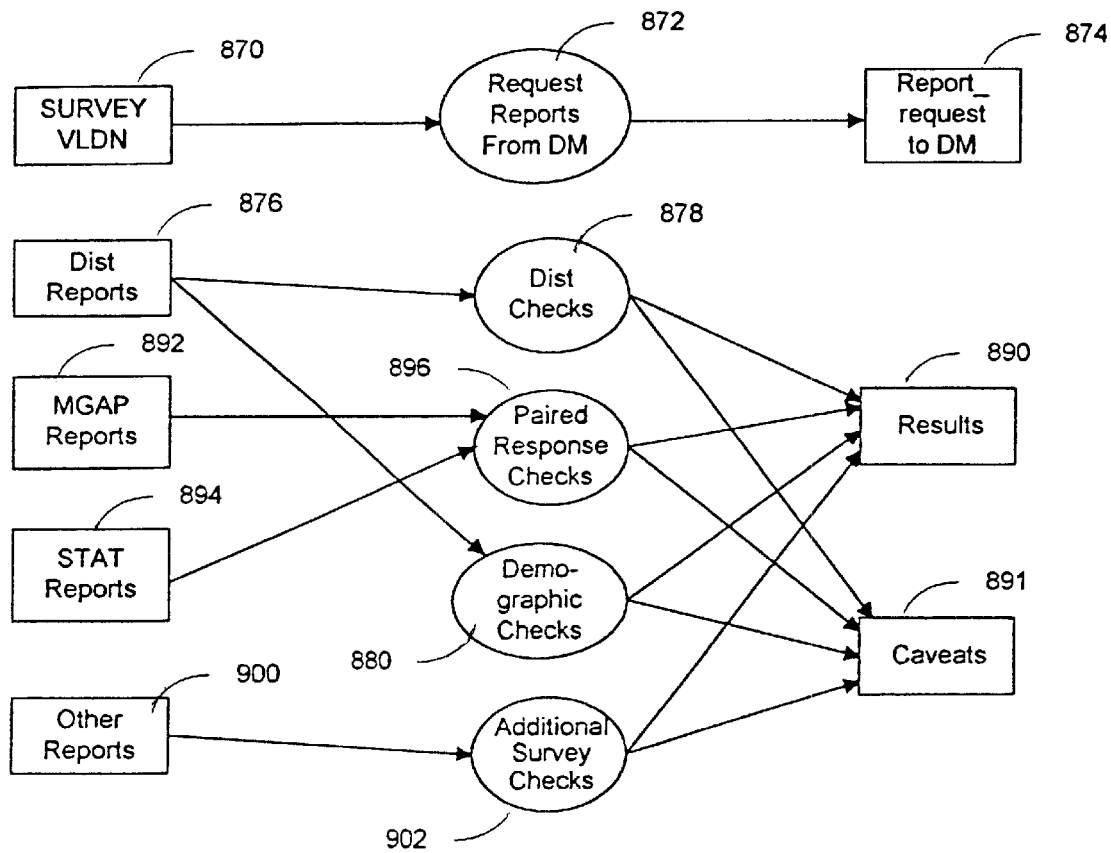
FIG. 29 is a diagram showing a functional model of a survey validation analysis.

FIG. 29 is a diagram showing a functional model of a survey validation analysis. A survey validation request is a form of a complex request described above, and is shown at 870. Using the survey validation request, block 872 requests the appropriate reports from the data module. The data requests are provided to the data module, as shown at 874. In a preferred embodiment, the survey validation request causes the data module to submit the appropriate data requests to the RAP program, thereby generating distribution reports 876, MGAP reports 892, Correlation reports 894, and/or other reports 900.

The distribution reports 876 are provided to distribution checks block 878 and to demographic checks block 880. Distribution checks block 878 checks the distribution of the respondents to various survey questions. For example, the distribution checks block 878 may check the distribution of survey respondents among several customer groups including financial customers, government customers, commercial customers, etc. The results are provided to results block 890. If the number of respondents from any group is outside of a predetermined range, the distribution checks block 878 may provide a result caveat to caveats block 891.

The demographic checks block 880 may check the distribution of respondents on a geographical basis. The results are provided to results block 890. If the number of respondents from any geographic area is outside of a predetermined range, the distribution checks block 878 may provide a result caveat to caveats block 891.

The MGAP reports 892 are provided to paired response check block 896. Paired response check block 896 checks the gaps between importance and satisfaction for various survey questions. The results are provided to results block 890. If the gaps are outside of a predetermined range, the paired response check block 896 may provide result caveats to caveats block 891.

The statistics reports 894 are also provided to paired response check block 896. Using the statistics reports 894, paired response check block 896 may determine if only one answer is provided for a paired response. For example, the paired response check block 896 may determine if the respondent only answered the importance question, but not the satisfaction question for a paired response type question in a survey. The results are provided to results block 890. If only one answer is provided for a paired response, the paired response check block 896 may provide a result caveat to caveats block 891.

Finally, other reports block 900 provides other report to additional surveys check block 902. Like above, additional survey check block 902 provides the results to results block 890, and further provides a number of result caveats to caveats block 891.

Figure 30:
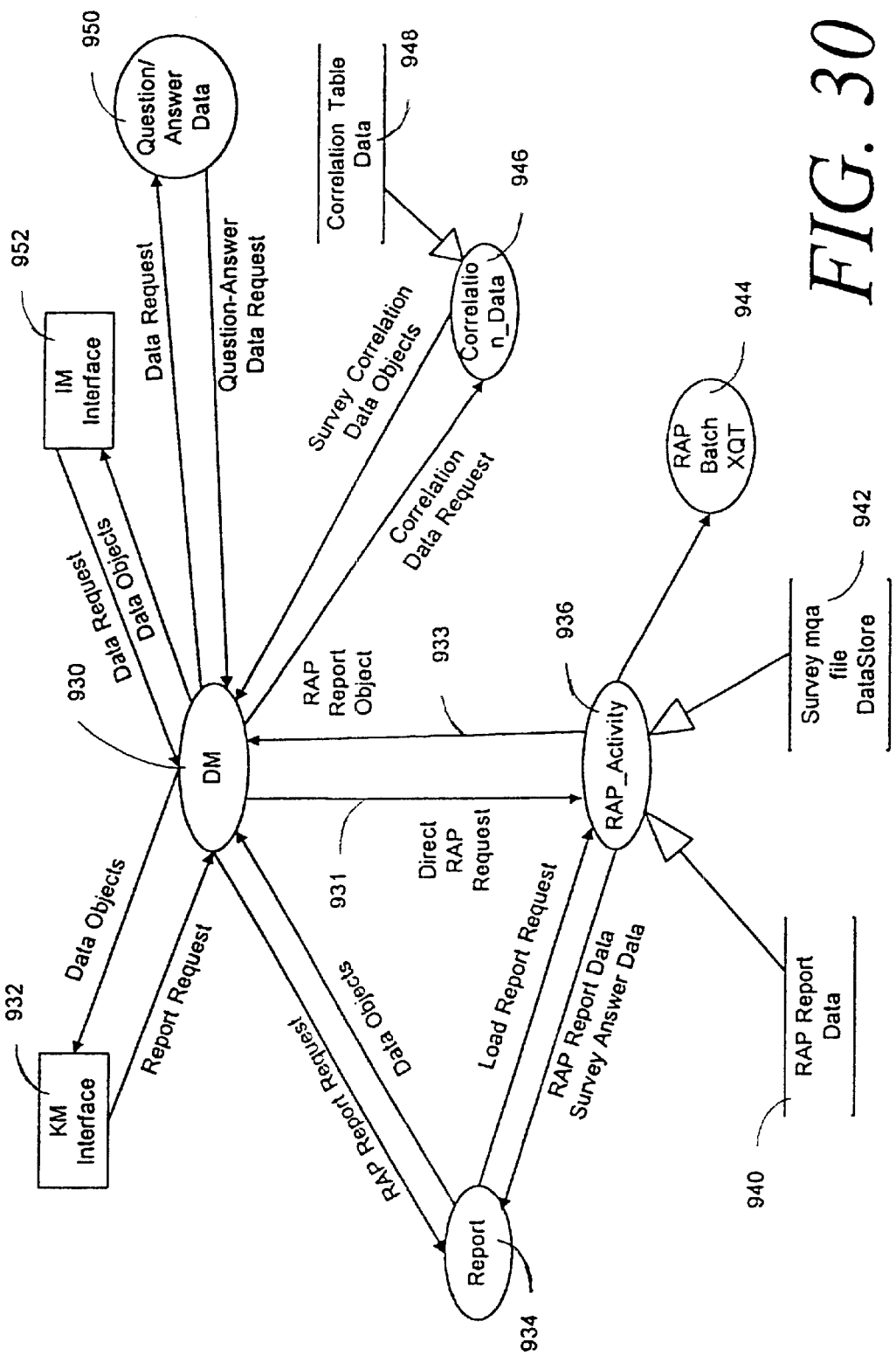
FIG. 30 is a diagram showing a functional model of the preferred data module.

FIG. 30 is a diagram showing a functional model of the preferred data module. The data module is illustrated at 930 and receives requests from both the knowledge module 932 and the interface module 952.

As indicated above, interface module 952 may display a listing of generic questions, which may be selected by the user when forming a user request. To determine the appropriate generic questions for a selected survey, the interface module may access the correlation data 946 via the data module 930, and retrieve the generic questions that correspond to the actual questions in the selected survey.

Likewise, the interface module 952 may allow a user to select one of a number of answers to a selected question. The available answers are obtained by accessing the question/answer (MQA) data block 950 via data module 930, as shown. The question/answer data block 950 includes the available answers to each question in a survey.

Once a user request is formed, the request is provided to knowledge module 932. Knowledge module 932 may identify the actual question numbers and the appropriate surveys that correspond to the generic questions provided in the user request. This is preferably accomplished by accessing correlation data 946 via data module 930, as described above.

The knowledge module 932 assembles a number of requests, and provides the requests to the data module 930. Preferably, the requests identifies the appropriate data elements within the RAP report data 940 by specifying the actual question numbers and the corresponding survey.

It is contemplated that some requests may only request RAP reports from the RAP program. These requests are specified by selecting the RAP command mode in the analysis control window, shown for example in FIG. 8. For these requests, the data module 930 may provide the requests directly to RAP activity manager 936 via interface 931. The RAP activity manager may execute the requests, preferably in a batch mode as shown at 944. The resulting RAP reports may then be provided back to data module 930 via interface 933, and returned to the interface module 952 via knowledge module 932.

For complex requests, knowledge module 932 may determine which RAP requests are required to derive the desired results. The knowledge module 932 sends the resulting RAP requests to data module 930. When data module 930 receives the RAP requests from knowledge module 932, data module 930 provides the requests to report block 934. Report block 934 provides the RAP requests to RAP activity manager 936.

RAP activity manager 936 accesses the RAP report data 940 and provides the requested RAP reports to RAP activity manager 936. Preferably, the RAP activity manager 936 provides a batch RAP request 944 to RAP for batch processing. The RAP activity manager 936 receives the requested reports from RAP, and provides the RAP report data to the report block 934. Report block 934 then preferably parses the RAP reports, which are typically in an ASCII format, into a number of requested data objects. The request data objects are then returned to knowledge module 932 via data module 930 for further processing.

Figure 31:
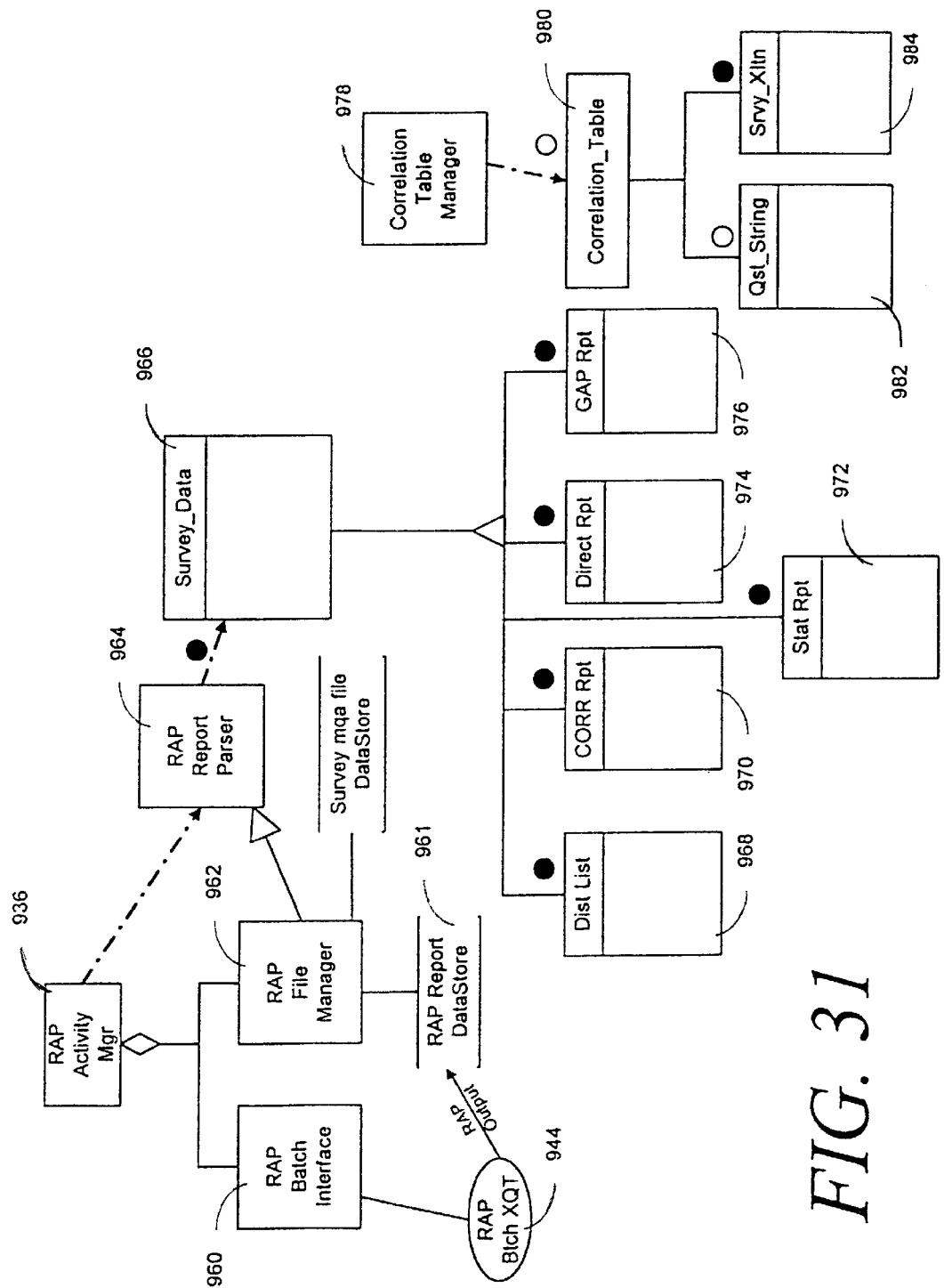
FIG. 31 is a diagram showing a consolidated low level object model of the preferred data module.

FIG. 31 is a diagram showing a consolidated low level object model of the preferred data module. RAP activity manager 936 includes RAP batch interface 960 and RAP file manager 962. RAP batch interface 960 allows batch execution of RAP requests, as shown at 944. The output of the batch execution of RAP requests is provided to RAP report data store 961. RAP file manager 962 may read the RAP report data store 961 and provide the results to RAP report parser 964. RAP activity manager 936 may control RAP report parser 964. RAP report parser 964 parses the survey data 966 into a number of data objects. For example, RAP report parser 964 may provide distribution objects 968, correlation objects 970, statistics objects 972, direct objects 974 and GAP objects 976, as shown.

As indicated above, a correlation table manager 978 may access a correlation table 980 to provide a correlation between questions in various surveys. Correlation table 980 may include question strings 982 and survey translation objects 984.

Figure 32:
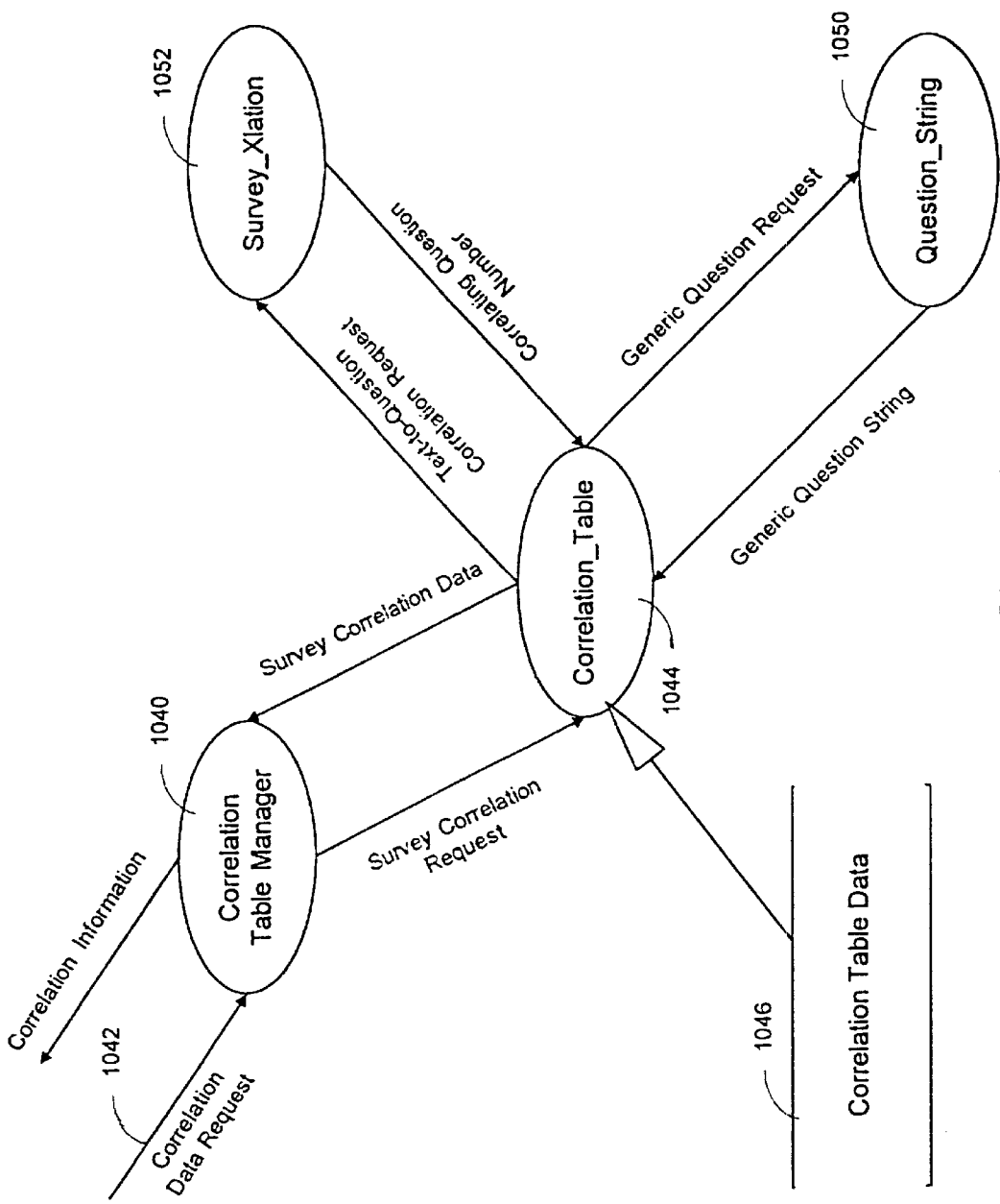
FIG. 32 is a diagram showing a functional model of a preferred correlation table manager.

FIG. 32 is a diagram showing a functional model of a preferred correlation table manager. Correlation table manager 1040 receives correlation data requests 1042 from the data module. Correlation table manager 1040 provides the survey correlation request to correlation table 1044. Correlation table 1044 is updated from the correlation table data store 1046 whenever a new correlation table is generated, for example, whenever a new survey is received and incorporated into the system.

A correlation data request 1042 may provide a generic question, and may request an actual question number in a selected survey. As indicated above, this type of request is often provided by the knowledge module. The correlation table manager provides the request to correlation table 1044. Correlation table provides a text-to-question correlation request to survey-xlation block 1052. In response, survey-xlation block 1052 provides the corresponding question number to correlation table 1044. The corresponding question number is then provided to the requestor via correlation table manager 1040.

Another type of correlation data request 1042 is a generic text request. It is often desirable for both the data module and knowledge module to translate from a question number to a corresponding generic question. For example, the data module may receive a number of RAP reports in response to a RAP request. The RAP reports only include the question text from a specific survey. Before transferring the RAP reports, it may be desirable to translate the question text in the RAP reports to a corresponding generic question string.

To do this, the data module may provide a correlation data request to correlation table manager 1040. The correlation table manager 1040 provides the request to correlation table 1044. Correlation table 1044 provides a generic question request to question string block 1050. The generic question request may identify both the question number and the specific survey. In response, the question string block 1050 may provide the corresponding generic question string to correlation table 1044. The corresponding generic question string may then be provided to the requester via correlation table manager 1040.

Likewise, it may be desirable for the knowledge module to translate from a question number to a generic question string. For example, the knowledge module may perform a strength type analysis. The data module may parse the resulting RAP reports into a number of data objects, and provide the resulting data objects to the knowledge module. It may be desirable for the knowledge module to translate the question text within the reports to the corresponding generic question string before providing the results to the interface module. This translation operates similar to that described above with respect to the data module.

FIG. 33 is a table showing the execution of an illustrative direct RAP request, with a problem detected in the request. The user first enters a direct RAP command via the interface module. The interface module creates a simple RAP object for further analysis. The simple RAP object is sent to the knowledge module for verification. The knowledge module receives the simple RAP object and uses rules to check for problems in the request. Problems that are detected include syntax errors or requests that are determined to be not appropriate. The problems are noted and a number of request caveats provided. The request caveats are sent back to the interface module. The interface module appends the request caveats to a listing. The user then views the request caveats.

FIGS. 34A–34B show the execution of an illustrative direct RAP request, when no problems are detected in the request or when the user indicates that the request should be executed despite the detected problem. The user enters the RAP command, and the interface module accepts the RAP command. The interface module creates a simple RAP object for further analysis. The simple RAP object is then sent to the knowledge module for verification.

The knowledge module receives the simple RAP object and uses rules to check for problems in the request. The knowledge module notes any problems, and updates the request caveats. The request caveats are sent back to the interface module. The interface module then appends the request caveats to a listing.

The knowledge module also sends the RAP command to the data module. The data module receives the RAP command object, and creates batch commands therefrom. The data module executes the batch command and returns the direct RAP objects. The knowledge module previews the RAP results and sends the RAP results to the interface module. The interface module appends the results, and displays the results to the user. The user then views the results, and the result and request caveats.

FIGS. 35A–35B show the execution of an illustrative strength/ weakness/opportunity/threat analysis, when problems are detected in the request. The user selects one or more surveys and request a strength, weakness opportunity or threat analysis. The interface module accepts and checks the request. The interface module also creates a complex query object and sends the complex query object to the knowledge module.

The knowledge module receives the complex query object, and evaluates the analysis inputs. The knowledge module determines the type of reports needed to validate the request, and creates the knowledge module request for the data module.

The data module receives the knowledge module request object and checks for existing reports/objects that correspond to the knowledge module request. If not found, the data module runs the appropriate RAP report, and generates the corresponding objects. In either case, the data module returns the requested objects to the knowledge module.

The knowledge module examines the returned objects and generates request caveats based on knowledge module rules. The knowledge module also creates a number of result caveat objects and sends them to the interface module. The interface module receives the results, request caveats, and result caveats, and displays them to the user.

Figure 36C:
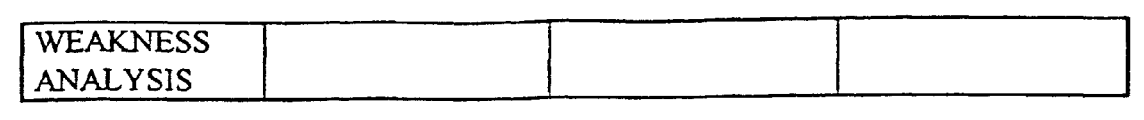

FIGS. 36A–36C show the execution of an illustrative strength or weakness analysis, when no problems are detected in the request or when the user indicates that the request should be executed despite the detected problem. The user selects one or more data survey databases and requests a strength or weakness analysis. The interface module accepts and checks the command, and creates a complex query object. The interface module then sends the complex query object to the knowledge module.

The knowledge module receives the complex query object, and determines the type of reports needed. For example, the complex query object may indicate to which products or vendors the request is directed. The knowledge module creates knowledge module request objects for the data module and sends the knowledge module request objects to the data module.

The data module receives the knowledge module request objects. The data module checks existing reports and objects to determine if these objects have been previously generated. If not, the data module runs the appropriate RAP reports and generates appropriate objects. In either case, the data module returns the appropriate results objects to the knowledge module.

In a preferred embodiment, the result objects includes MGAP objects. The knowledge module looks through the MGAP objects and determines which of the MGAP objects are strengths or weaknesses based on a number of rules. The knowledge module then creates a result object stream and sends it to the interface module. The interface module receives the appended result and displays it to the user. The user receives the strength or weakness analysis results, and the corresponding request and result caveats, if any.

FIGS. 37A–37C show the execution of an illustrative threat or opportunity analysis, when no problems are detected in the request or when the user indicates that the request should be executed despite the detected problem. The user selects the appropriate survey information. This may include one or more surveys, vendors, products, etc. The user also selects an opportunity or threat analysis type. The interface module accepts and checks the command and creates a complex query object. The interface module sends the complex query object to the knowledge module.

The knowledge module receives the complex query object and determines the type of reports needed based on the products, vendors, etc. that are selected. The knowledge module creates multiple knowledge module requests for the data module based on vendor and product knowledge (e.g. rules). The knowledge module then sends the multiple knowledge module requests to the data module.

The data module receives the knowledge module request objects and checks existing reports and objects to see if these objects have been generated by a previous request. If not found, the data module runs the appropriate RAP reports and generates the appropriate objects. In either case, the data module returns the result objects to the knowledge module.

In a preferred embodiment, the result objects include MGAP objects. The knowledge module looks through the MGAP objects and determines which are strengths or weaknesses based on predefined rules. The knowledge module compares these strengths and weaknesses, based on the selected vendors and/or products, and determines which are threats and which are opportunities. The knowledge module creates a result object stream and sends the result object stream to the interface module.

The interface module receives the appended results and displays the results to the user. The user receives the threats or opportunities analysis results, and the corresponding request and result caveats, if any.

FIG. 38 is a table showing the execution of an illustrative survey validation request, with request problems detected. The user enters a survey validation request. The interface module accepts the survey validation request, and creates survey validation objects for further analysis. The survey validation objects are sent to the knowledge module for verification.

The knowledge module receives the survey validation objects, and uses a number of rules to check for problems in the request. The knowledge module notes any problems and updates the request caveats. The knowledge module sends the request caveats back to the interface module. The interface module appends the request caveats, and the user views the appended survey validation request caveats.

FIGS. 39A–39B show the execution of an illustrative survey validation request, when no query problems are detected or when the user indicates that the request should be executed despite the detected problems. The user enters the appropriate survey information and requests a survey validation. The survey validation request is a form of a complex request. The appropriate survey information may include the selection of a particular survey. The interface module accepts and checks the survey validation request, and creates a survey validation object. The survey validation object is sent to the knowledge module.

The knowledge module receives the survey validation object and determines the type of reports needed based on the products, vendors, etc. The knowledge module then creates a number of data request objects, and provides the data request objects to the data module.

The data module receives the data request objects and checks existing reports/objects to determine if the requested reports/objects were already generated by a previous request. If not found, the data module runs the appropriate RAP reports and generates the appropriate result objects. In either case, the data module returns the appropriate result objects to the knowledge module.

The knowledge module looks through the result objects that were returned, and used rules to generates survey validation results. The knowledge module creates a result objects stream and sends the result object stream to the interface module. The interface module receives the appended results, and displays the results to the user.

FIG. 40 is a table showing the execution of an illustrative SWOT parameter update using the SWOT editor of FIG. 17.

The user enters SWOT and/or analysis parameters via the SWOT editor. The interface module accepts and checks the parameters entered by the user. The interface module informs the user of nonacceptable parameter values, if any. The interface module then allows the user to store or retrieve these parameters upon request. The user receives an updated display.

Figure 41:
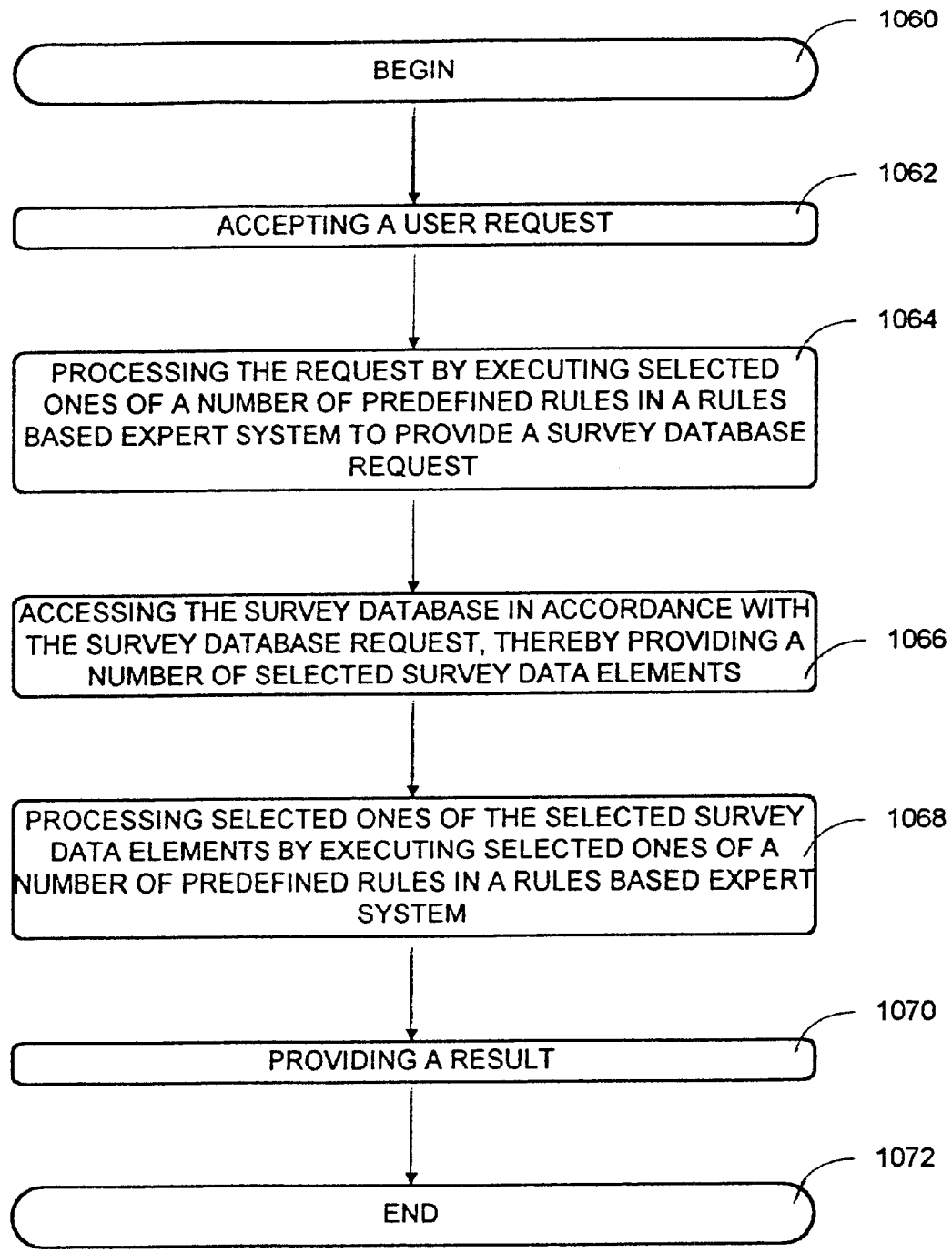
FIG. 41 is a flow diagram showing an illustrative method of the present invention.

FIG. 41 is a flow diagram showing an illustrative method of the present invention. The algorithm is entered at element 1060 and control is passed to element 1062. Element 1062 accepts a user request. Control is then passed to element 1064. Element 1064 processes the request by executing selected ones of a number of predefined rules in a rules based expert system to provide a survey data request. Control is then passed to element 1066. Element 1066 accesses the survey database in accordance with the survey data request, and provides a number of selected survey data elements. Control is then passed to element 1068. Element 1068 processes selected ones of the selected survey data elements by executing selected ones of a number of pre defined rules in a rules based expert system. Control is then passed to element 1070. Element 1070 provides a result. Control is then passed to element 1072, wherein the algorithm is exited.

Figure 42:
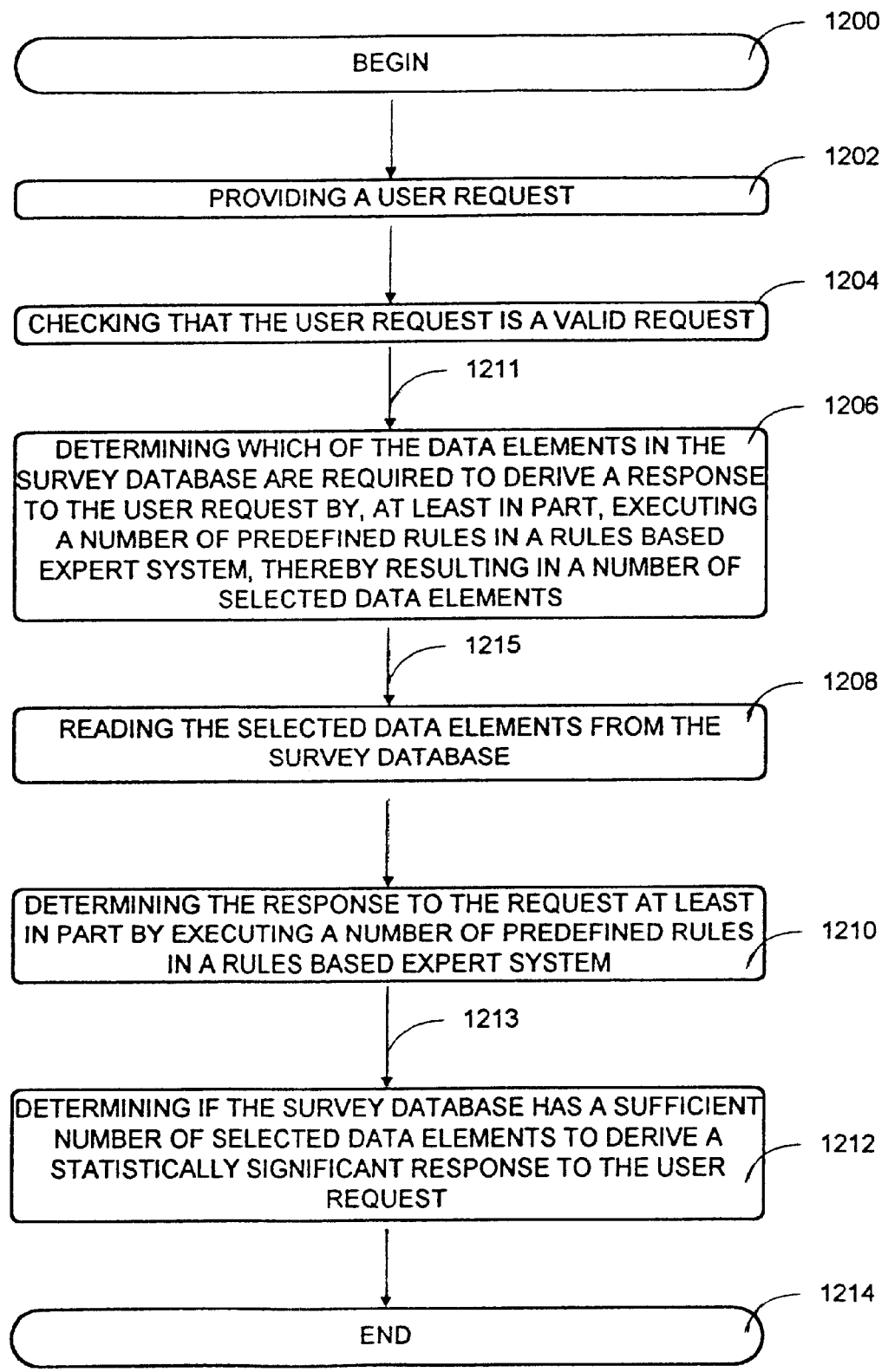
FIG. 42 is a flow diagram showing another illustrative method of the present invention.

FIG. 42 is a flow diagram showing another illustrative method of the present invention. The algorithm is entered at element 1200 and control is passed to element 1202. Element 1202 provides a user request. Element 1204 checks the user request to determine if it is a valid request. If the request is not valid or otherwise questionable, a request caveat may be provided. Control is passed to element 1206. Element 1206 determines which of the data elements in the survey data base are required to derive a response to the user request by, at least in part, executing a number of predefined rules in a rules-based expert system, thereby resulting in a number of selected data elements. Control is then passed to element 1208.

Element 1208 reads the selected data elements from the survey data base, and passes control to element 1210. Element 1210 determines the response to the request at least in part by executing a number of predefined rules in a rules-based expert system. Control is then passed to element 1212. Element 1212 determines if the survey database has a sufficient number of selected data elements to derive a statistically significant response to the user request. Control is then passed to element 1214, wherein the algorithm is exited.

Figure 43:
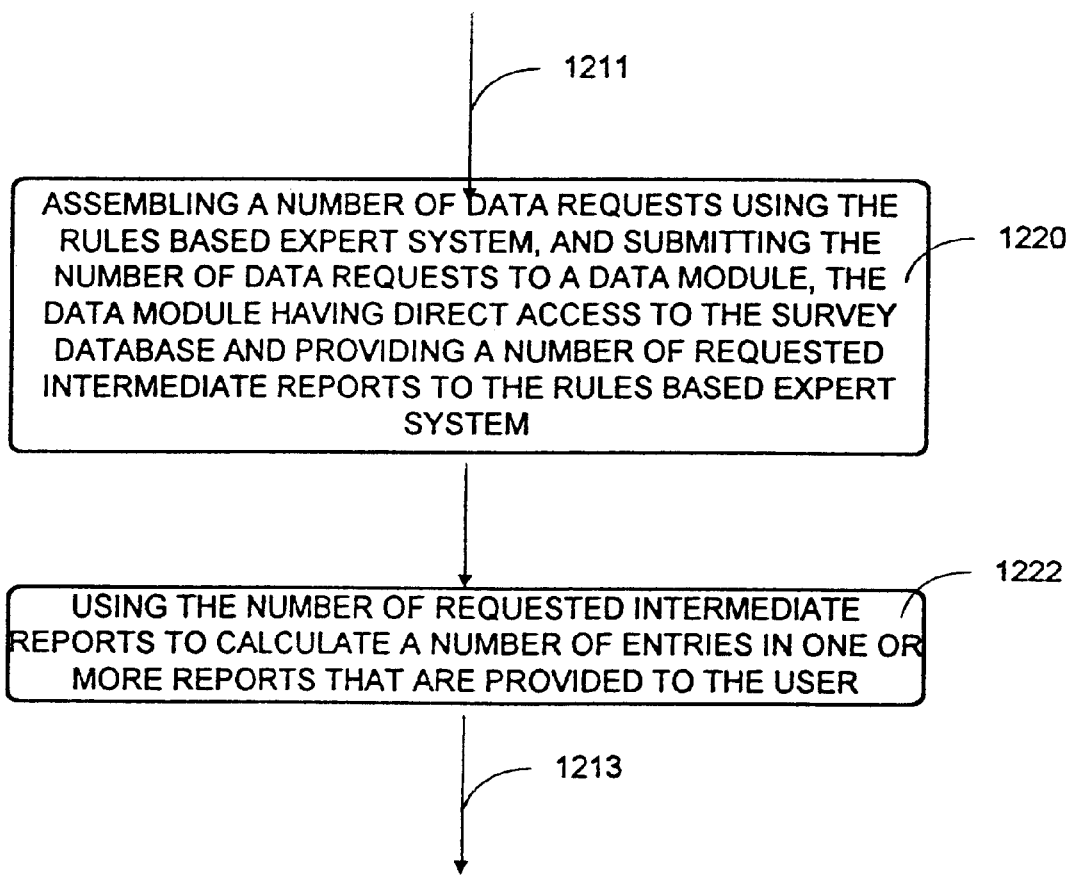
FIG. 43 is a flow diagram showing the method of FIG. 42, with elements 1206, 1208 and 1210 of FIG. 42 replaced with elements 1220 and 1222 of FIG. 43.

FIG. 43 is a flow diagram showing the method of FIG. 42, with elements 1206, 1208 and 1210 of FIG. 42 replaced with elements 1220 and 1222 of FIG. 43. Referring back to FIG. 42, after element 1204 checks the user request, element 1220 of FIG. 43 assembles a number of data requests using the rules-based expert system. Element 1220 further submits the number of data requests to a data module, and provides a number of requested intermediate reports to the rules-based expert system. Element 1222 uses the number of requested intermediate reports to calculate a number of entries in one or more reports that are provided to the user. Control is then passed to element 1212 of FIG. 42. It is contemplated that element 1220 and element 1222 may be combined, wherein the data module may access the survey database and provides one or more reports that are then provided to the user.

Figure 44:
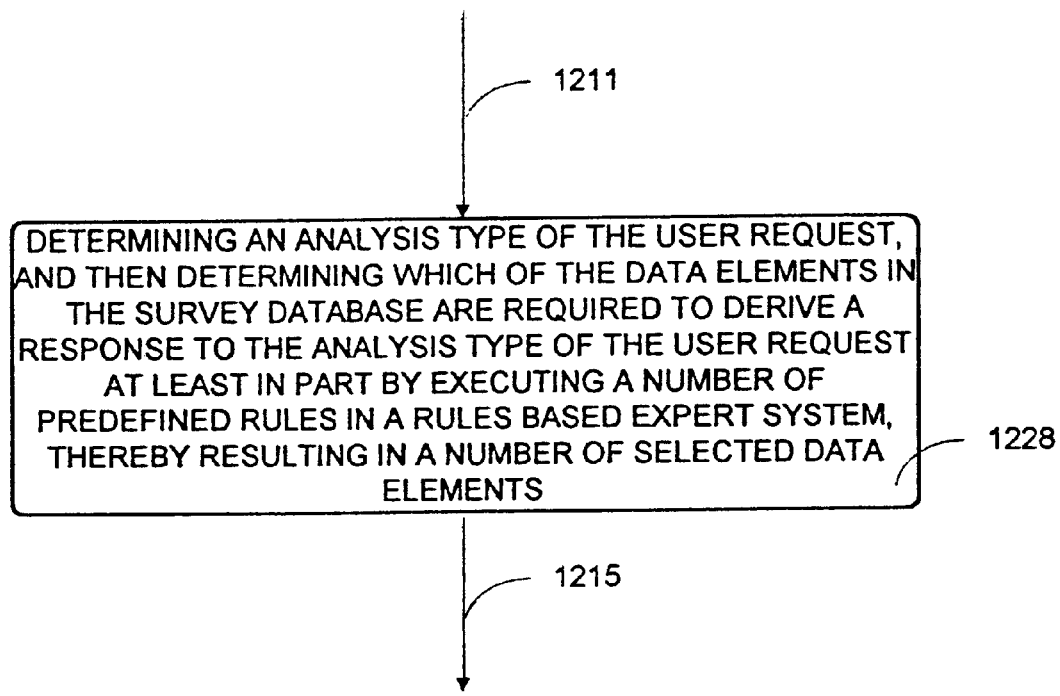
FIG. 44 is a flow diagram showing another variation of the method shown in FIG. 42, with element 1206 of FIG. 42 replaced with element 1228 of FIG. 44.

FIG. 44 is a flow diagram showing another variation of the method shown in FIG. 42, with element 1206 of FIG. 42 is replaced with element 1228 of FIG. 44. Element 1228 determines an analysis type of the user request, and determines which of the data elements in the survey database are required to derive a response to the analysis type of the user request. This is done, at least in part, by executing a number of predefined rules in a rules-based expert system, thereby resulting in a number of selected data elements.

Figure 45A:
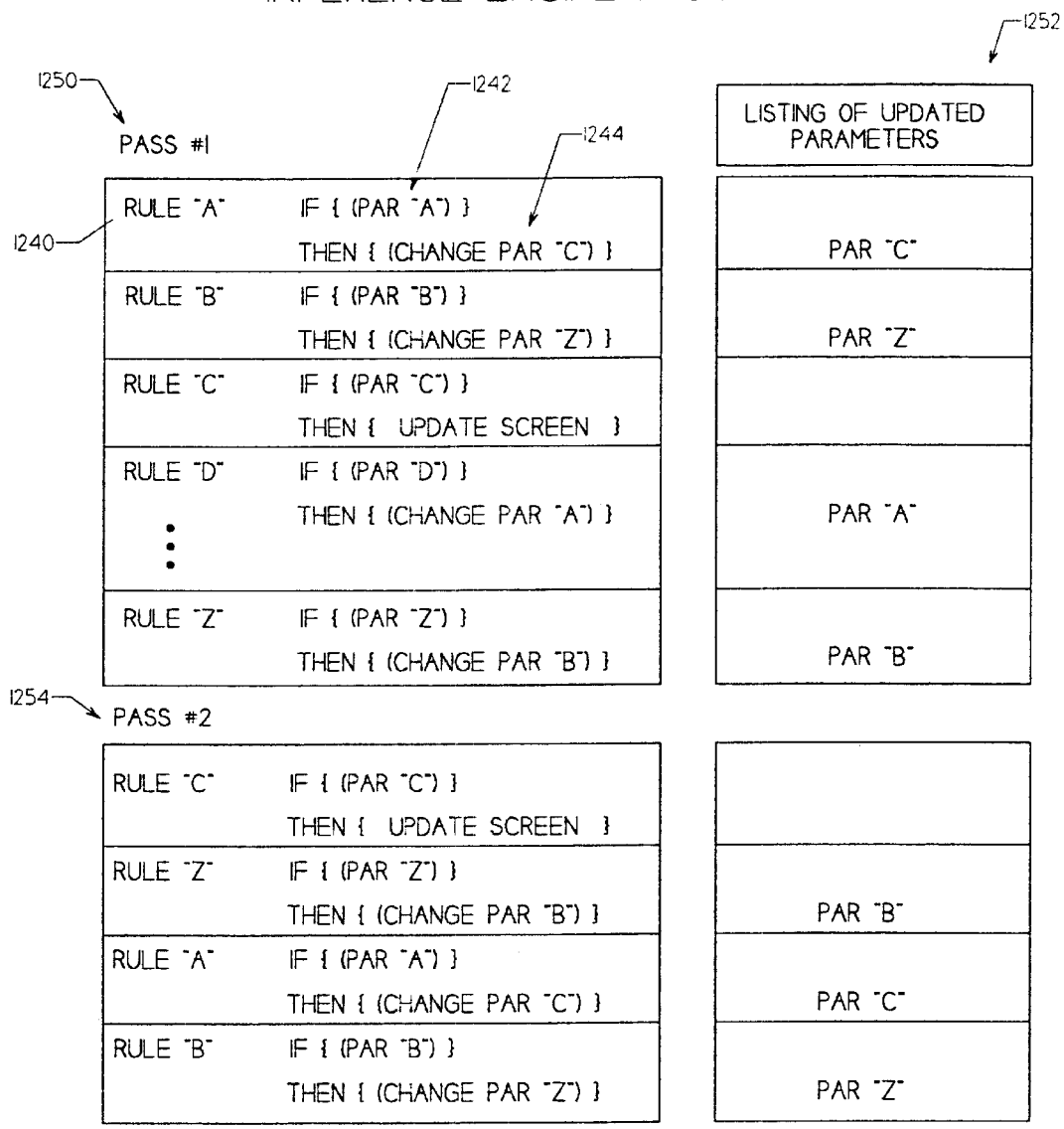
FIG. 45A and FIG. 45B show an illustrative prior art method for processing a number of rules using an inference engine.
Figure 45B:
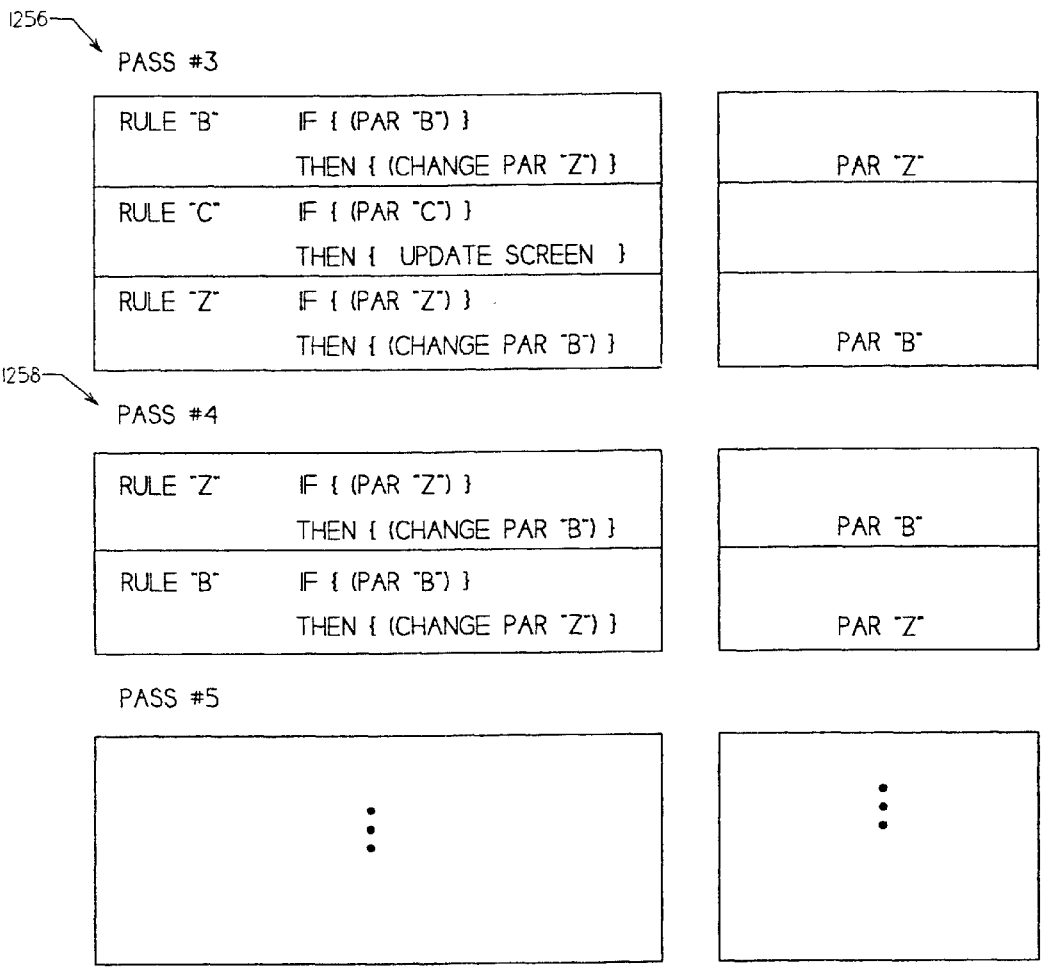

FIG. 45A and FIG. 45B show an illustrative prior art method for processing a number of rules using an inference engine. Each rule includes an if clause and a then clause. For example, Rule "A" 1240 includes an if clause 1242 and a then clause 1244. The if clause 1242 has an expression {(PAR "A")}, which in this case indicates that the expression is dependent on a parameter named "A". The then clause 1244 has a corresponding statement {(CHANGE PAR "C")}, which in this case indicated that the statement changes a parameter named "C".

For illustration purposes, the expression for each of the if clauses of FIGS. 45A–45B are shown to be true. Thus, the corresponding then clauses are always executed. It should be understood, however, that if an if expression is found to be false, the corresponding then clause is simply not executed.

The inference engine processes a request in a number of iterative passes. During a first pass 1250, the inference engine sequentially executes each of rules "A"–"Z". For each rule, the inference engine determines if the expression of the if clause is true. If the expression is found to be true, the corresponding then clause is executed. For those parameters that are changed, the inference engine maintains a listing of the updated parameters 1252, as shown.

When Rule "A" 1240 is executed, the expression of the if clause 1242 is found to be true. Thus, the then clause 1244 is executed along with the corresponding statement. The statement changes the value of parameter "C". The inference engine thus adds a reference to parameter "C" to the listing of updated parameters 1252. The remaining rules RULE "B"–"Z" are sequentially executed in a like manner to complete the first pass 1250.

After the first pass 1250 is complete, the listing of updated parameters 1252 includes references to each parameter that was changed during the first pass 1250. Because some of the rules may have expressions that depend on these parameters, a second pass 1254 is required.

During the second pass 1254, the inference engine determines which of the rules have an expression in the if clause that is dependent on one or more of the parameters in the listing of updated parameters 1252. The inference engine re-executes only those rules, which in this case includes RULE "C", RULE "Z", RULE "A" and RULE "B". The inference engine then updates the listing of updated parameters 1252 accordingly. After the second pass 1254 is complete, the listing of updated parameters 1252 includes references to each parameter that was changed during the second pass 1254, namely parameters "B", "C" and "Z". Because some of the rules may have expressions that depend on, these parameters, a third pass 1256 is required (see FIG. 45B).

During the third pass 1256, the inference engine determines which of the rules have an expression in the if clause that is dependent on one or more of the parameters in the listing of updated parameters 1252. The inference engine re-executes only those rules, which in this case includes RULE "B", RULE "C", and RULE "Z". The inference engine then updates the listing of updated parameters 1252 accordingly. After the third pass 1256 is complete, the listing of updated parameters 1252 includes references to each parameter that was changed during the third pass 1256, namely parameters "Z" and "B". Because some of the rules may have expressions that depend on these parameters, a fourth pass 1258 is required.

During the fourth pass 1258, the inference engine determines which of the rules have an expression in the if clause that is dependent on one or more of the parameters in the listing of updated parameters 1252. The inference engine re-executes only those rules, which in this case includes RULE "Z" and RULE "B". The inference engine then updates the listing of updated parameters 1252 accordingly. After the fourth pass 1258 is complete, the listing of updated parameters 1252 includes references to each parameter that was changed during the fourth pass 1258, namely parameters "B" and "Z".

Typically, the inference engine continues processing until there are no more parameters in the listing of updated parameters 1252. However, in this case, references to parameters "B" and "Z" will always be present in the listing of updated parameters 1252 after each pass. Thus, the inference engine is now stuck in an endless loop.

As can readily be seen, the precise flow of rule processing in a rules-based expert system can very dramatically, depending on the particular interactions of the rules that are processed. The interactions between rules can be very difficult to predict, particularly since hundreds of rules may exist within the system. Thus, robust debug and product testing of rules-based expert system can be difficult, time consuming, and tedious. For these and other reasons, rules based expert systems may be particularly susceptible to errors caused by unforeseen interactions between rules, including those interactions that cause the system to become stuck in an endless loop.

Figure 46A:
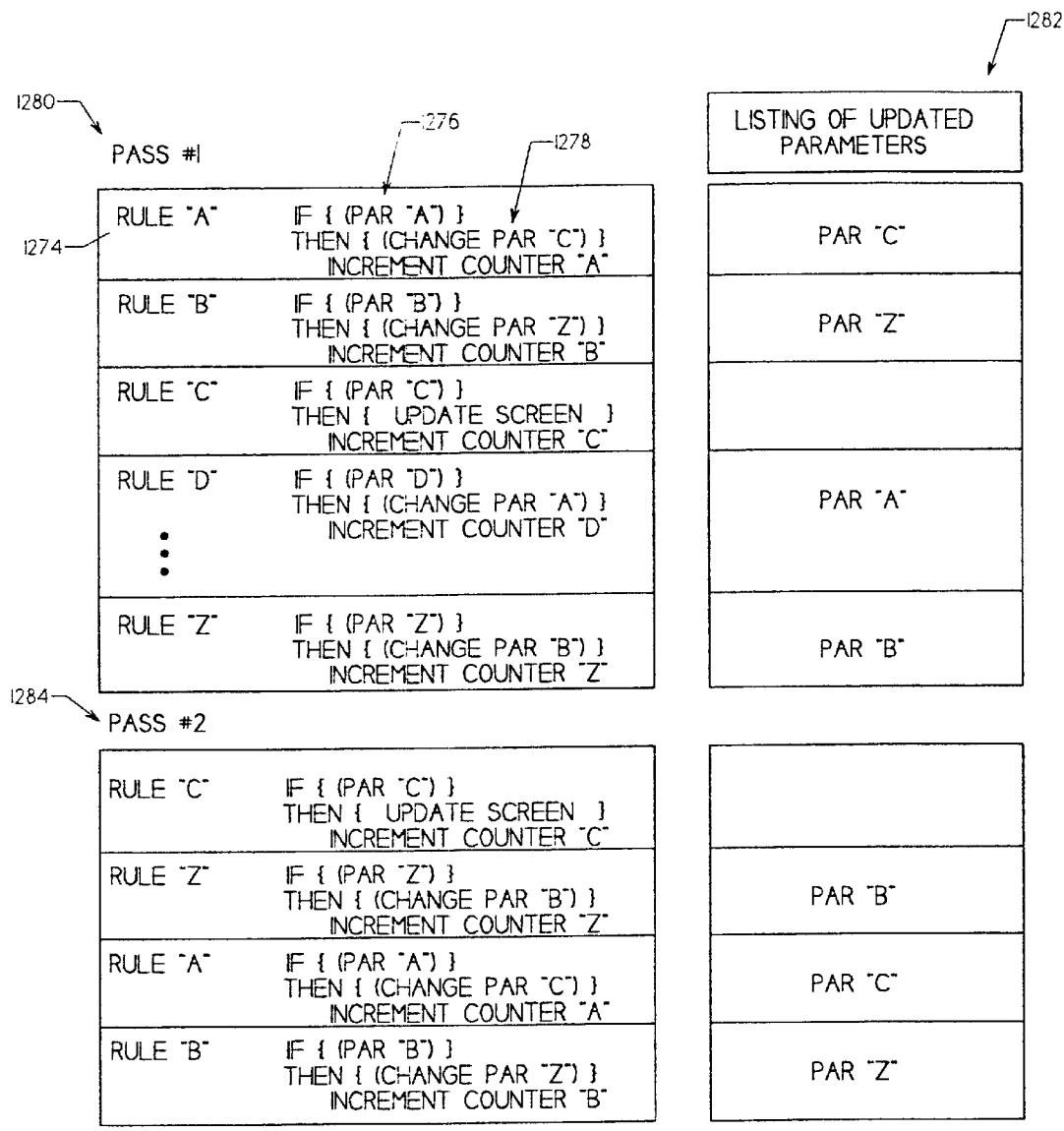

FIG. 46A and FIG. 46B show an illustrative method for processing a number of rules using an inference engine in accordance with the present invention. The present invention provides a means for detecting an endless loop in a rules-based expert system, preferably by maintaining a count for each of the rules during rule processing. The count indicates the number of times a corresponding rule is executed by the rules based expert system. If the count corresponding to any of the rules exceeds a predetermined value, it is concluded that the rules-based expert system is stuck in an endless loop, and the rules-based expert system is interrupted.

The rules-based expert system preferably includes an inference engine for processing the rules, as described above. When it is concluded that the rules-based expert system is stuck in an endless loop, the inference engine is interrupted, and control is passed back to the rules-based expert system.

Each of the rules of the present invention preferably includes an if type clause which specifies an expression, and a then type clause. The then type clause is executed only if the expression of the if type clause is satisfied. The then type clause preferably includes a statement that increments a counter for the corresponding rule. A counter value is maintained for selected rules in the system, and preferably all rules. The value stored in each rule counter is periodically compared to a predetermined value. If any of the counter values exceed the predetermined value, it is concluded that the rules based expert system is stuck in an endless loop, and the inference engine is interrupted accordingly.

Referring specifically to FIG. 46A, Rule "A" 1274 includes an if clause 1276 and a then clause 1278. The if clause 1276 has an expression {(PAR "A")}, which indicates that the expression is dependent on a parameter named "A". The then clause 1278 has a corresponding statement {(CHANGE PAR "C")}, which indicated that the statement changes a parameter named "C". Unlike the prior art, however, the then clause 1278 also has a statement that increments a counter "A". The remaining rules "B" through "Z" also have an increment statement, as shown.

Like FIGS. 45A–45B, the expression for each of the if clauses of FIGS. 46A–46B are shown to be true. Thus, the corresponding then clauses are always executed. It should be understood, however, that if an if expression is found to be false, the corresponding then clause is simply not executed.

The inference engine processes a request in a number of iterative passes. During a first pass 1280, the inference engine sequentially executes each of rules "A"–"Z". For each rule, the inference engine determines if the expression of the if clause is true. If the expression is found to be true, the corresponding then clause is executed. For those parameter that are changed, the inference engine maintains a listing of the updated parameters 1282, as shown.

When Rule "A" 1274 is executed, the expression of the if clause 1276 is found to be true. Thus, the then clause 1278 is executed along with the corresponding statements. A first statement changes the value of parameter "C". A second statement increments the counter "A", as shown. The inference engine then adds a reference to parameter "C" to the listing of updated parameters 1282. The remaining rules. RULE "B"–"Z" are sequentially executed in a like manner to complete the first pass 1280. Preferably, a counter is maintained for each rule, and incremented as appropriate during processing.

After the first pass 1280 is complete, the listing of updated parameters 1282 includes references to each parameter that was changed during the first pass 1280. Because some of the rules may have expressions that depend on these parameters, a second pass 1284 is required.

During the second pass 1284, the inference engine determines which of the rules have an expression in the if clause that is dependent on one or more of the parameters in the listing of updated parameters 1282. The inference engine re-executes only those rules, which in this case includes RULE "C", RULE "Z", RULE "A" and RULE "B". The inference engine then updates the listing of updated parameters 1282 accordingly. After the second pass 1284 is complete, the listing of updated parameters 1282 includes references to each parameter that was changed during the second pass 1284, namely parameters "B", "C" and "Z". Because some of the rules may have expressions that depend on these parameters, a third pass 1286 is required (see FIG. 46B).

During the third pass 1286, the inference engine determines which of the rules have an expression in the if clause that is dependent on one or more of the parameters in the listing of updated parameters 1282. The inference engine re-executes only those rules, which in this case includes RULE "C", RULE "C", and RULE "Z". The inference engine then updates the listing of updated parameters 1282 accordingly. After the third pass 1286 is complete, the listing of updated parameters 1282 includes references to each parameter that was changed during the third pass 1286, namely parameters "Z" and "B". Because some of the rules may have expressions that depend on these parameters, a fourth pass 1288 is required.

During the fourth pass 1288, the inference engine determines which of the rules have an expression in the if clause that is dependent on one or more of the parameters in the listing of updated parameters 1282. The inference engine re-executes only those rules, which in this case includes RULE "Z" and RULE "B". The inference engine then updates the listing of updated parameters 1282 accordingly. After the fourth pass 1288 is complete, the listing of updated parameters 1282 includes references to each parameter that was changed during the fourth pass 1288, namely parameters "B" and "Z".

The inference engine continues processing until either the listing of updated parameters 1282 becomes empty or the count corresponding to any of the rules "A"–"Z" exceeds a predetermined value. In this case, references to parameters "B" and "Z" will always be present in the listing of updated parameters 1252 after each pass. Thus, when the count value for either RULE "B" or RULE "Z" exceeds a predetermined value, the inference engine will be interrupted. This provides an efficient means for detecting when a rules based expert system is stuck in an endless loop.

While an increment statement is shown in the then type clause of each rule, it is contemplated that any means may be used to count the number of times a corresponding rule is executed. For example, the increment statement may be included in the if type clause, rather than the then type clause. In addition, a special counter routine may be provided for maintaining a count for each rule. The special counter routine may detect which rule is currently being executed, and increment the appropriate counter. The important feature is that a count is maintained for each of a number of selected rules.

It is also contemplated that the present invention may be implemented either in hardware, software of a combination thereof. When implemented in hardware, a counting means may be provided for maintaining a count for each of a number of rules. A comparing means may be provided for comparing the count for each of the number of rules to a predetermined value. Finally, an interrupting means may be provided for interrupting the system if the count corresponding to any of the number of rules exceeds the predetermined value.

Figure 47:
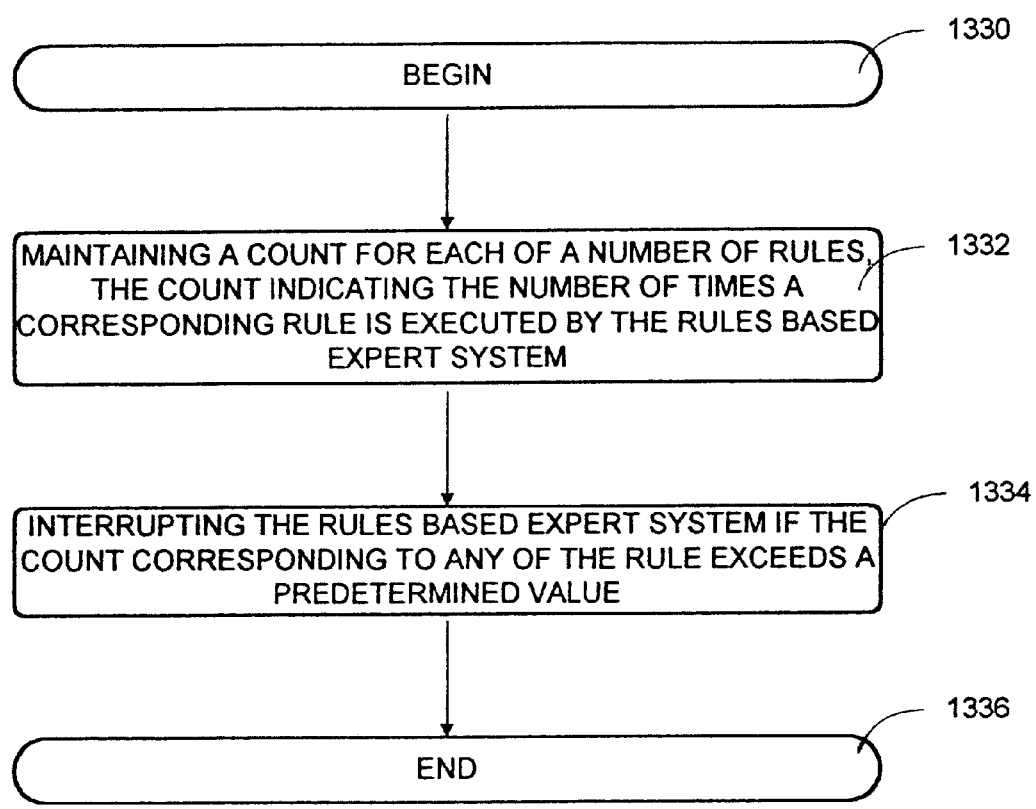
FIG. 47 is a flow diagram showing an illustrative method for detecting when a rules based expert system is stuck in an endless loop.

FIG. 47 is a flow diagram showing an illustrative method for detecting when a rules based expert system is stuck in an endless loop. The algorithm is entered at element 1330, wherein control is passed to element 1332. Element 1332 maintains a count for each of the number of rules. The count indicates the number of times the corresponding rule is executed by the rules-based expert system. Control is then passed to element 1334. Element 1334 interrupts the rules-based expert system if the count corresponding to any of a number of selected rules exceeds a predetermined value. Control is then passed to element 1336, wherein the algorithm is exited.

Figure 48A:
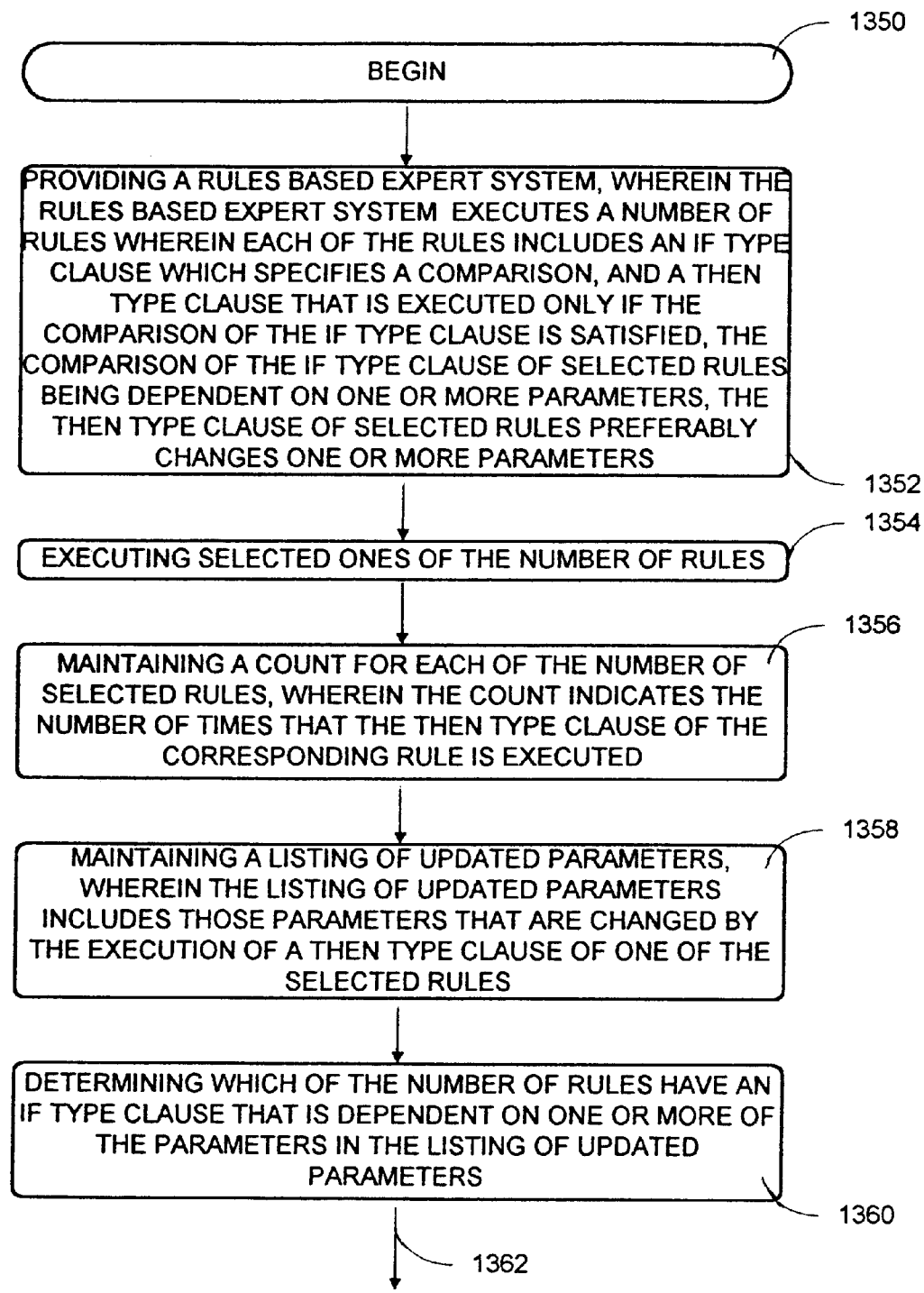
FIG. 48A and FIG. 48B show another illustrative method for detecting when a rules based expert system is stuck in an endless loop.
Figure 48B:
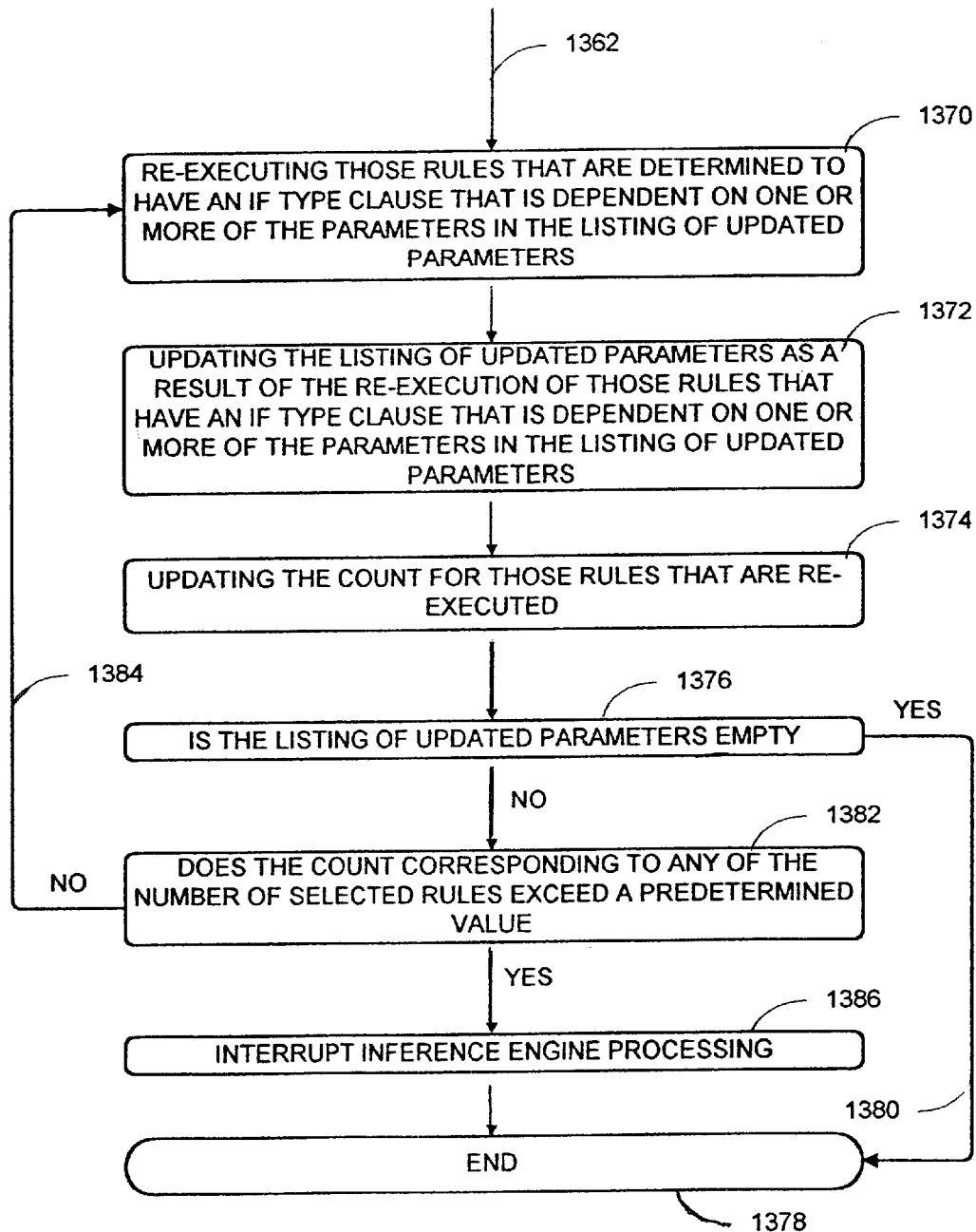

FIG. 48A and FIG. 48B show another illustrative method for detecting when a rules based expert system is stuck in an endless loop. The algorithm is entered at element 1350, and control is passed to element 1352. Element 1352 provides a rules based expert system that executes a number of rules. Each of the rules include an if type clause which specifies a comparison, and a then type clause. The then type clause is executed only if the comparison of the if type clause is satisfied. The comparison of the if type clause of selected rules may be dependent on one or more parameters, and the then type clause of selected rules may change one or more parameters. Control is then passed to element 1354.

Element 1354 executes selected ones of the number of rules. Control is then passed to element 1356. Element 1356 maintains a count for each of the number of selected rules. The count indicates the number of times that the then type clause of the corresponding rule is executed. Control is then passed to element 1358. Element 1358 maintains a listing of updated parameters. The listing of updated parameters includes those parameters that are changed by the execution of a then type clause of one of the selected rules. Control is then passed to element 1360.

Element 1360 determines which of the number of rules have an if type clause that is dependent on one or more of the parameters in the listing of updated parameters. Control is then passed to element 1370 via interface 1362. Element 1370 reexecutes those rules that are determined to have an if type clause that is dependent on one or more of the parameters in the listing of updated parameters. Control is then passed to element 1372.

Element 1372 updates the listing of updated parameters as a result of the reexecution of those rules that have an if type clause that is dependent on one or more of the parameters in the listing of updated parameters. Control is then passed to element 1374. Element 1374 updates the count for those rules that are reexecuted. Control is then passed to element 1376.

Element 1376 determines whether the listing of updated parameters is now empty. If the listing of updated parameters is empty, control is passed to element 1378 via interface 1380, wherein the algorithm is exited. If, however, the listing of updated parameters is not empty, control is passed to element 1382.

Element 1382 determines whether the count corresponding to any of the number of selected rules exceeds a predetermined value. If the count corresponding to any of the number of selected rules does not exceed a predetermined value, control is passed back to element 1370 via interface 1384. If, however, the count corresponding to any of the number of selected rules does exceed a predetermined value, control is passed to element 1386. Element 1386 interrupts the inference engine processing, and passes control to element 1378,, wherein the algorithm is exited.

FIG. 49 is a table showing illustrative analysis types, and the corresponding rule sets that are associated therewith. In the left column, the preferred complex analysis types are shown. In the right column, the preferred rule sets are identified for each analysis type. When a particular analysis type is requested, the knowledge module executes each of the corresponding rule sets in the order indicated.

FIGS. 50A–50C show a table of preferred rule sets, and the corresponding rules that are associated therewith. In the left column, a number of rule set names are shown. In the right column, the preferred rules are identified for each rule set. When a particular rule set is executed by the knowledge module, the corresponding rules are executed by the inference engine as required.

FIGS. 51A–51O show a table of the preferred rules, along with corresponding rule comments. In the left column, a number of rule names are shown. In the right column, the corresponding rule comments are shown. The rule comments describe the action performed by the corresponding rule.

FIGS. 52A–52F shows an illustrative listing of the object oriented database before any analysis runs are executed. FIGS. 53A–53G shows an illustrative listing of the object oriented database before after a strength analysis type is executed. When comparing FIG. 52D and FIG. 53D, it can be seen that a number of strength results are generated in the KM/KM_results/SWOT_results/strength class.

Having thus described the preferred embodiments of the present invention, those of skill in the art will readily appreciate that the teachings found herein may be applied to yet other embodiments within the scope of the claims hereto attached.

What is claimed is:

1. A method for determining if a rules based expert system is stuck in a loop, the method comprising the steps of:
   a. maintaining a count for each of a number of rules, the count indicating the number of times a corresponding rule is executed by the rules based expert system; and
   b. interrupting the rules based expert system if the count corresponding to any of the rules exceeds a predetermined value.

2. A method according to claim 1 wherein the rules based expert system includes an inference engine.

3. A method according to claim 2 wherein the interrupting step 1(*b*) interrupts the inference engine from processing the rules if the count corresponding to any of the rules exceeds the predetermined value.

4. A method according to claim 3 wherein each of the number of rules includes an if type clause which specifies an expression, and a then type clause, wherein during execution the then type clause is executed only if the expression of the if type clause is satisfied.

5. A method according to claim 4 wherein the expression of the if type clause is dependent on one or more parameters.

6. A method according to claim 5 wherein the then type clause of selected rules changes one or more parameters.

7. A method according to claim:6 wherein the inference engine maintains a listing of updated parameters, wherein the listing of updated parameters includes those parameters that are changed by the execution of a then type clause of one of the number of rules.

8. A method according to claim 7 wherein the inference engine determines which of the number of rules have an if type clause that is dependent on one or more of the parameters in the listing of updated parameters.

9. A method according to claim 8 wherein the inference engine re-executes those rules that are determined to have an if type clause that is dependent on one or more of the parameters in the listing of updated parameters.

10. A method according to claim 9 wherein the inference engine updates the listing of updated parameters during the re-executing step of claim 9.

11. A method according to claim 10 wherein the inference engine continues to determine which of the number of rules have an if type clause that is dependent on one or more of the parameters in the listing of updated parameters, re-executes those rules that are determined to have an if type clause that is dependent on one or more of the parameters in the listing of updated parameters and updates the listing of updated parameters during the re-executing step until the listing of updated parameters becomes empty or until the count of step 1(*a*) corresponding to any of the number of rules exceeds the predetermined value.

12. A method for determining if a rules based expert system is stuck in a loop, the rules based expert system executing a number of rules wherein each of the rules includes an if type clause which specifies an expression, and a then type clause that is executed only if the expression of the if type clause is true, the expression of the if type clause of selected rules being dependent on one or more parameters, the then type clause of selected rules changing one or more parameters, the method comprising the step of:
   a. executing a number of selected rules;
   b. maintaining a count for each of the number of selected rules, wherein the count indicates the number of times that the then type clause of the corresponding rule is executed;
   c. maintaining a listing of updated parameters, wherein the listing of updated parameters includes those parameters that are changed by the execution of a then type clause of the selected rules;

d. determining which of the number of rules have an if type clause that is dependent on one or more of the parameters in the listing of updated parameters;

e. re-executing those rules that are determined to have an if type clause that is dependent on one or more of the parameters in the listing of updated parameters;

f. updating the listing of updated parameters as a result of the re-executing step 12(*e*);

g. updating the count for those rules re-executed in step 12(*e*); and h. repeating steps 12(*d*)–12(*g*) until either the listing of updated parameters becomes empty or the count corresponding to any of the number of selected rules exceeds the predetermined value.

13. Apparatus for determining if a rules based expert system is stuck in a loop, comprising:

a. counting means for maintaining a count for each of a number of rules, the count indicating the number of times a corresponding rule is executed by the rules based expert system;

b. comparing means for comparing the count for each of the number of rules to a predetermined value; and c. interrupting means for interrupting the rules based expert system if the count corresponding to any of the number of rules exceeds the predetermined value.

14. An apparatus according to claim 13 wherein the rules based expert system includes an inference engine block.

15. An apparatus according to claim 14 wherein the interrupting means interrupts the inference engine block from processing the rules if the count corresponding to any of the rules exceeds the predetermined value.

16. An apparatus according to claim 15 wherein each of the number of rules includes an if type clause which specifies an expression, and a then type clause, wherein during execution the then type clause is executed only if the expression of the if type clause is satisfied.

17. An apparatus according to claim 15 wherein the expression of the if type clause is dependent on one or more parameters.

18. An apparatus according to claim 17 wherein the then type clause of selected rules changes one or more parameters.

19. An apparatus according to claim 18 wherein the inference engine block maintains a listing of updated parameters, wherein the listing of updated parameters includes those parameters that are changed by the execution of a then type clause of one of the number of rules.

20. An apparatus according to claim 19 wherein the inference engine block determines which of the number of rules have an if type clause that is dependent on one or more of the parameters in the listing of updated parameters.

21. An apparatus according to claim 20 wherein the inference engine block re-executes those rules that are determined to have an if type claus,e that is dependent on one or more of the parameters in the listing of updated parameters.

22. An apparatus according to claim 21 wherein the inference engine block updates the listing of updated parameters when the inference engine block re-executes those rules that are determined to have an if type clause that is dependent on one or more of the parameters in the listing of updated parameters.

23. An apparatus according to claim 22 wherein the inference engine block continues to determine which of the number of rules have an if type clause that is dependent on one or more of the parameters in the listing of updated parameters, re-executes those rules that are determined to have an if type clause that is dependent on one or more of the parameters in the listing of updated parameters, and updates the listing of updated parameters during the re-executing step until the listing of updated parameters becomes empty or until the count corresponding to any of the number of rules exceeds the predetermined value.

* * * * *